United States Patent [19]
Kaufman et al.

[11] Patent Number: 5,165,534
[45] Date of Patent: * Nov. 24, 1992

[54] PACKAGING CASES INCORPORATING ELEVATING MECHANISM FOR DISPLAYING CONTENTS

[76] Inventors: Lauren Kaufman, 55 Francisco St., Ste. 802, San Francisco, Calif. 94113; Harrison Kaufman, 1228 Montgomery St., #5, San Francisco, Calif. 94133

[*] Notice: The portion of the term of this patent subsequent to Aug. 14, 2007 has been disclaimed.

[21] Appl. No.: 567,460

[22] Filed: Aug. 13, 1990

Related U.S. Application Data

[63] Continuation-in-part of Ser. No. 435,285, Nov. 13, 1989, Pat. No. 4,947,984.

[51] Int. Cl.[5] .................. B65D 85/57; B65D 85/20
[52] U.S. Cl. ........................ 206/44.12; 206/45.18; 206/214; 206/443; 206/444; 206/804; 211/69.1
[58] Field of Search ............... 206/1.7, 44 B, 44 R, 206/44.11, 44.12, 45, 45.11, 45.12, 45.13, 45.14, 45.15, 45.17, 45.18, 45.21, 45.22, 45.23, 214, 224, 309, 327, 362.1, 371, 372, 373, 379, 425, 444, 562, 563, 526; 211/2, 11, 40, 60.1, 69.1, 69.5, 69.6, 69.7, 170

[56] References Cited

U.S. PATENT DOCUMENTS

| | | | |
|---|---|---|---|
| D. 121,710 | 7/1940 | West | 211/2 |
| 893,355 | 7/1908 | McIntyre | 206/1.7 |
| 1,092,156 | 4/1914 | Mathis | 211/69.1 |
| 2,078,018 | 4/1937 | Powell | 206/45.18 |
| 2,302,919 | 11/1942 | Snider | 206/44 R |
| 2,927,687 | 3/1960 | Sanford | 206/45.19 |
| 3,001,684 | 9/1961 | Wenzel | 206/563 |
| 3,089,631 | 5/1963 | Tyrseck et al. | 206/45.14 |
| 3,259,748 | 7/1966 | Lammers | 206/45.18 |
| 3,400,875 | 9/1968 | Coe | 206/563 |
| 3,429,427 | 2/1969 | Wolf | 206/45 |
| 3,987,892 | 10/1976 | Killy | 206/443 |
| 4,477,016 | 10/1984 | Growney | 206/44 R |
| 4,527,692 | 7/1985 | Neuman | 206/444 |
| 4,555,018 | 11/1985 | Cho | 206/214 |
| 4,573,569 | 3/1986 | Parker | 206/443 |
| 4,615,872 | 3/1987 | Joyce | 206/45.14 |
| 4,648,505 | 3/1987 | Belmondo | 206/214 |
| 4,653,637 | 3/1987 | Wallace | 206/372 |
| 4,694,957 | 9/1987 | Ackeret | 206/309 |
| 4,696,397 | 9/1987 | Nakamats | 206/444 |
| 4,705,166 | 11/1987 | Ackeret | 206/309 |
| 4,705,169 | 11/1987 | Mastronardo | 206/387 |
| 4,709,812 | 12/1987 | Kosterca | 206/310 |
| 4,858,756 | 8/1989 | Herrin et al. | 206/45.34 |

*Primary Examiner*—Jimmy G. Foster
*Attorney, Agent, or Firm*—Townsend and Townsend

[57] ABSTRACT

A packaging case for storing and presenting elongated objects, such as pencils (103, 704), and flat objects, such as computer disks (350, 604), includes a base (50, 606, 710) having a plurality of upright partitions (58, 622 and 630, 614, 626, 706 and 708, 712) hingedly attached thereto at spaced locations, and at least one shelf (68, 618, 714 and 715, 723 and 724) attached to the partitions. The shelves have openings (66, 620, 718, 722) for receiving the objects and holding them parallel to the partitions. When the partitions are upright, the objects are held upright. When the partitions are folded down, the objects and shelves will be close and parallel to the base so as to provide a very compact package for easy transportation and/or storage. The case can be closed by fold-over flaps or ends (56, 608, 610, 749) which are separate from or one piece extensions of the base. The partitions can be urged to their upright positions manually or by elastic bands (196, 636, 740) or springs (106). The slots can be elongated in directions parallel to the partitions for holding flat objects like computer disks, and perpendicular to the partitions for holding long, thin objects like pencils. The case can be made of one or more pieces of material.

50 Claims, 29 Drawing Sheets

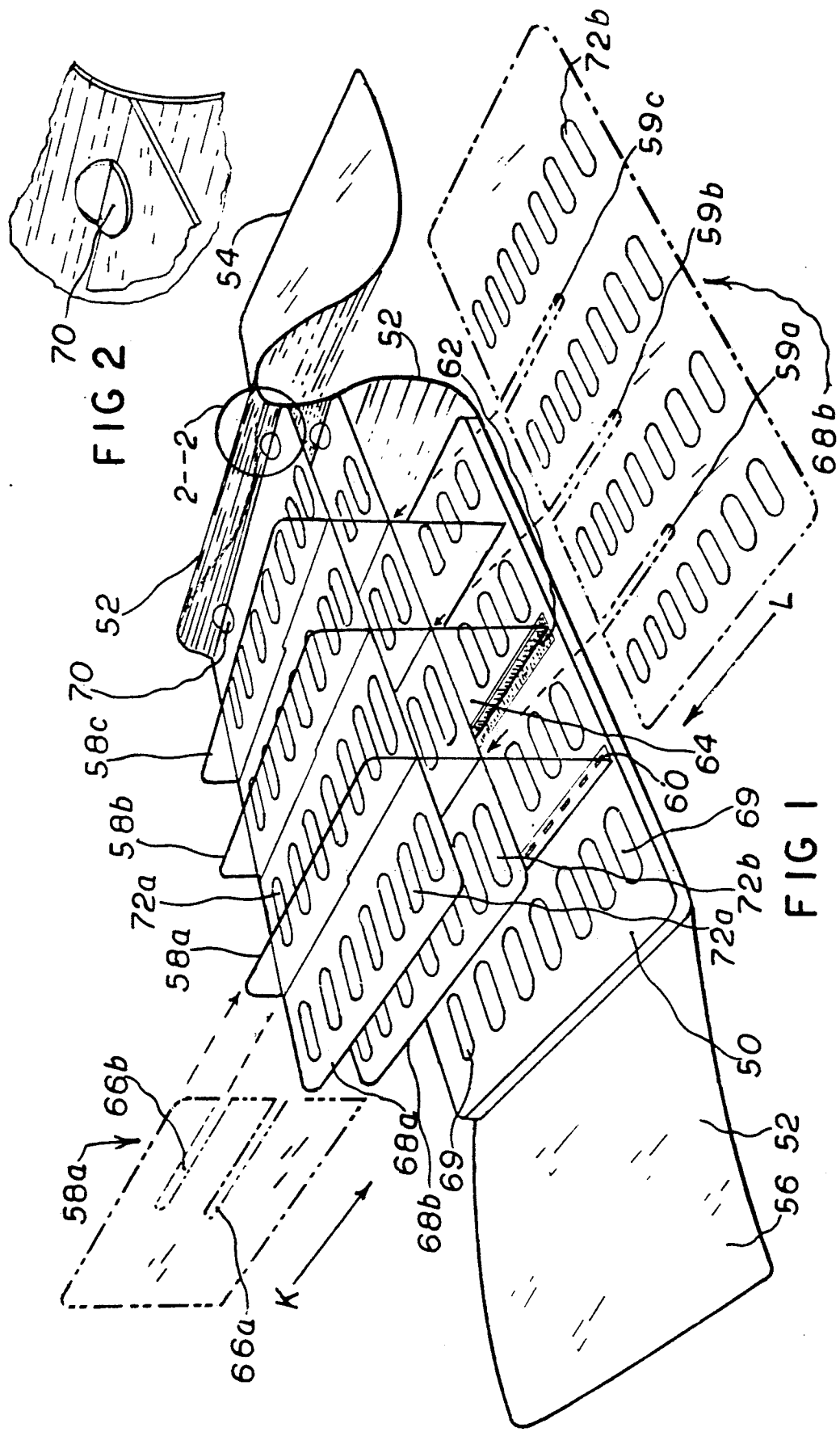

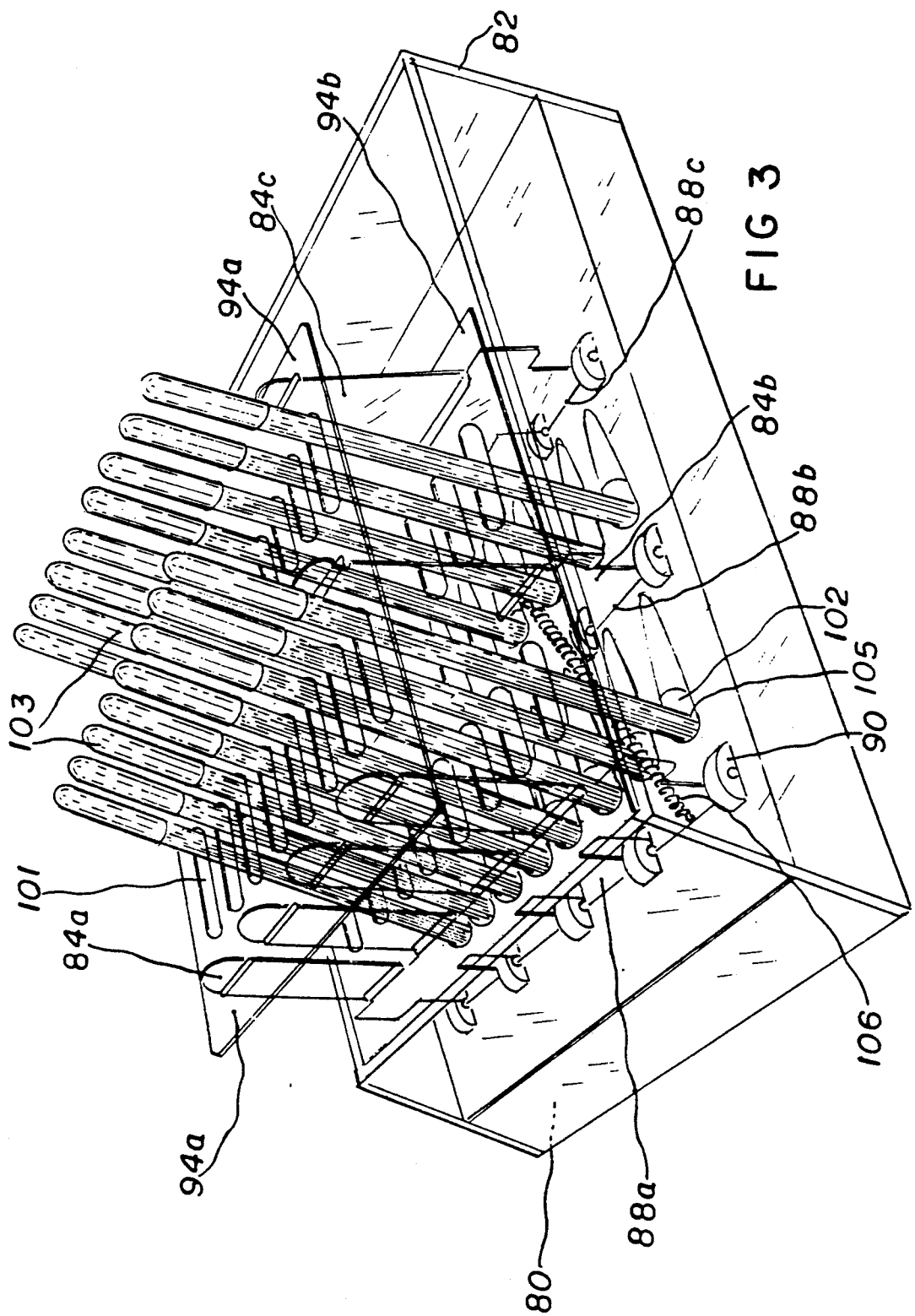

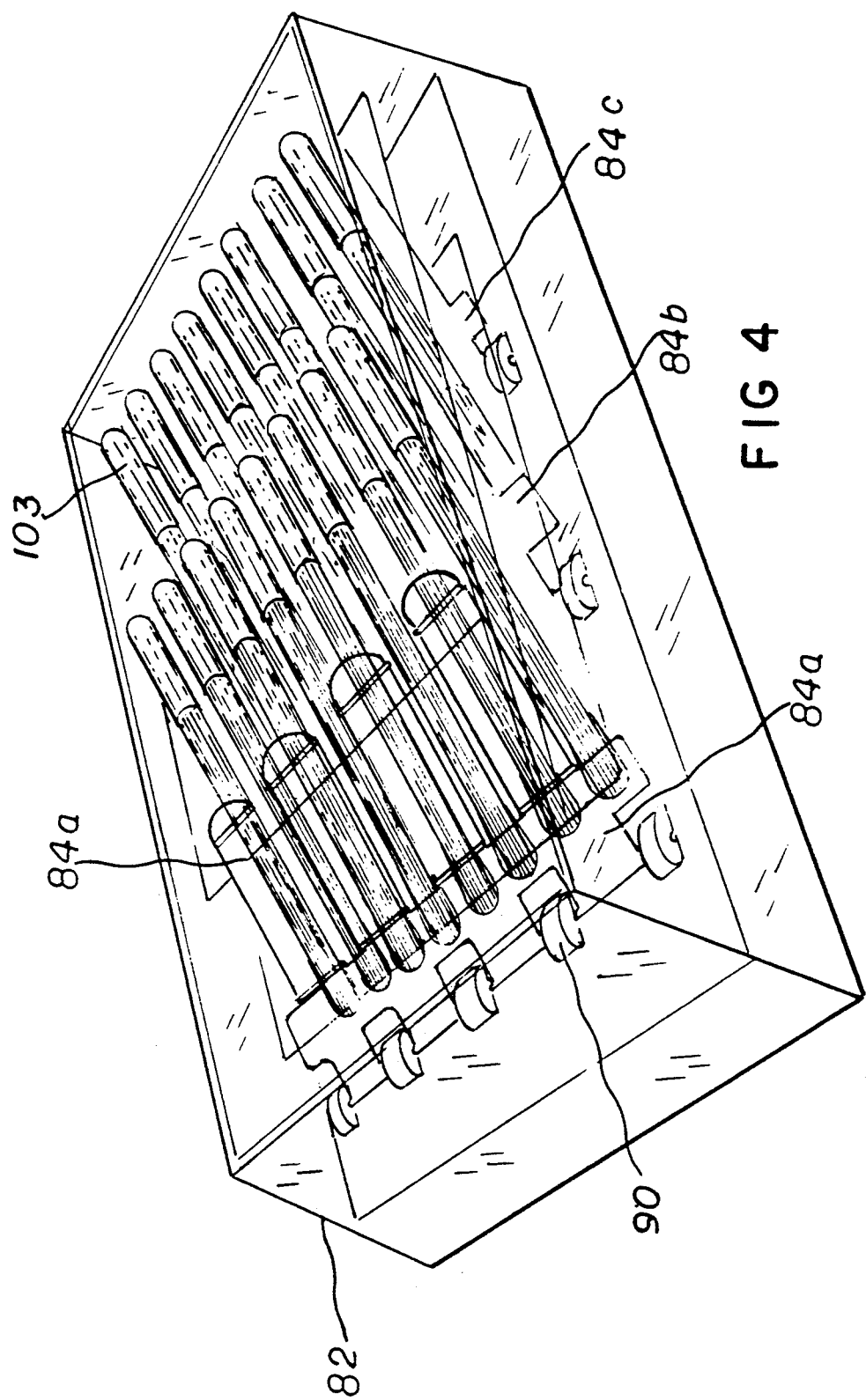

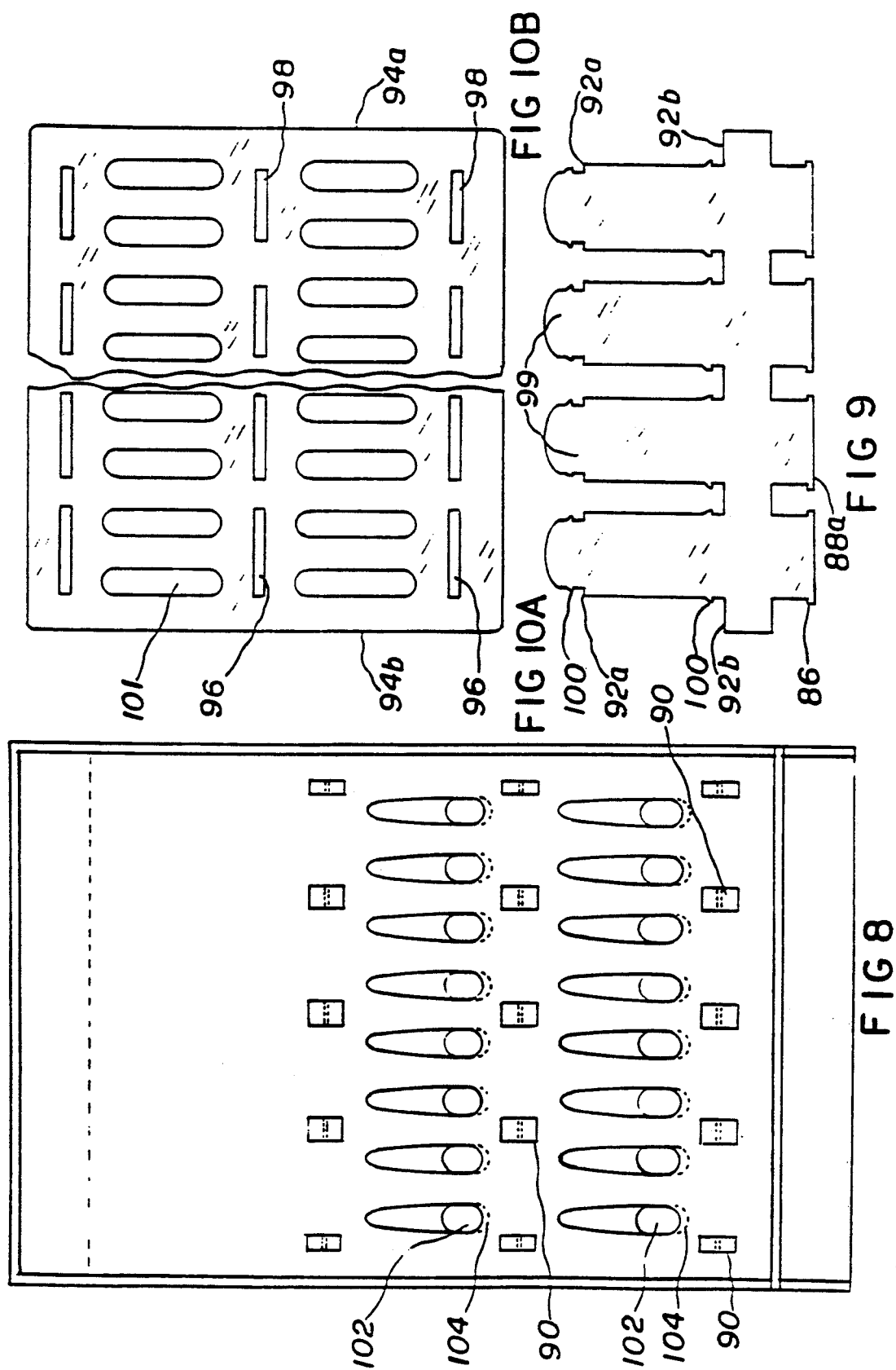

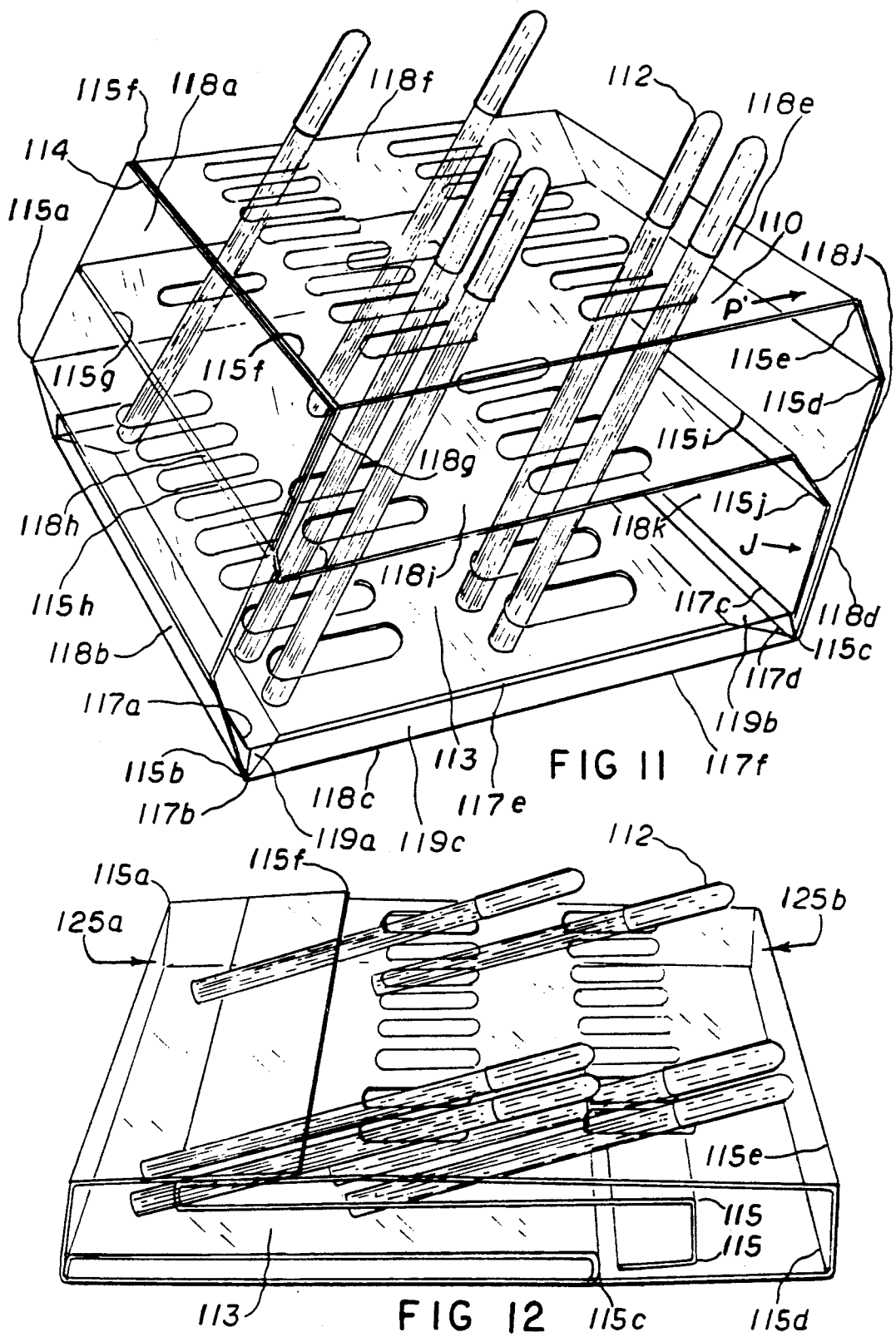

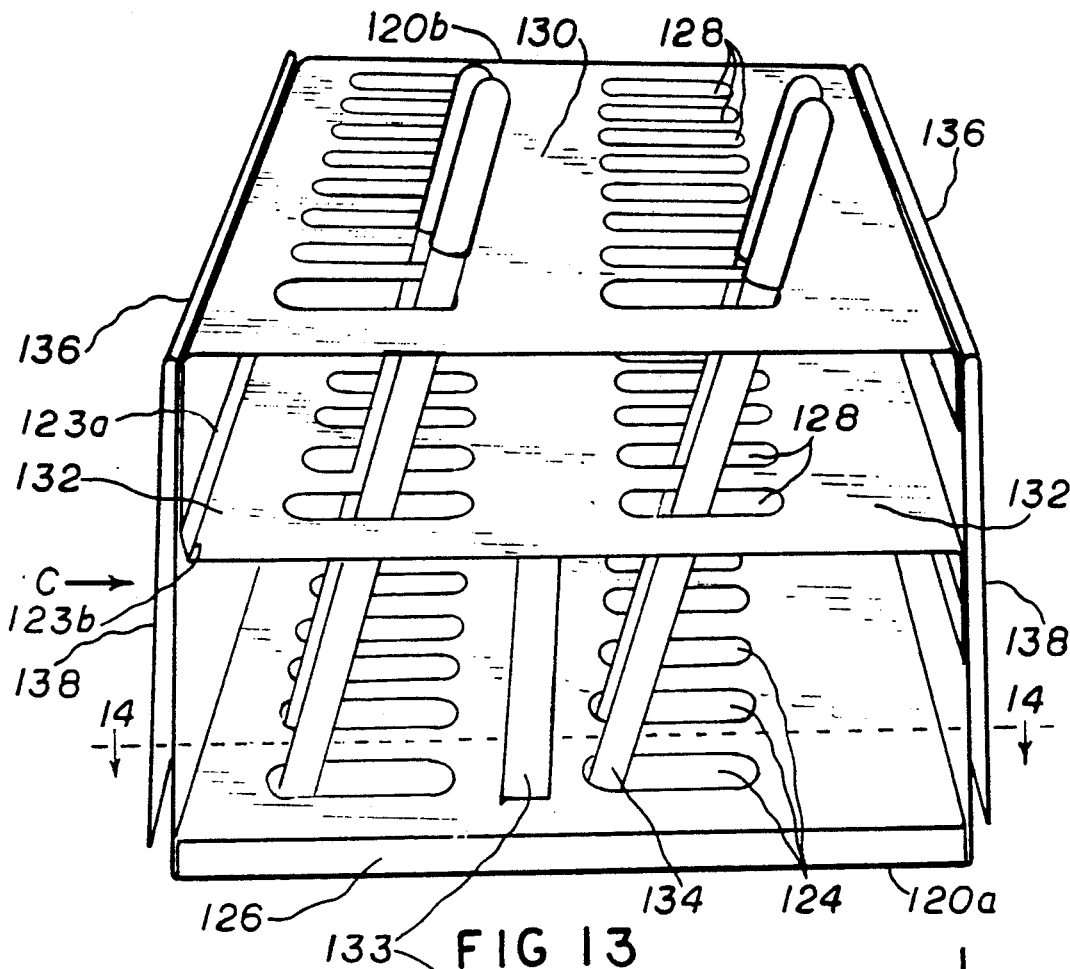
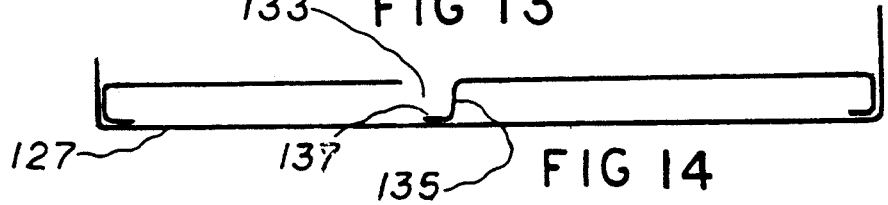
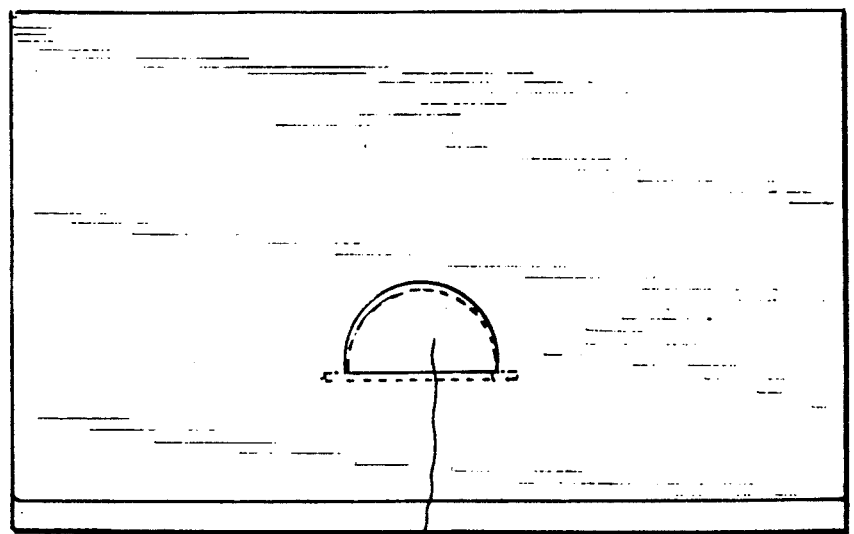

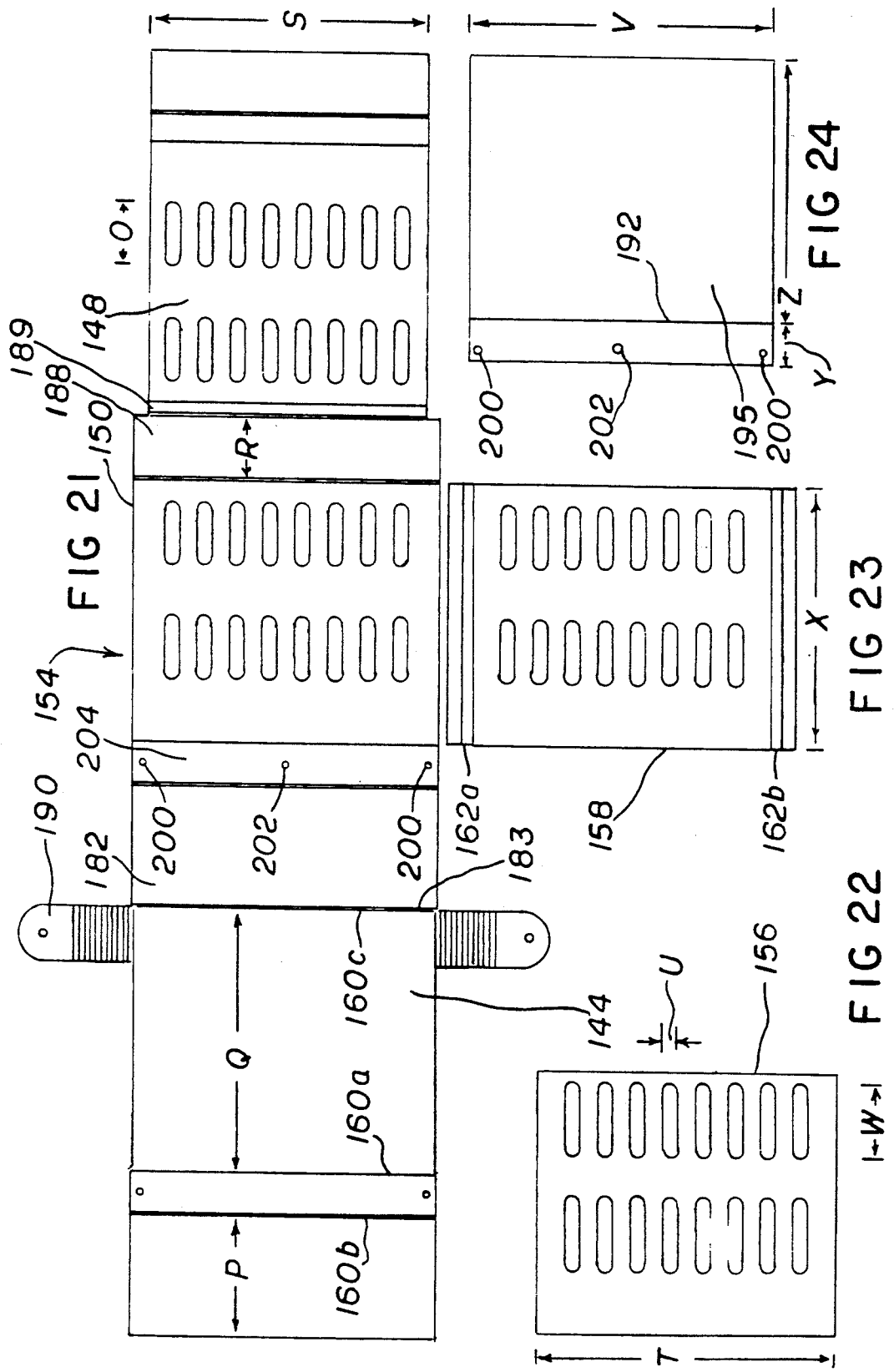

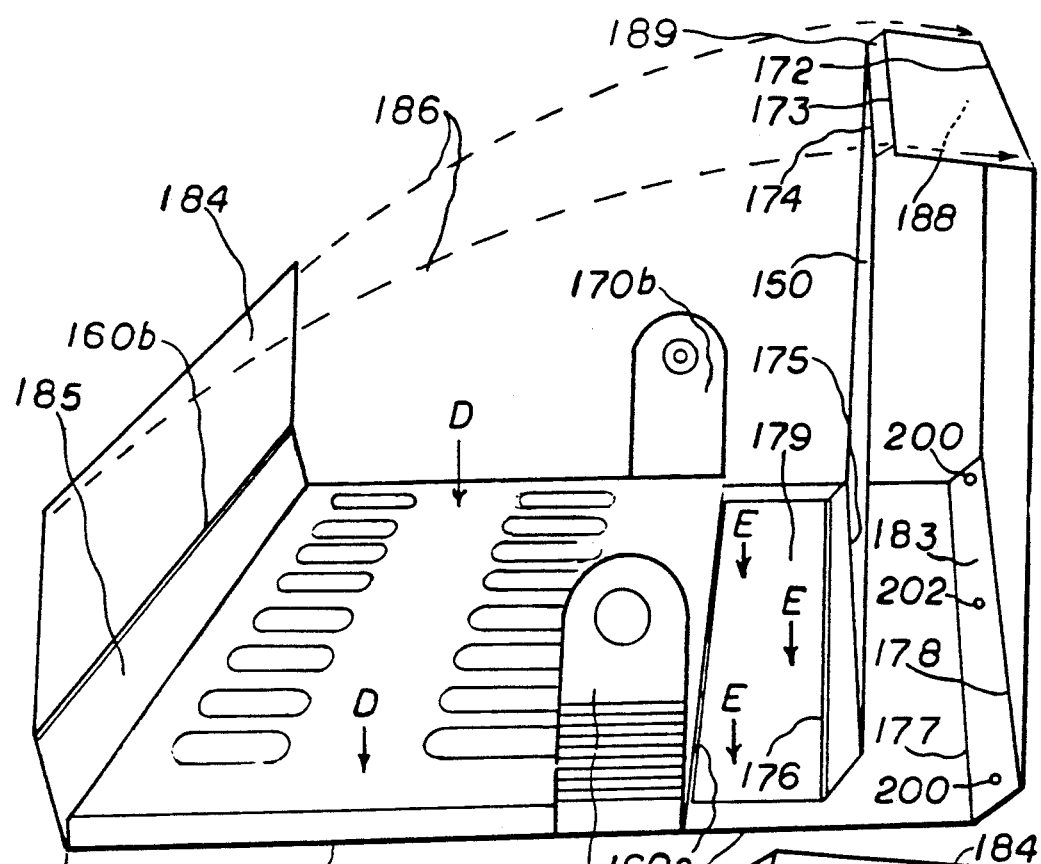
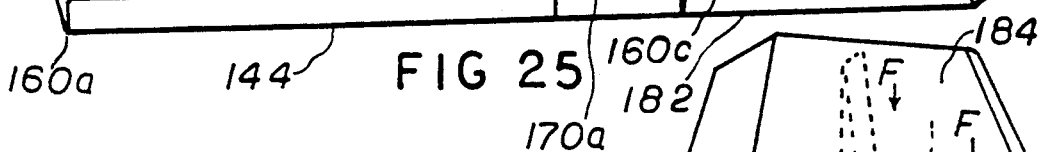
FIG 25
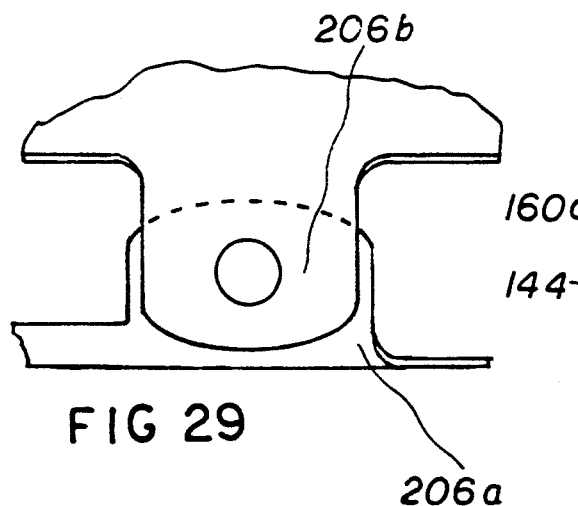
FIG 29
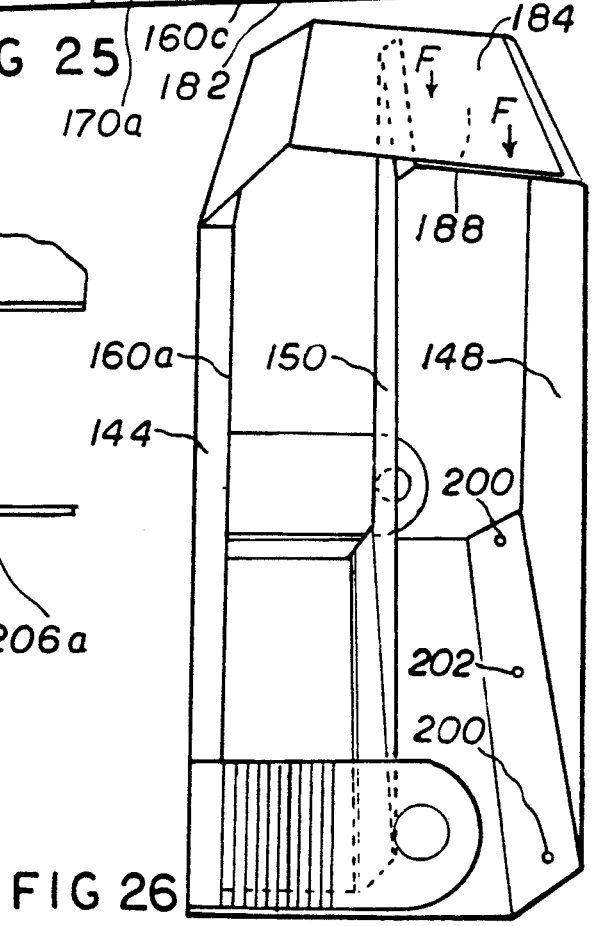
FIG 26

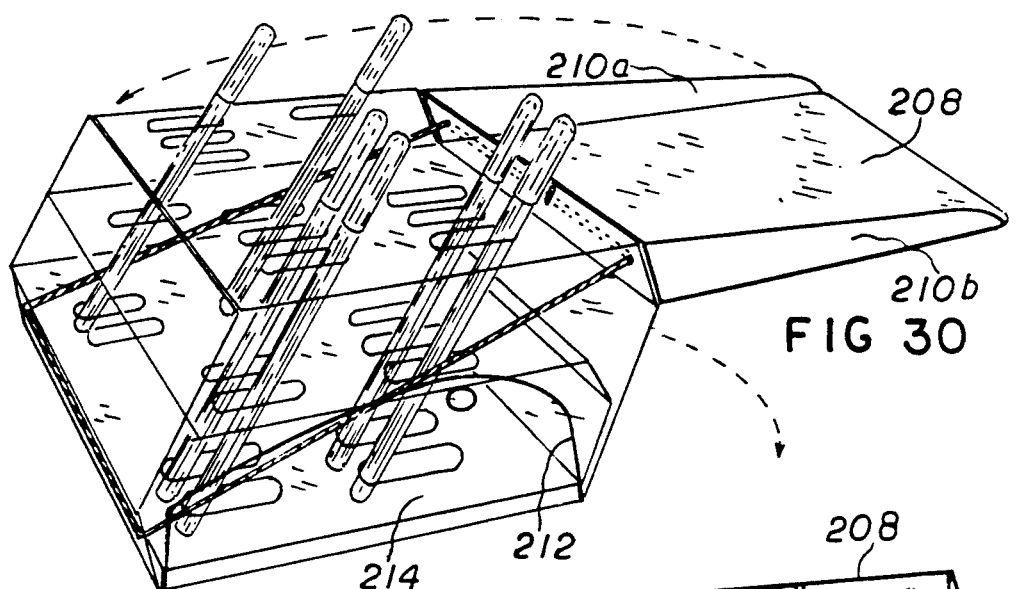
FIG 30
FIG 31
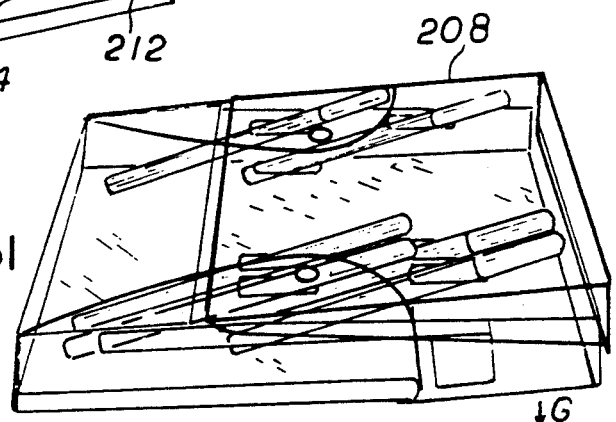
FIG 32
FIG 33
FIG 34
FIG 35
FIG 36
FIG 37
FIG 38
FIG 39

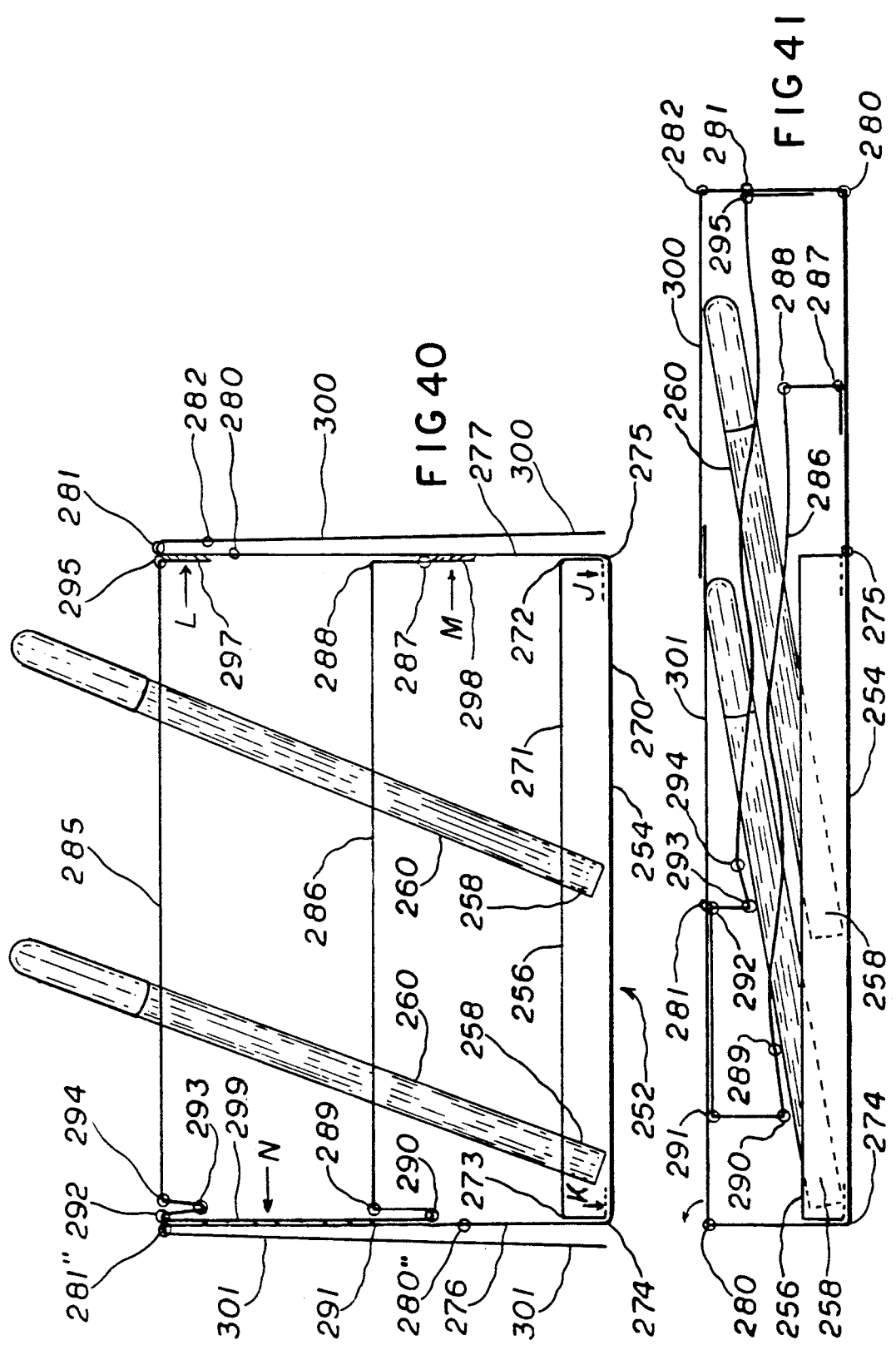

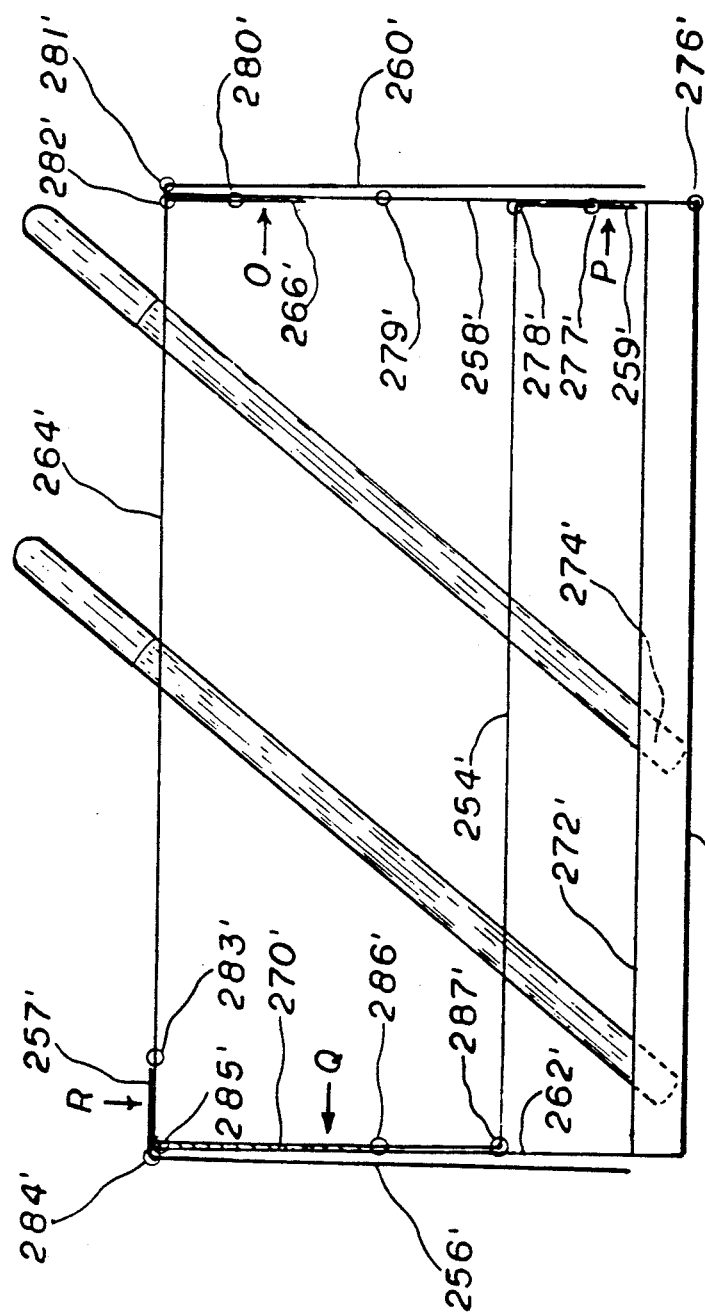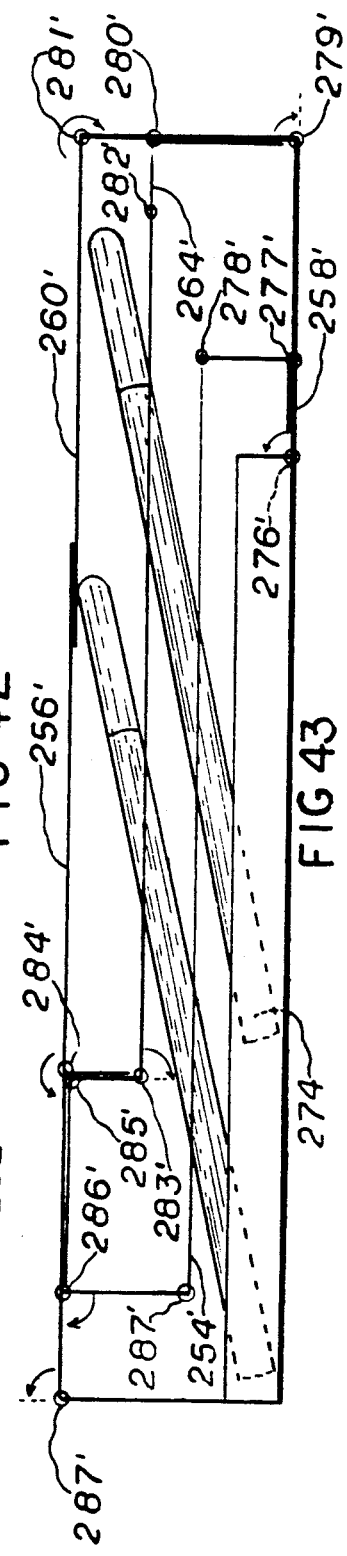

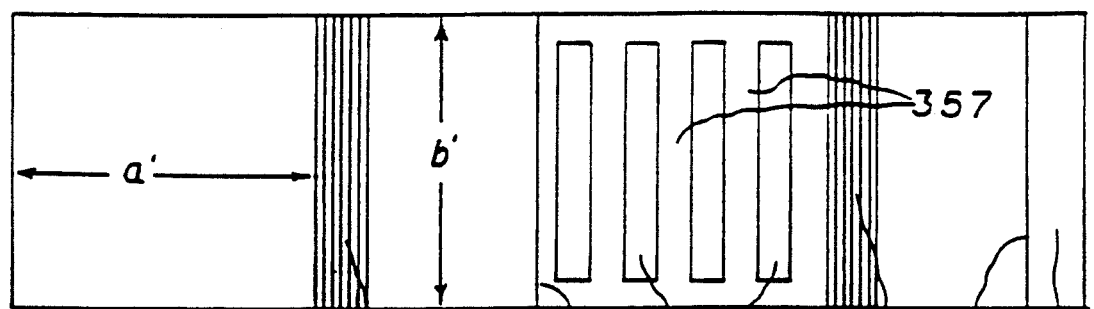
FIG 46
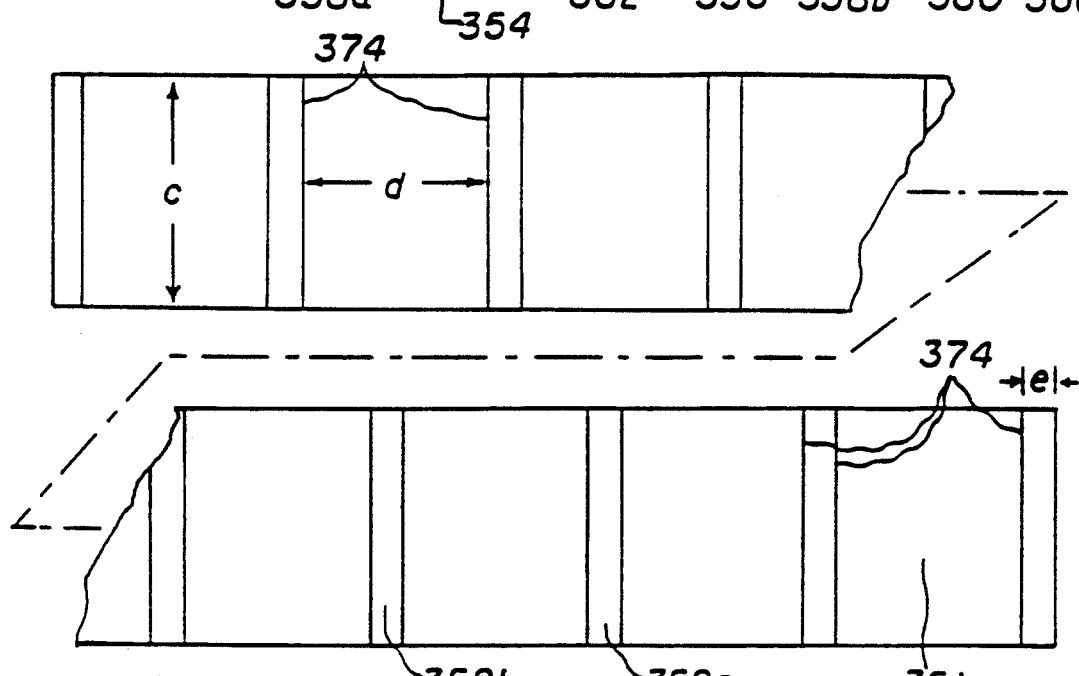
FIG 47
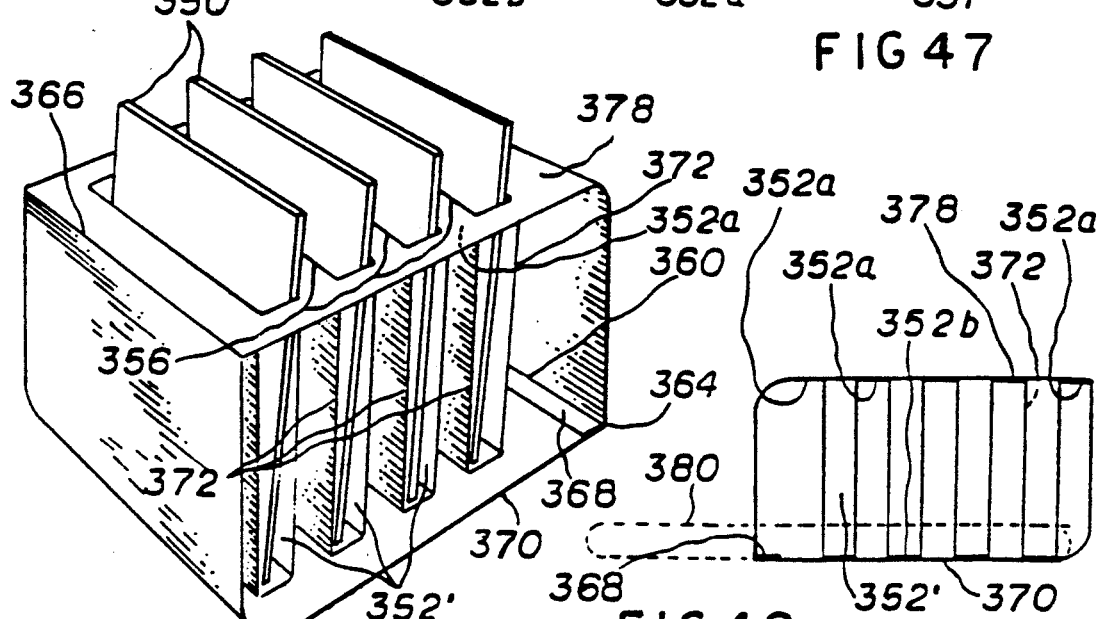
FIG 48
FIG 49

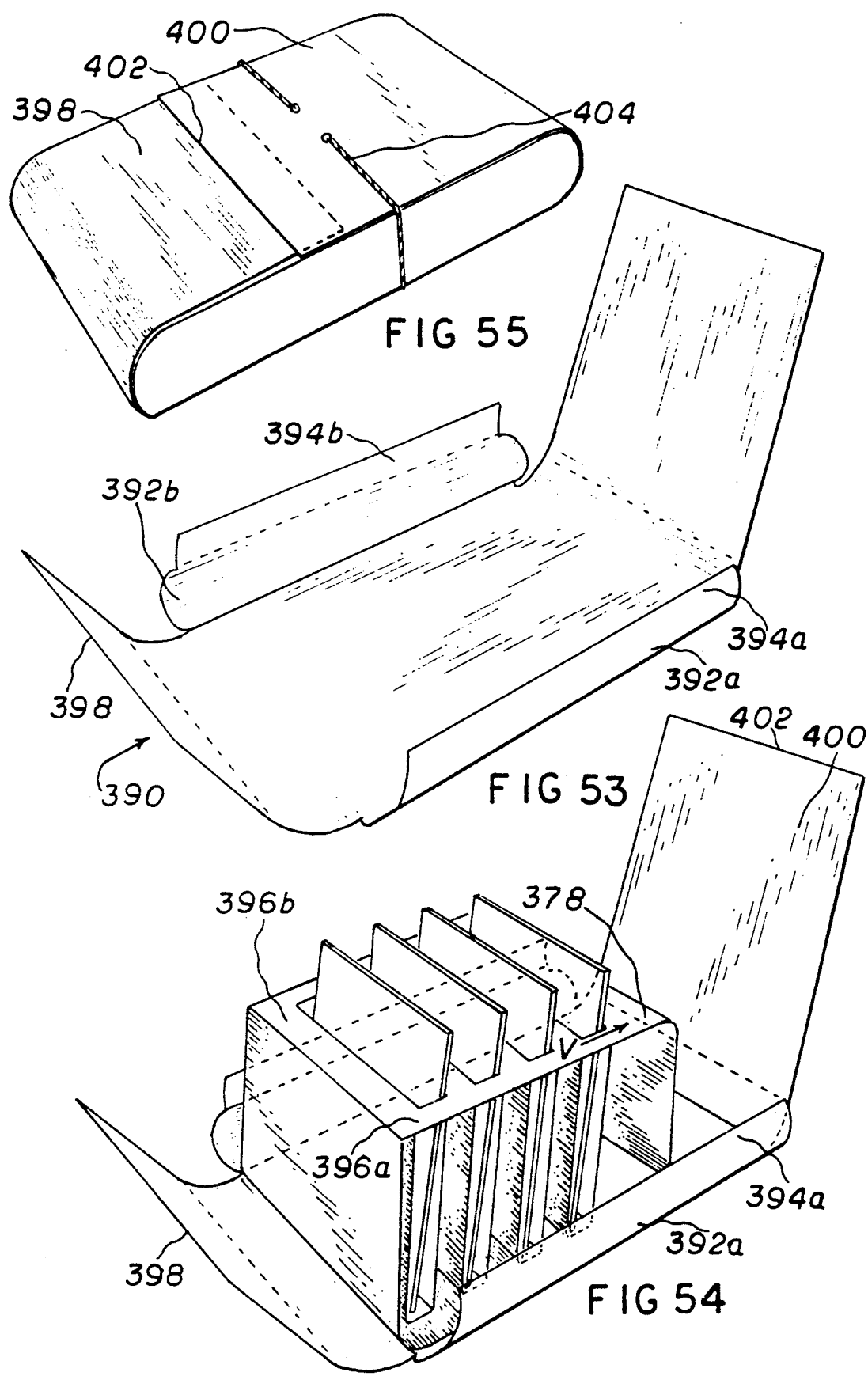

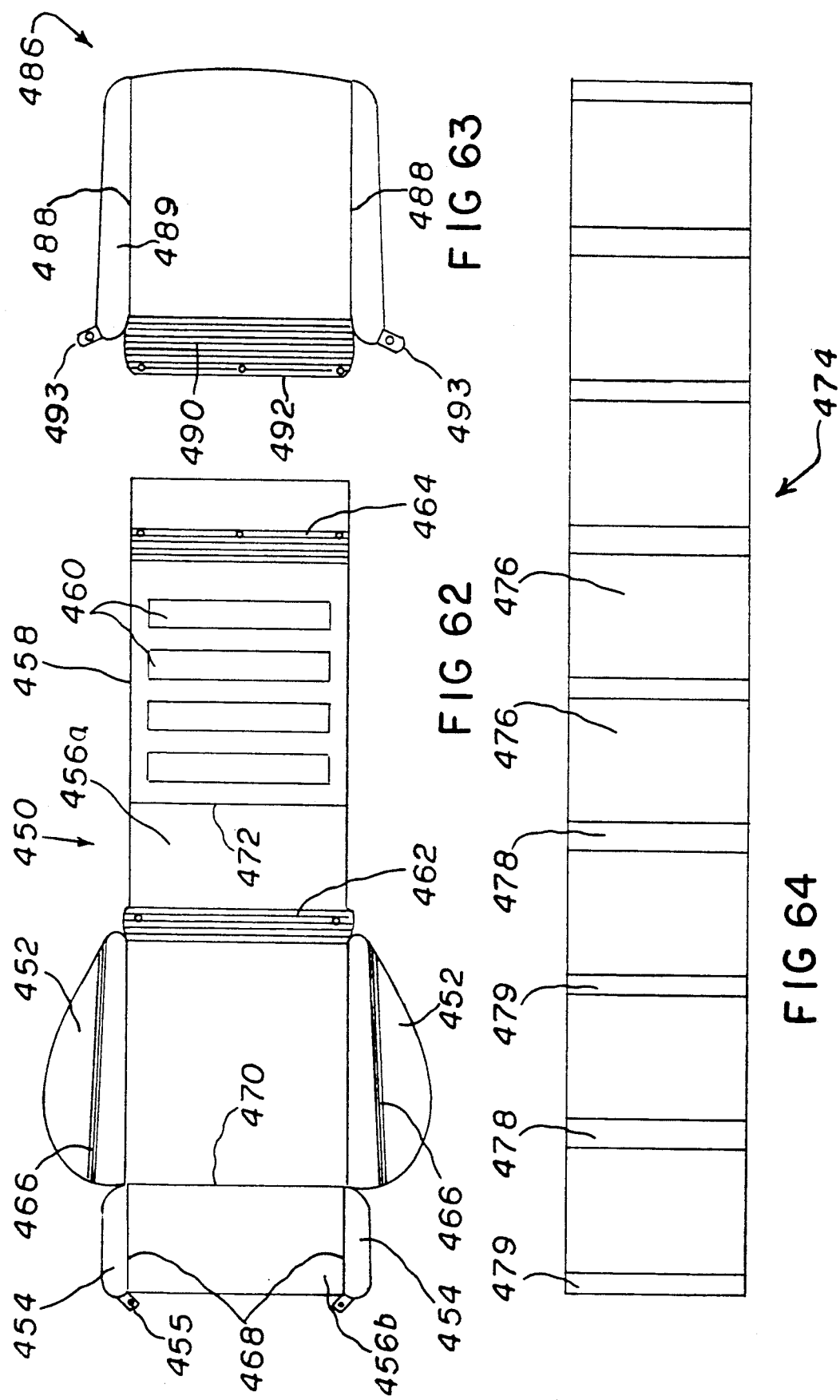

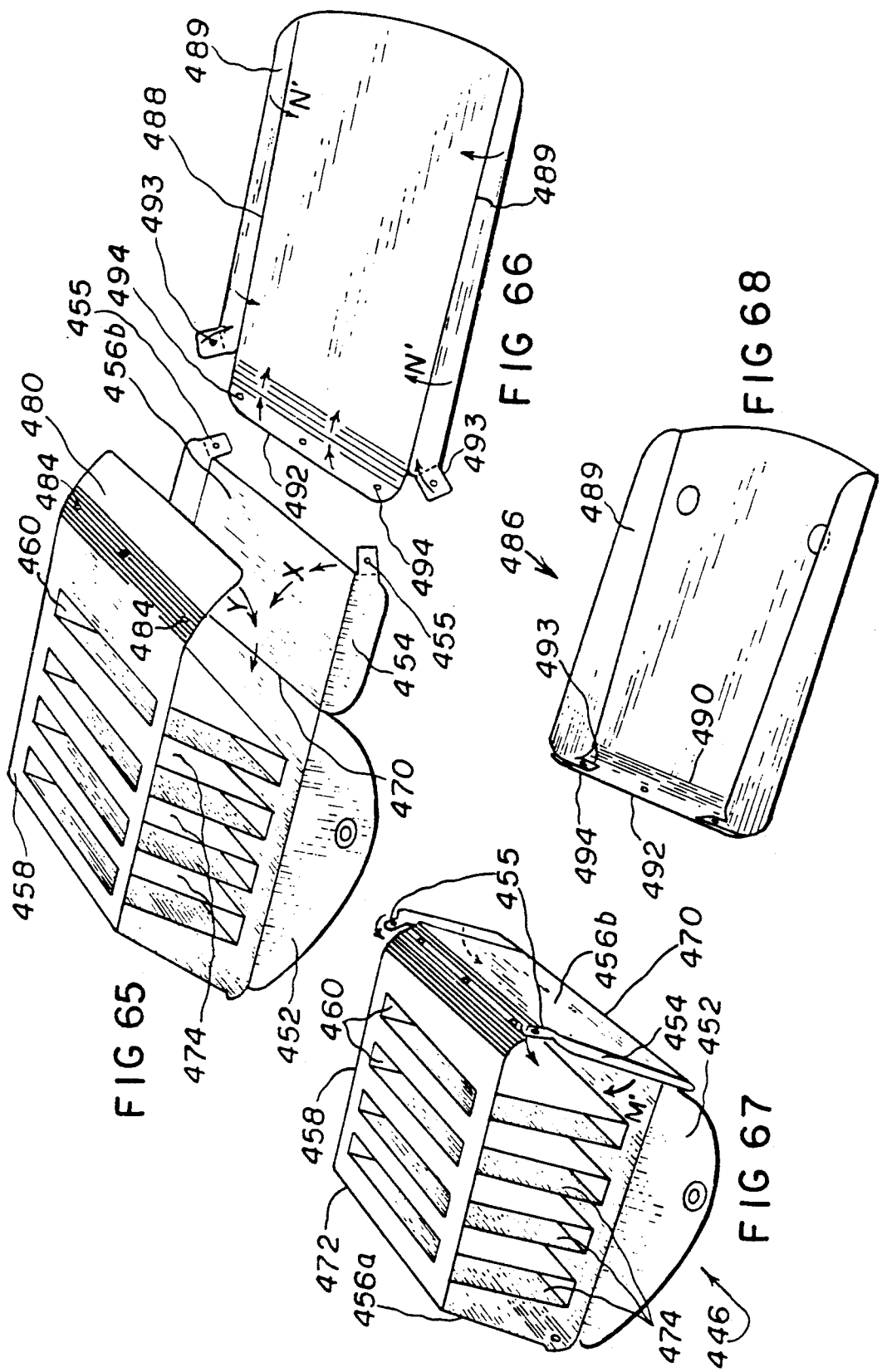

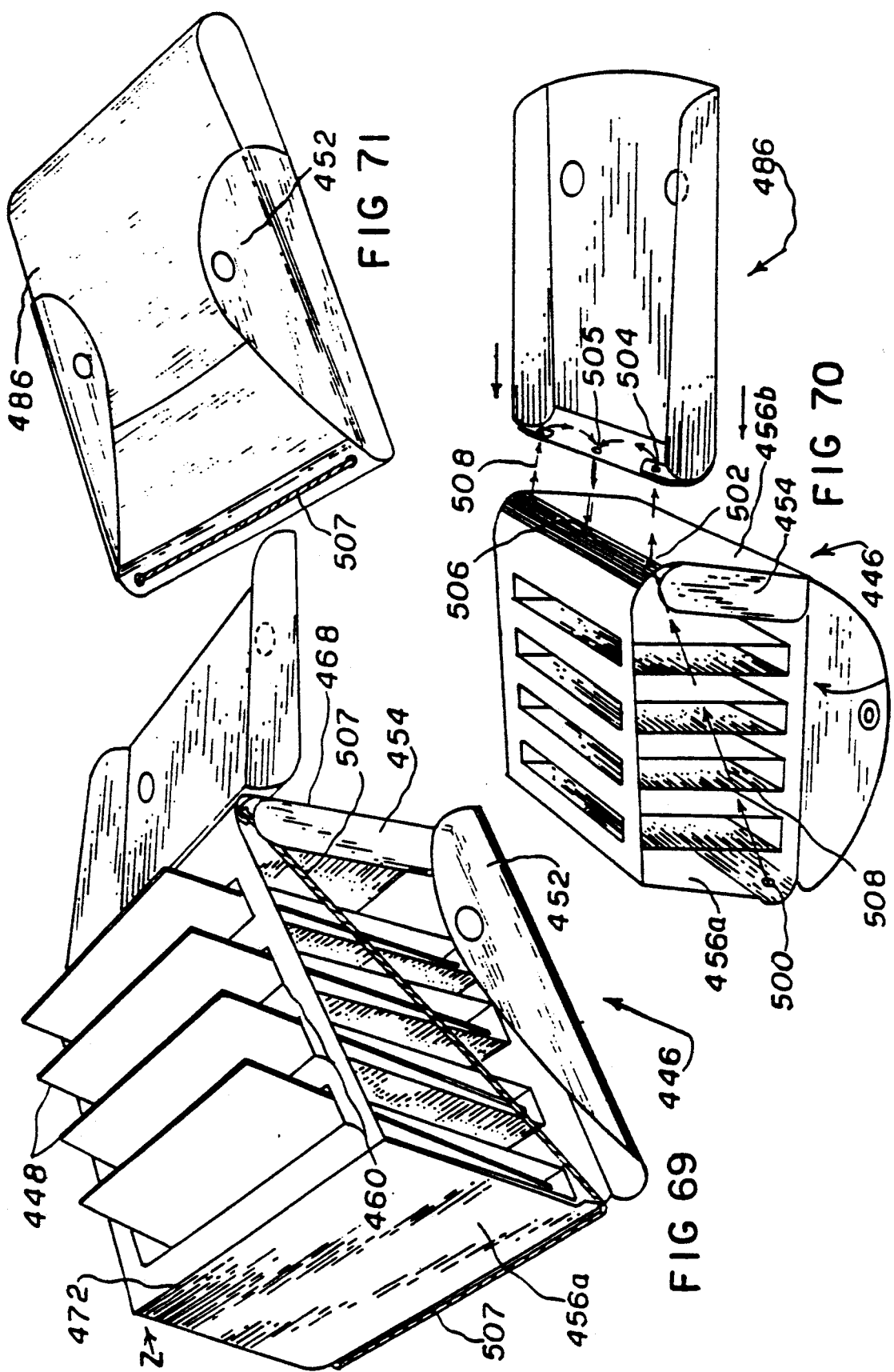

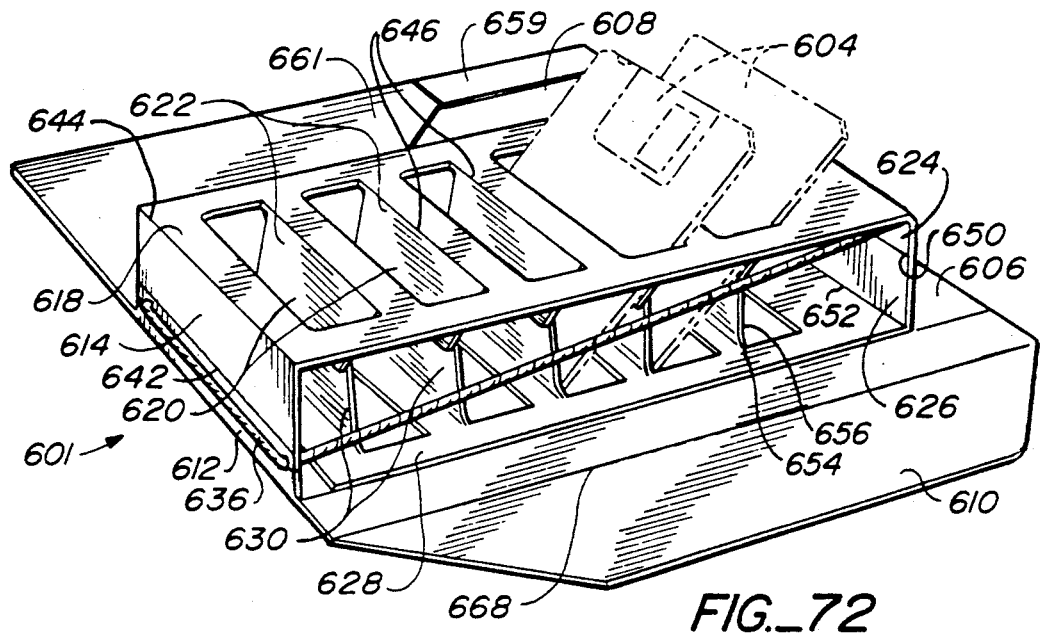
FIG._72
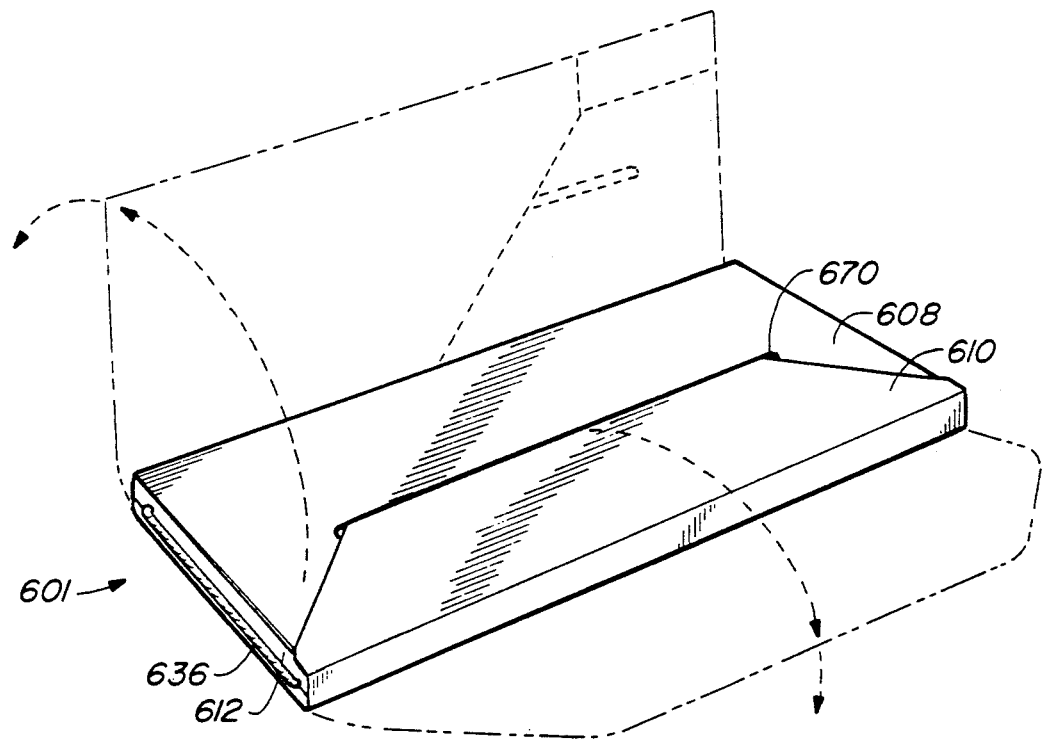
FIG._73

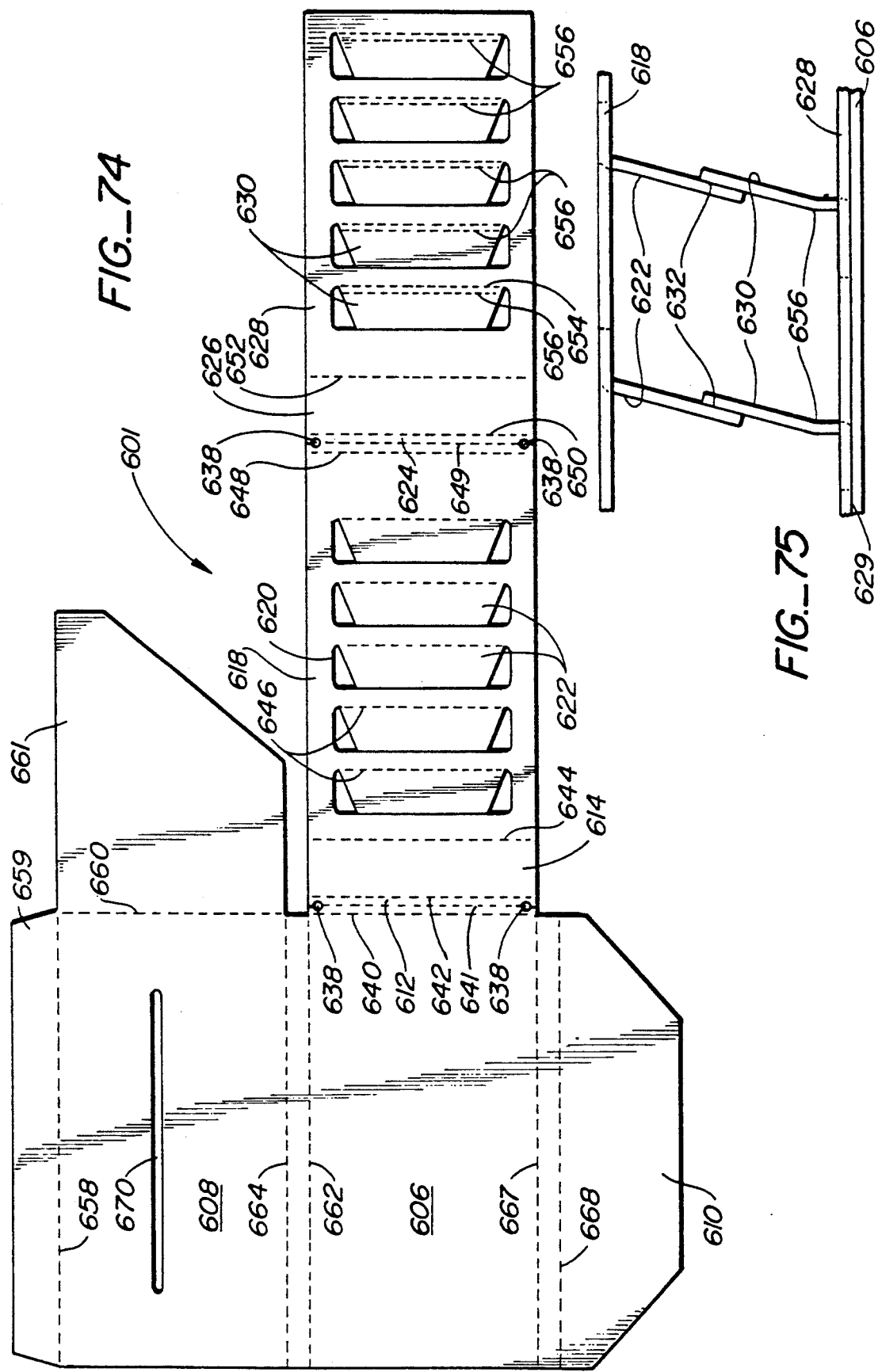

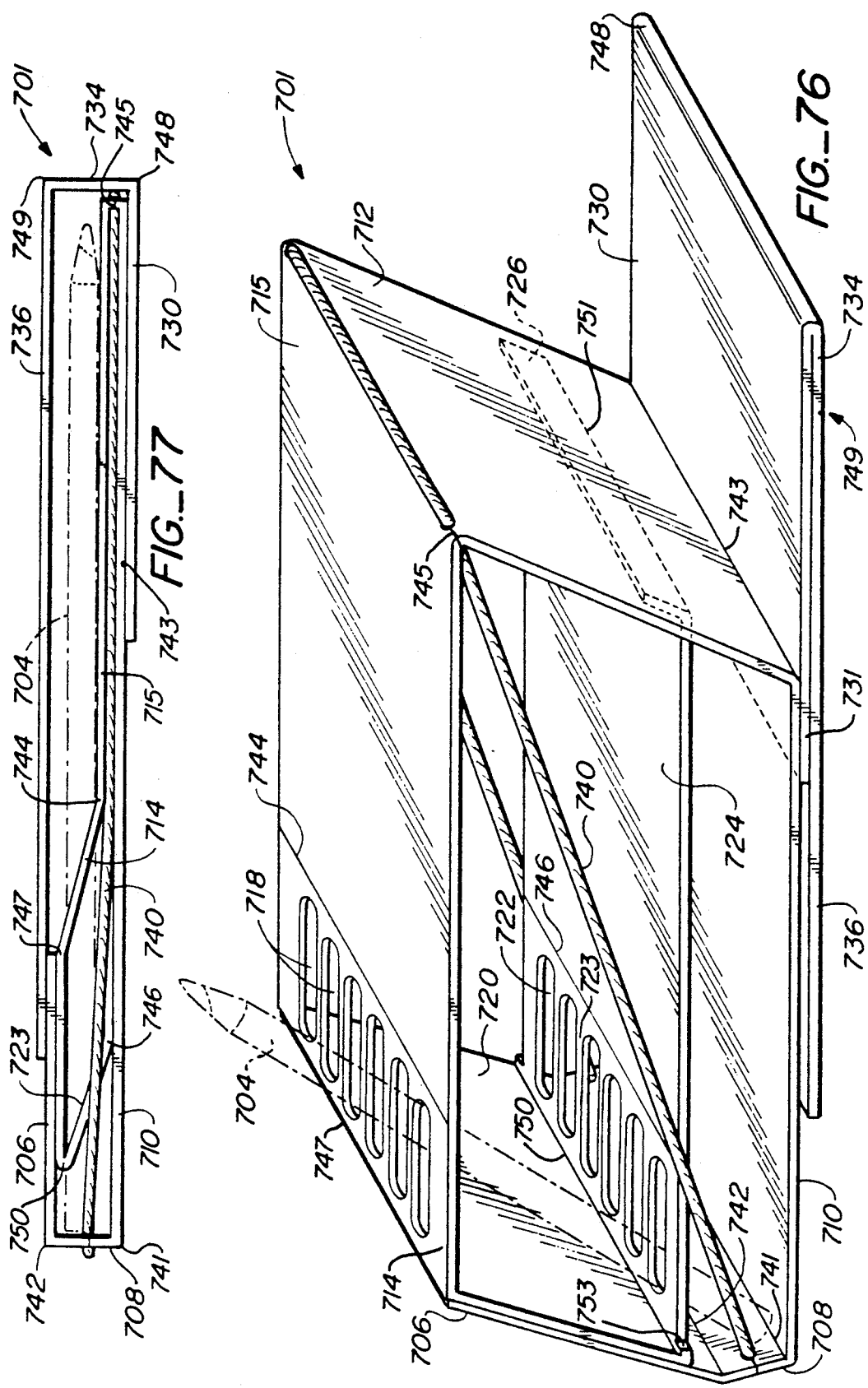

PACKAGING CASES INCORPORATING ELEVATING MECHANISM FOR DISPLAYING CONTENTS

This application is a continuation-in-part of Ser. No. 07/435,285, filed Nov. 13, 1989, now U.S. Pat. No. 4,947,984.

BACKGROUND OF THE INVENTION

The present invention relates to packaging cases, particularly to cases which can hold and present flat or elongated items for selection.

BACKGROUND—DESCRIPTION OF PRIOR-ART

In the past, displays and containers for flat and elongated items, such as pens, pencils, crayons, micro and floppy disks, cosmetics, credit, business and baseball cards, compact disks, cassette tapes, chopsticks, playing cards, money, paper, paint brushes and paint tubes, or any supplies or tools, coins, instant displays, and the like were designed primarily to package the item. Little attention was directed toward presenting such items to the user in a convenient way, i.e., to facilitate ready selection or ease of removal and replacement.

Pencil Cases and Cases for Other Elongated Objects

One type of pen and pencil case is made of wood (or plastic), is square in shape, has a plurality of holes drilled lengthwise in a base, and a lid on top. The holes are aligned in tight rows, i.e., five rows of five holes each, holding twenty-five pencils. In use, the lid is removed and the pencil box stood so that the pencils are pointed vertically. Selecting a color is confusing because of the close proximity of the pencils and hence their different colors. Extracting pencils is also a problem, as there is not enough room around each pencil for the fingers to grasp it. Replacement is likewise a problem, because the surrounding pencils make it very difficult to see and position the pencil In the appropriate hole. In general, the user must feel for the hole with the end of the pencil, which is not only time-consuming but also can result in the user's skin being punctured by the exposed sharp ends of other pencils.

Some pencil cases have elongated horizontal channels, one for each pencil. While these allow easier selection of color, removing the pencil is still hindered because the pencils are still very densely arranged.

Some pencil cases have a large horizontal channel into which numerous pencils are placed, making color selection difficult. Users tend to remove all the pencils and spread them out on a flat surface, resulting in waste of time and an untidy work space.

Pencils are sometimes packaged in a transparent plastic bag. Selecting a desired color requires fumbling through the whole package. Still others are packaged in cardboard cartons in a single layer, with pencils packaged side by side, making color selection a problem. Also, the cardboard tends to deteriorate and fall apart, requiring the user to improvise a container or keep the pencils in a loose state. Also because pens are not transportable in such prior-art cases, artists must buy more than one set of pens, which is expensive and which allows the pens to dry because of less frequent use and improper storage.

Prior-art packages for other elongated items, such as cosmetics, crayons, paint brushes, paint tubes, and the like, have similar problems. In addition to order and portability, items are not separated or protected properly, and there are problems with selection and removal. Also prior-art display cases used by travelling salespersons and the like are clumsy, bulky, and require setup time.

Technical Pen Sets

Attempts have been made to present sets of technical pens according to size variation, thereby making them quickly identifiable and easy to select. One pen holder, sold under the trademark MARSMATIC PARK SET, of Staedtler Co. of Los Angeles, Calif., consists of modules of circular shape, each of which holds one pen, and is expandable by joining each side-by-side. While these can be rotated to vary the angle of the pens held therein, they present the pens too closely packed for easy selection. Also it is difficult to see the pen size number and the holder is not transportable.

Another holder, sold under the trademark MARS GRAPHIC 3000 by the same company, consists of multiple rows of holes adjacent each other drilled in the end of a single square base, and mounted such that it lies at a stationary horizontal or vertical angle to best suit the user.

The problem here is that due to the closeness of the pens to each other it is very difficult to grasp the wanted pen. Also, it is very difficult or even impossible to read the size number of the desired pen. Another problem is the difficulty in replacing the pen back in the same hole without damaging the pen's hollow point, especially where the pens have very fine points which are easily bent and damaged. Further it is not transportable.

Another pen holder made by the above company stores the pens in horizontal channels, but these are too deep to remove the pens easily.

Graphic Pen Sets

Graphic pen sets are usually sold in vinyl wallets or art cases. In both cases, the pens are too closely packed for easy selection and extraction. Studio boxes are available to hold sixty pens, either vertically or at an inclined angle. Once again, the overcrowding causes selection and extraction problems. Moreover, such cases are not easily transportable, are bulky, and the pens dry out quickly because they are vertically oriented.

Artists tend to have more than one set of pens, which are expensive. This is because suitable pen carrying cases are not available, making it necessary to have one at home and one at work.

In sum, graphic pens and pencils have not been packaged to suit the needs of their users, who must often take them with them out into the field. Further, all are rather prosaic in appearance and operation.

Other Desk Top Accessories For Pens and Pencils

Desk-top pen holders tend to be of the single or multiple cavity type. In use, the contents tend to become a jumble of odd elongated pieces, such as pens, pencils, perhaps a small screwdriver, small brushes, and so forth. Thus users have difficulty in maintaining some sort of order with such holders.

Flat Objects

Objects such as 3.5" micro-disks, 5.25" floppy disks, compact disks, cards of any type, cosmetics, stationery paper, and the like are usually boxed and sold in containers. These are designed solely as a packaging container in which to transport and carry the objects home; they are not intended for later continuous use as a dispensing container. Thus these containers are usually discarded after the contents have been removed. However there are a number of holders available for on-the-desk use to support such objects in a more or less upright and separated manner, enabling the user to sort through them. One such holder consists of a trough arrangement which has a number of transverse dividers used to separate the disks, or groups of disks. Such an arrangement fails to protect the disks well or afford easy selection, making it an inadequate system for students, reporters, executives and other users of lap-top and other computers, who need to take disks along with them.

Another display unit consists of a number of vertical compartments which can be elevated individually, making it possible to present the disks so that their labels can be read. However, such display cases are bulky and cannot be slipped into a pocket, purse, or small briefcase. Still another display case has a single pocket which is hinged at the bottom to a base so that it can be laid down when not in use. Because there is only a single pocket, all the disks are carried together without sufficient separation or any means for distinguishing them readily.

Add-on File System For Computer Disks

Add-on file systems for computer disks consist of a plastic pocket to which additional pockets can be added. Each pocket assumes a position somewhat lower than the preceding one and forms a series of pockets which lean rearward, such that disk labels will be visible when disks are placed in the pockets. The problem with this system is that when more than one disk is placed in any one pocket, they can rub against each other and cause damage, and in addition one must fumble through to find a desired disk. Also when it has to be transported elsewhere, it is necessary to dismantle the unit entirely and reassemble it after shipping, a time-consuming procedure. Small Capacity Disk Files There are many designs for holding small quantities of disks. Each is slightly different, but none is readily transportable and all are prosaic. Typically they consist of an open lower box type base having a pocket type storage file hingedly attached to the base, which also forms a lid when the file is closed. When opened, the pocket is hinged upward, making the disk available to be searched for any particular disk. The problem with this file is that the disks are not separated from each other and so are subject to damage from rubbing and the environment. Also the user must search through to find the desired disk.

Loose leaf Disk Filing

One disk filing system comprises loose leaf pages with pockets, usually four in number, for the disks (3.5" or 5.25") and holes for mounting the pages in three-ring binders. Such units tend to be bulky and require time consuming searching to select the desired disk.

Maximum Capacity Disk Files

One model of a maximum capacity disk file comprises a base with files arranged at an angle for holding a plurality of disks. A hinged see-through cover is opened upward and rearward to expose the files. This model is bulky and requires a search to find the right disk.

Another compact file, although having nearly twice the capacity of similarly sized files, requires nearly twice as much time to locate a particular floppy disk or micro-disk. It has a roller type cover. There is no feature to prevent disks from contacting each other during transport or to protect against environmental damage.

Disk Trays

This system is similar to other systems that contain a tray with repositionable dividers, but also has an index card to assist in locating the required disk. It is not easily transportable.

Another file for 3.5" disks, sold under the trademark MEDIAMATE FLEXPACK, by Amaray of Redmond, Wash., consists of individual pockets connected to each other by a pair of parallelogram bars, enabling the pockets to be expanded apart and angled for easy selection and viewing. However this unit is too bulky for easy carrying, shipping, or desktop use. Also, if accidentally dropped, it flies apart, exposing the disks to damage.

Diagonal Files

In addition to the above difficulties with holders for pencils, papers and disks, holders for other flat objects have their own difficulties. Files which display their contents diagonally consist of a plurality of compartments, so arranged that the headlines and/or letterheads are readily visible. Those consisting of six or more compartments take up an inordinate amount of desk space. Such units cannot be used to transport paper work, and must be cleared off and packed for moving.

Common Vertical File System

A common type file system provides a plurality of movable vertical files spaced between fixed end supports, such that they can be adjusted for narrow or wide spacing for desktop use. However, they cannot be used as a packing container. Similar vertical file units are made with fixed vertical dividers but these do not display the headlines, nor can they be used for packing the sheets away during transport or shipping.

Single Column Stand

A single column stand consists of a single vertical column having a heavy weight on the bottom for stability. The top has a plurality of pockets, each positioned progressively higher than the preceding pocket, so that printed matter displayed therein will show the headlines, labels, or other identifying information. These stands can be easily knocked over and are also difficult to ship or transport.

OBJECTS AND ADVANTAGES

Accordingly, one object and advantage of the present invention is to provide a package for elongated or flat objects which displays and presents the contents immediately upon opening, either for immediate use, or as a selling advantage. Another object and advantage is to provide a product presentation case which is unique, amusing, and enjoyable to use. A further object and advantage is to provide a work unit in which the objects displayed are easily identifiable, easily selected, grasped, removed, and replaced.

Still another object and advantage is to provide a packing case which can also be used for storage (thus avoiding waste), which provides a protective covering for the contents, and which also doubles as a portable work unit for the users who need to take the product with them on the road. Another object and advantage of such a container is its suitability as repackaging for whatever goods and products it contains. Another object and advantage is to provide a universal size container for whatever goods it contains; for example, a container for pens suitable for most pens currently on the market. Another object and advantage is to provide a container for quick and easy transporting of many types of products.

Such a case/holder is essential for artists, de-signers, drafters, architects, students, business persons, computer users, and other users. We have realized through years of observation there is a definite need for a more organized work and leisure place, which is another object of the invention.

Pens and Other Elongated Objects

Another object of the present invention is to provide a penholder which keeps the pens in a horizontal position when closed and not in use, thereby to preserve moisture in the tips and to extend the life of the pens. Also the penholder is transportable, enabling the user to buy only one set of pens.

An object and advantage of the pen case/holder of the invention is to permit pen-and-pencil manufacturing companies to package their products directly in such cases, and also to color-code the individual holes, as well as to market the holder alone, without the pens or pencils. Pens can be removed or replaced at any angle. Another advantage is that such a holder would promote a tidy workspace, so that pens would not get lost, as well as keeping them in the best possible position for user convenience and long pen life. Still further objects and advantages are to provide a quick opening, and/or quick closing protective carryall for elongated objects such as pencils, pens, crayons, cosmetics, toiletries, chopsticks, cigarettes, cigars, tools such as jewelers files, chip carving tools, screwdrivers, artists' paint brushes, paint tubes, clay tools, sculpting tools, manicure equipment, in fact any kind of tools or products which are elongated and/or pencil-like in appearance or form.

Fla. Objects

A further object and advantage is to provide a compact, protective carrying case, that doubles as a workstand and instant display unit for many different products, such as, floppy, compact, and micro-disks, business, credit, playing and baseball cards, as well as paper money, photographs, magazines, notes, stationary, folders, brochures, etc, that need to be packaged, displayed, sorted, removed and replaced, filed, kept in order, kept confidential, delivered or received, transported, shipped etc. Another advantage is to provide a quick opening and closing case which can be used to organize such items and present them in a clean, easily accessible, and impressive manner. Also to establish appointment times, phone numbers or other information, business cards or other markings can be stored, making them ideal for use at conventions and trade shows.

Credit cards also can be displayed quickly and effectively in a case/holder of the present invention. Also case/holders for credit cards can have a receipt and paper money pouch for superior organization. Furthermore, magnetic strips are protected and the case/holder can be carried in a shirt pocket, wallet or anywhere. The case/holder of the invention also allows cash money, coins, and travellers' checks to be organized for greater efficiency and quicker transactions. Money and travellers' checks can be separated according to denomination. Checks can be separated by numbers. Due bills can be separated by categories and can be labeled, as can receipts. Coins can be held for laundry, bus fares, parking meters, vending machines, collections, and storage.

Computer Disks, Compact Disks, and Cassette Tapes

Computers today come in many small sizes, including portable, laptop, and the new miniature variety called the pocket book computer, which uses a two-inch, credit-card-size disk. Computers and compact disk or tape players are increasingly being used at work, school, home, travelling, and in the car. The case of the present invention will add to the user's convenience by providing an improved means of transporting disks and cassettes for all computers and compact disk and tape players. Such a combined case and holder could serve as a promotional item for a software company. Labels are easy to see and the computer disks are kept anti-static, clean and systematic. Also, a special lead or other lining could be added to the case to protect the computer disks magnetic field when passing through an x-ray machine.

Instant Displays

A further object and advantage is to provide an instant display case for traveling salespersons, sales representatives or demonstrators of products of appropriate sizes and shapes, such as those in the cosmetic field and the like. When closed, the case/holder is compact. When opened, the goods are beautifully displayed and organized with no set-up time.

Personal Cosmetics

As many people carry cosmetics with them, a further object and advantage is to provide a universal case/holder which can be used to hold most eyeliners, pencils, lipsticks, mascaras, blushes, brushes, bottles, tubes and jars of foundation, eyeshadow, concealer and like products, as well as bobby pins, toiletries, scents, tampons, toothbrushes, toothpaste, hair sprays, etc. By keeping these items organized, there is no need to fumble, especially when on the go, in the car, bus or public bathroom. Also the case will keep the cosmetic items sanitary.

Baseball and Other Sports Cards

Many children and adults collect baseball cards, which can be readily carried, stored and displayed in the case/holders of the present invention, according to teams, positions played and the like. Collectors can bring their cards to games and elsewhere for trade and other purposes. Collectors of kinetic 3-D cards can arrange them so that, by releasing the holder, the card will show the athlete in action.

Games, Toys, Kits and Playing Cards

Another object is to provide a package for games, toys, and kits which may amuse and delight children while encouraging them to be orderly and return things to their places. The package itself can serve as a game, toy, or kit. Playing cards placed in the holder remain confidential. Also, young, old and handicapped users (including amputees) may be able to use the holder to keep the cards displayed without having to hold them.

Paint Brushes and Paint Tubes

A further object and advantage is to provide a portable case/holder for artists paint brushes and tubes, allowing the artist to arrange paint tubes by color and to arrange several brushes according to need and to separate them sufficiently to avoid color contamination. The case/holder is equally suitable for indoor as well as outdoor use.

Medical, Dental, Barber and Similar Instruments

Yet another object and advantage is to provide a case/holder for the tools and instruments of the medical, dental, hair cutting, and manicuring professions. Still further objects and advantages are to provide a case/holder which is universal in its simplicity, allowing it to be used widely for the packaging of many different types of products.

Another advantage is to provide a case with a modular construction, which allows variation in the number and types of items which can be packaged, according to need. Additionally, the case/holder of the invention prevents losses of parts or items, because each item fits in its place, and missing items become conspicuous by their absence. As a means of storage and shipping, it is compact, stackable, and durable. As an item of manufacture, it is lightweight, easy and inexpensive to produce, due to the relatively few parts, all of which can be mass produced. Additionally, manufacturing is simplified by novel assembly means and ultrasonic welding, riveting, gluing or any other suitable means.

The case/holder is especially adaptable in that it can be kept and/or used on tables, floors or elsewhere, in briefcases, purses, backpacks, shirt pockets, or on car seats, counters, park benches etc. It can be carried in the hand, or over the shoulder with a strap or even with a belt hook. Because it determines correct replacement of items, it promotes neatness and accuracy in use. It is convenient, self-contained, readily portable, and requires no special preparation or packing.

Further objects and advantages of our invention will become apparent from a consideration of the drawings and ensuing description thereof.

Summary of the Invention

BRIEF DESCRIPTION OF THE DRAWINGS

FIG. 1 is a perspective view of a pencil case according to a basic embodiment of the invention and FIG. 2 is a perspective detailed view of encircled portion of FIG. 1.

FIG. 3 is a perspective view of a second embodiment of a pencil case/holder having a solid base with three separate vertical partitions hinged transversely therein.

FIG. 4 is a perspective view of the pencil case/holder of FIG. 3 when folded.

FIG. 8 is a plan view of the base of the case/holder.

FIG. 9 is a side view of a vertical partition used in the case holder.

FIG. 10A is a plan view of a portion of the lower horizontal shelf, and

FIG. 10B is a plan view of a portion of the top horizontal shelf used in the case/holder.

FIG. 11 is a perspective view of a third embodiment of a case/holder in which the end partitions support vertical shelves.

FIG. 12 is a perspective view of the folded case/holder of FIG. 11.

FIG. 13 is a fourth embodiment of a pencil case/holder which provides cover flaps to cover the pencils when folded.

FIG. 14 is a sectional view along the line of 14—14 of FIG. 13.

FIG. 15 is side view taken in the direction of arrow C of FIG. 13.

FIG. 21 is a plan view of the base and upper and lower shelves of the case/holder of FIG. 20.

FIG. 22 is a plan view of a base filler used in the case/holder of FIG. 27.

FIG. 23 is a plan view of a base overlay used in the case/holder of FIG. 27.

FIG. 24 is a plan view of a cover lid used in the case holder of FIG. 27 and/or 30.

FIG. 25 is perspective view of the final step during construction.

FIG. 26 is a perspective view of the case/holder after the construction step shown in FIG. 25.

FIG. 29 is a side view of an alternative snap used in folding case/holders, such as FIG. 27 and 30.

FIG. 30 is a perspective view of a case/holder with integral sides.

FIG. 31 is a perspective view of the case/holder of FIG. 30 when folded.

FIG. 32 is a sectional view of a base construction having a lower and upper face and hollow center.

FIG. 33 is a sectional view of an alternative base construction in which a filler replaces the hollow center of FIG. 32.

FIG. 34 is a sectional view of an alternative base construction in which the upper and lower faces are separate pieces of material.

FIG. 35 is a sectional view of an alternative base construction in which a filler is placed between the faces.

FIG. 36 is a sectional view of an alternative base construction in which a filler is used as a base member.

FIG. 37 is a sectional view of an alternative base construction in which the filler has an overlay and the lower face is extended up the sides.

FIG. 38 is a sectional view of an alternative base construction in which the lower face is extended upward and inward over the top edges of the upper face.

FIG. 39 is a sectional view of an alternative base construction in which a solid member is used as a base.

FIG. 40 is a side view of a sixth embodiment of a case/holder for elongated objects.

FIG. 41 is a side view of the case/holder of FIG. 40 when folded.

FIG. 42 is a side view of a seventh embodiment of a case/holder for elongated objects.

FIG. 43 is a side view of the case/holder of FIG. 42 when folded.

FIG. 46 is a plan view for the construction of a microdisk holder, base, and horizontal shelf.

FIG. 47 is a plan view for the construction of a zig-zag insert.

FIG. 48 is a perspective view of a micro-disk case/holder and

FIG. 49 is a side view of the case/holder of FIG. 48.

FIG. 53 is a perspective view of a cover for a microdisk case/holder.

FIG. 54 is a perspective view of a disk case/holder of FIG. 48 fitted to the cover of FIG. 53.

FIG. 55 is a perspective view of the case/holder of FIG. 54 when folded.

FIG. 62 is a plan view for the construction of a second embodiment of a micro-disk holder.

FIG. 63 is a perspective view of a cover lid for the holder of FIG. 62.

FIG. 64 is a plan view of a zig-zag insert for the case holder of FIG. 62.

FIG. 65 is a perspective view of a partly assembled case/holder of the micro-disk holder of FIG. 69.

FIG. 66 is a perspective view of a cover lid for the case/holder of FIG. 69.

FIG. 67 is a perspective view of a partly assembled case of FIG. 69.

FIG. 68 is a perspective view of a cover lid ready for attaching to the case/holder of FIG. 67.

FIG. 69 is a perspective view of the case holder completed.

FIG. 70 is a perspective view of the case/holder prior to completion showing elastic threading directions.

FIG. 71 is a perspective view of the case/holder of FIG. 69 when folded.

FIG. 72 is a perspective view of a one-piece case/holder for flat items, in the opened position.

FIG. 73 is a perspective view of the case holder of FIG. 72 in the closed position.

FIG. 74 is a plan view of FIG. 72 before assembly.

FIG. 75 is an exploded view of the welding/gluing assembly arrangement of FIG. 72.

FIG. 76 is a perspective view of a one-piece case/holder for elongated objects in the opened position.

FIG. 77 is a side view of FIG. 76 in the closed position.

DESCRIPTION OF THE PREFERRED EMBODIMENTS

Description—FIG. 1—Pencil Case

Figure 5:
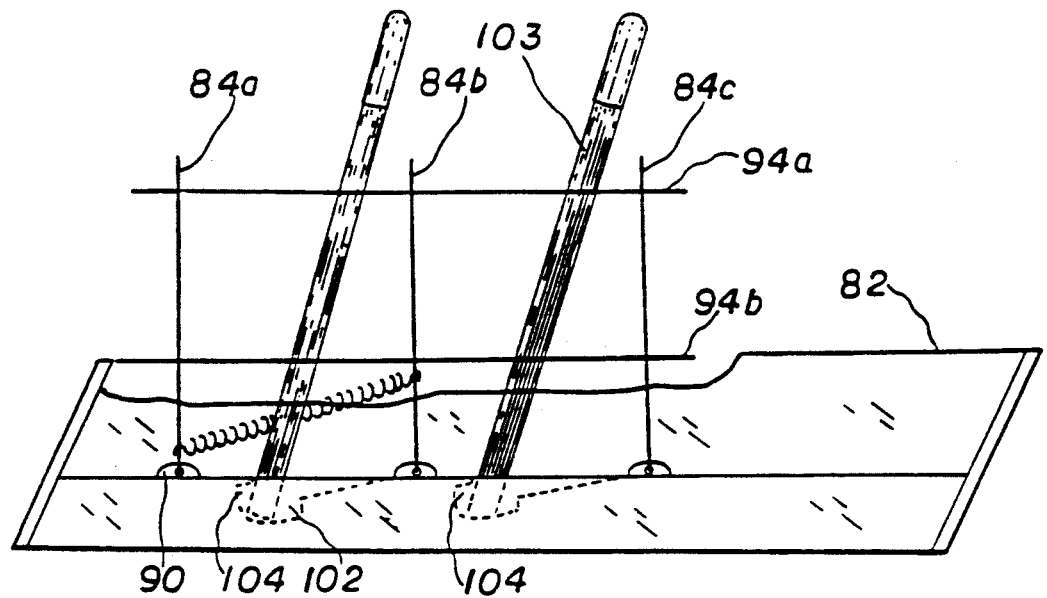
FIG. 5 is a side view of the case/holder opened.

FIG. 1 shows a pencil case according to a basic embodiment of the invention. The case comprises a base, a plurality of spaced vertical partitions whose bottoms are hinged to the base, and a plurality of spaced horizontal shelves which are hinged or connected to the partitions. The shelves have an array of slots for pencils or the like. When the partitions are upright, the case is open and the pencils are held upright for display and easy selection. When the partitions are folded down, the pencils are horizontally positioned to provide a compact, closed carrying arrangement.

Specifically, the case comprises a base 50 made of flexible material, e.g., vinyl. An underlay of transparent flexible plastic sheeting 52, such as vinyl, extends to the right and left of base 50 to form covers 54 and 56. These covers are folded up and together, so that they overlap when the case is closed. Base 50 supports three vertical and movable partitions 58a, 58b, and 58c. These partitions are hingedly attached by any convenient method to the top surface of base 50. E.g., the partitions may be hinged by scoring and folding a strip 60 at the bottom of partition 58a, and welding it to base 50, or by a flexible cloth hinge 62 for partition 58b. No hinge is shown for partition 58c, but all three partitions preferably are hinged in the same manner.

Vertical partitions 58a, 58b and 58c each have two parallel slots 66a and 66b as shown in the exploded phantom showing of vertical partition 58a. These slots mate with similar slots 59a, 59b, and 59c in each of two horizontal shelves 68a and 68b, as shown clearly in the exploded phantom showing of horizontal shelf 68b.

When the horizontal shelves and vertical partitions are assembled in the directions of arrows K and L, respectively, each intersection forms a joint which is able to hinge and angle easily.

Sheet 52 is attached to the ends of horizontal shelves 68a and 68b by weld-on tabs 70 (See FIG. 2, an enlarged view of area 2—2 of FIG. 1) or any other convenient method. An array of elongated slots 72a and 72b (FIG. 1) are cut into, upper and lower horizontal shelves 68a and 68b and base 50. This array may comprise four rows of seven slots each, with each slot being about 40 mm×10 mm (1.5"×0.375"). When partitions 58a–58c are vertical, these elongated slots will be spaced vertically in line above each other and can receive a pencil therethrough.

In lieu of the twenty-eight sets of elongated slots shown, any other number can be used, each of which can receive a pencil, pen or any other elongated item, such as cosmetics, paint brushes, etc. Elongated slots 72a and 72b, and 69 are about four times longer than the thickness of the pencils or other objects (not shown) that it occupies. The extra length allows the pencils to lie down in the slots when the pencil case is folded down and ends 54 and 56 of sheet 52 are overlapped on top.

The operation of the case of FIGS. 1 and 2 will be described infra in conjunction with other case/holders under Operation of Case/Holder for Elongated Objects.

Non-flexible base case/holder—FIGS. 3-10B

FIG. 3 shows a pencil case/holder in which a base 80 is made from any suitable solid material, such as injection molded, cast, die-cut, or thermoformed plastic, foam, or any other suitable material. It is surrounded by a transparent plastic wall 82, or any other covering. The case has three vertical partitions 84a, 84b, and 84c. Each partition is hinged transversely to base 80 and the partitions are spaced about 65 mm (2.5") apart. Such spacings can be effected by any suitable means, such as by numerous integral projections or feet 86 (FIG. 9) at bases 88a–88c (FIG. 3) of the partitions. Projections 86 fit into holes or indentations in cooperating projections 90 attached to or integral with base 80 (FIGS. 3, 4, 7, and 8).

Each section of each vertical partition has upper and lower support shoulders 92a and 92b as shown in FIG. 9. Each partition comprises four spaced elongated vertical sections 99 which mate with four respective slots 96 and 98 in two horizontal shelves, 94a and 94b (FIGS. 10a and 10b). The lower shelf has wide slots 96 (FIG. 10A) to fit down onto lower support shoulder 92b (FIG. 9), and the upper shelf has narrow slots 98 (FIG. 10B) to fit down onto upper shoulder 92a (FIG. 9). Each shelf is retained in position on its support by non-return barbs 100. Sixteen elongated slots 101 are cut into each shelf 94a and 94b, half of which is shown in 10a and half in 10b. Sixteen depressions 102 are cut into base 80 (FIGS. 3, 5, and 8), such that when the partitions are standing in a vertical position, the elongated slots will be spaced apart and those in upper and lower shelves will be directly above respective depressions 102 (FIG. 3).

Figure 6:
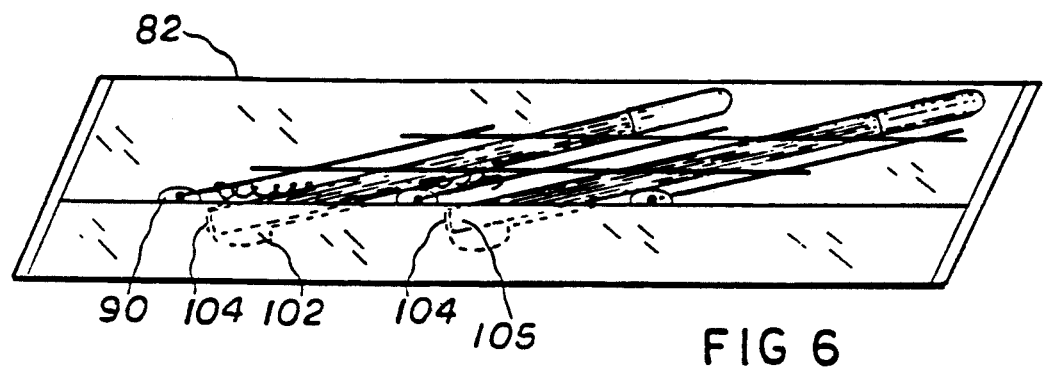
FIG. 6 is a side view of the case holder folded.

Thus it will be seen that sixteen pencil-like objects 103 (FIG. 3) can be placed in and down through the elongated slots 101 and will remain in a standing or inclined position as shown in FIGS. 3 and 5. When partitions are lowered or rotated forward and down to a compact position, the pencils will also lie in similar orientation, as shown in FIGS. 4 and 6. In order to prevent the lower end 105 of the pencils from coming out of depressions 102, these may be undercut slightly, as shown by broken line 104 (FIGS. 5, 6 and 8).

Figure 7:
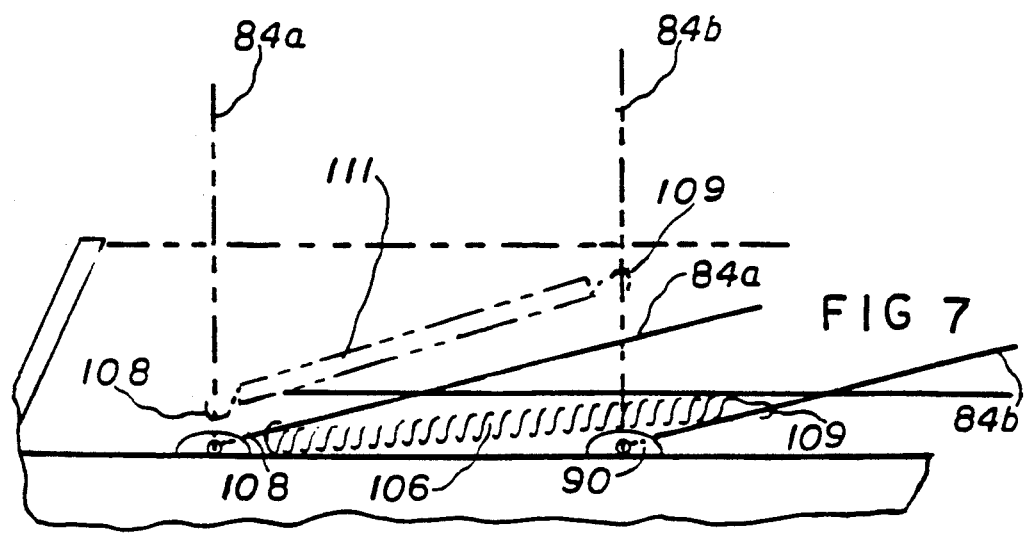
FIG. 7 is a side view which details the operation of a spring in the case/holder.

Spring Mechanism—FIGS. 3 and 7

A wrap-around cover (not shown) of any suitable type may be used to hold the case in its compact horizontal state. A tension spring 106 (FIGS. 3 and 7, or any other spring or elevating mechanism), which has one end connected to a lower part 108 of partition 84a and its opposite upper end connected to middle part 109 of adjacent partition 84b, urges the partitions to their upright position. The position of the spring when the partitions are upright is shown at 111. When the cover is removed, spring 106 will raise the partitions upright so that the pencils will automatically stand up for use and/or display.

Single Sheet Transparent Case/Holder—FIGS. 11 and 12

FIG. 11 shows a third variation of the construction of the invention in which the case/holder is made from just one transparent sheet 110. A base member 113 is made of polyethylene, polypropylene, or any other suitable material by bending sheet 110 at the following ten points: 115a to 115j. Sheet 110 thus forms both the partitions and the shelves.

In order to construct the case/holder of FIG. 11 a length of suitable material about 178 mm (7") wide is started at a proximal point 114 and sloped downward to form partition 118a. At score line 115a it is bent inward and downward to form second part, partition 118b, then at score line 115b it is bent to form horizontal plane 118c. At score line 115c it is bent upward to form partition 118d, and at score line 115d it is bent to form second part, partition 118e. At score line 115e it is bent to form horizontal shelf 118f, where score line 115f meets proximal point 114 and is bent downward to form plate 118g which is welded to the inside part of partition 118a. At score line 115g it is bent downward to form leaf 118h. At score line 115h it is bent to form lower horizontal shelf 118i. At score line 115i it is bent downward to score line 115j where it forms leaf 118j. At score line 115j it is bent downward to form plate 118k which meets partition part 118d and is welded in the direction of arrow J.

A base member 113 is scored and bent at the following eight points: 117a to 117f (117g and 117h not shown) to form tabs 119a–119d (119d not shown) which are welded to horizontal plane 118c. When the case/holder of FIG. 11 is folded in the direction of arrow P', which is imprinted on shelf 118f, the second parts of partitions 118b and 118e become end sections 125a and 125b of the folded case/holder, clearly shown in FIG. 12. A spring or elastic cord is not needed to elevate the case and pencils 112 into a standing position, as this can be done by hand.

Case/holder With Base Channel—FIGS. 13-18

Figure 17:
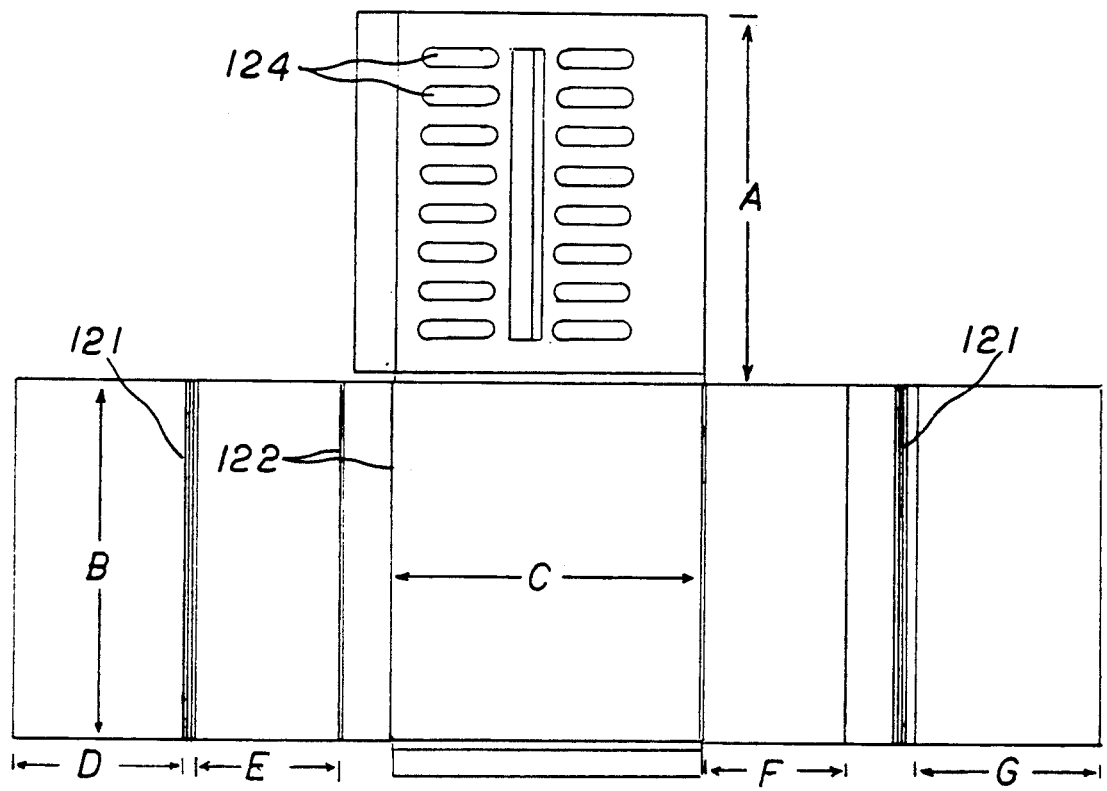
FIG. 17 is a plan view of the base part of the case/holder of FIG. 13.
Figure 18:
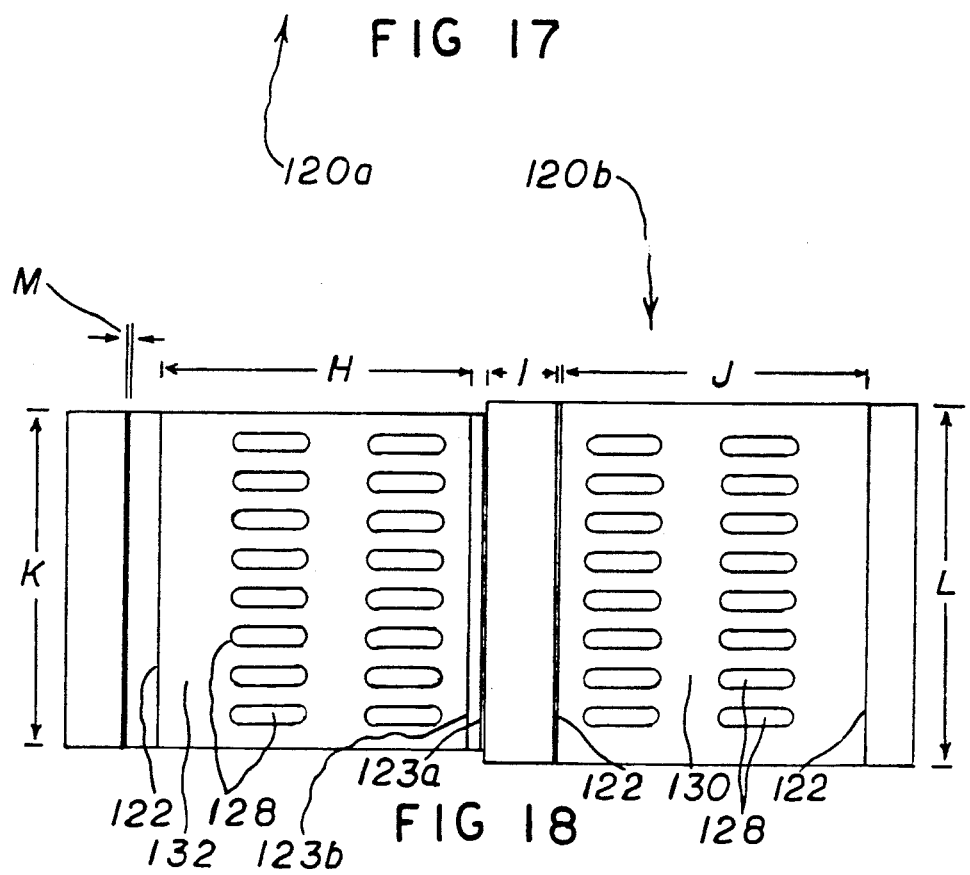
FIG. 18 is a plan view of the upper part of the case/holder of FIG. 13.

FIG. 13 shows a fourth pencil case/holder which is constructed from two sheets 120a and 120b (FIGS. 17 and 18) of polyethylene, polypropylene, or any other suitable material. This case incorporates a channel member 133 and two cover flaps 138. FIGS. 17 and 18 are plan views of the components of FIG. 13. These are provided to enable the following indicated dimensions for the holder of FIG. 13 to be specified. A = 179 mm (7.5"), B = 178 mm (7"), C = 152 mm (6"), D = 84 mm (3.3") E = 70 mm (2.75"), F = 70 mm (2.75") G = 89 mm (3.5"), H = 152 mm (6"), I = 35 mm (1.375"), J = 152 mm (6"), K = 165 mm (6.5"), L = 178 mm (7"), and M = 15 mm (0.625"). Other dimensions are to scale.

Figure 16:
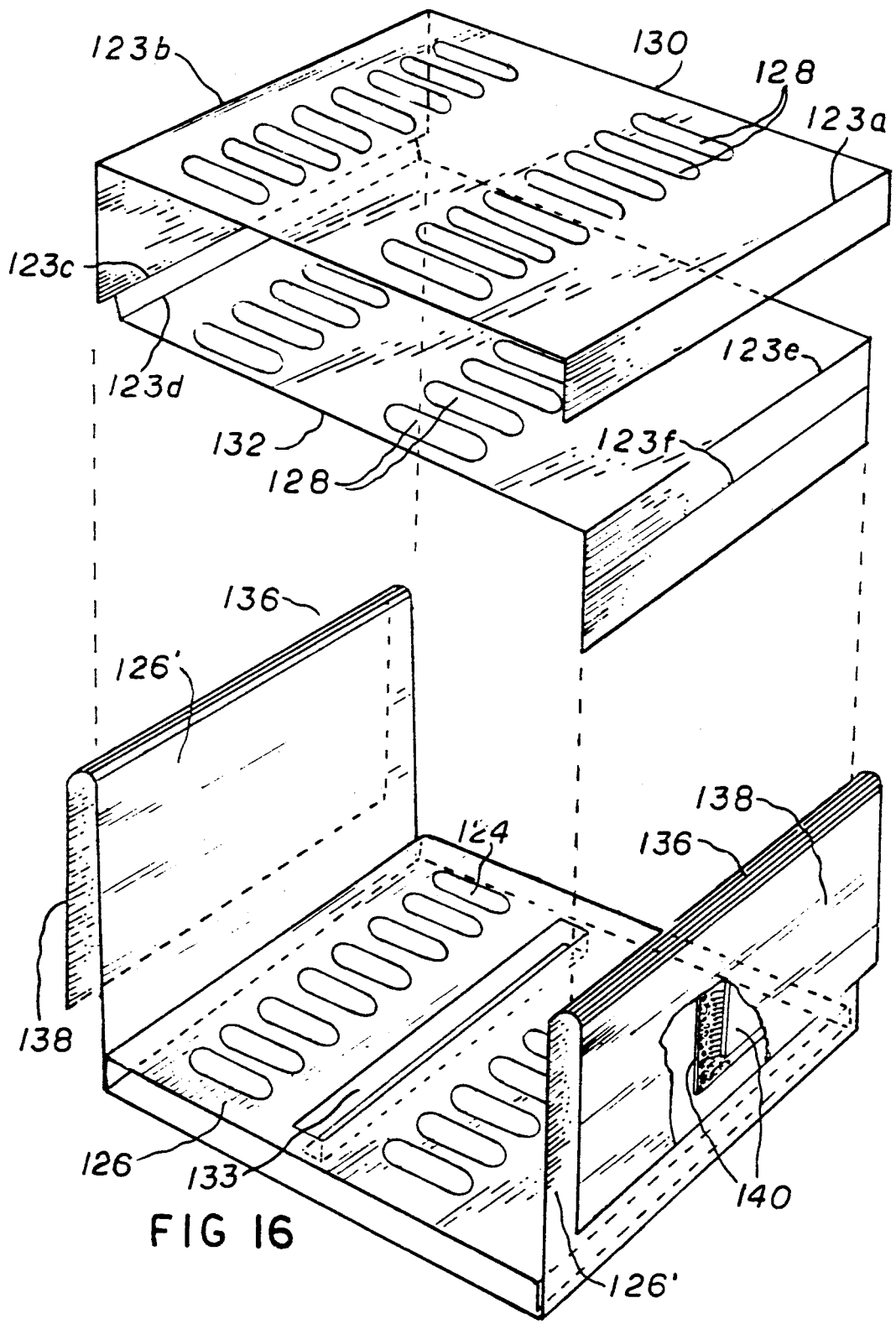
FIG. 16 is an exploded view of the base and upper part of FIG. 13.

Several parallel score lines 121 are made where extreme bends up to 270 degrees will occur to form hinges for the cover flaps 138. Single or double score lines 122 are made where lesser bends in the material are required, such as when forming shape or at locations where folding hinge points occur. Score lines 123a-123f (FIGS. 16 and 18) provide hinge points and add extra flexibility to shelves 130 and 132. Sheet 120a (FIG. 17) forms base 126 and vertical partitions 126' (FIG. 16). Elongated slots 124 are cut in this sheet and corresponding elongated slots 128 are cut in sheet 120b (FIG. 18) which forms upper and lower shelves, 130 and 132 respectively (FIGS. 13 and 16).

Assembly of Case—FIG. 16

The exploded view of FIG. 16 clearly shows the bends and construction of the pencil case/holder of FIG. 13. FIG. 14, a sectional view along broken line 14—14 of FIG. 13, shows the construction of channel 133. The channel construction consists of a downward bent membrane 135 incorporating a tab 137 which is welded to lower base 127 (FIG. 14). When the case is closed, pencil ends 134 abut against membrane 135, thus preventing pencil ends 134 from slipping too far under base 126 when the case/holder is closed. Extreme bends 136 (FIGS. 13 and 16) are formed by multiple score lines 121 (FIGS. 17). Cover flaps 138 can be anchored in a neat and tidy position when the case/holder is in use, by any convenient means, such as hook-and-loop fastener pads 140 (FIG. 16), or alternatively by location tabs or any other expedient, such as tab 142 (FIG. 15). FIG. 15 is an end view of FIG. 13 taken in the direction of arrow C.

One Piece Case/Holder—FIGS. 19-28

Figure 19:
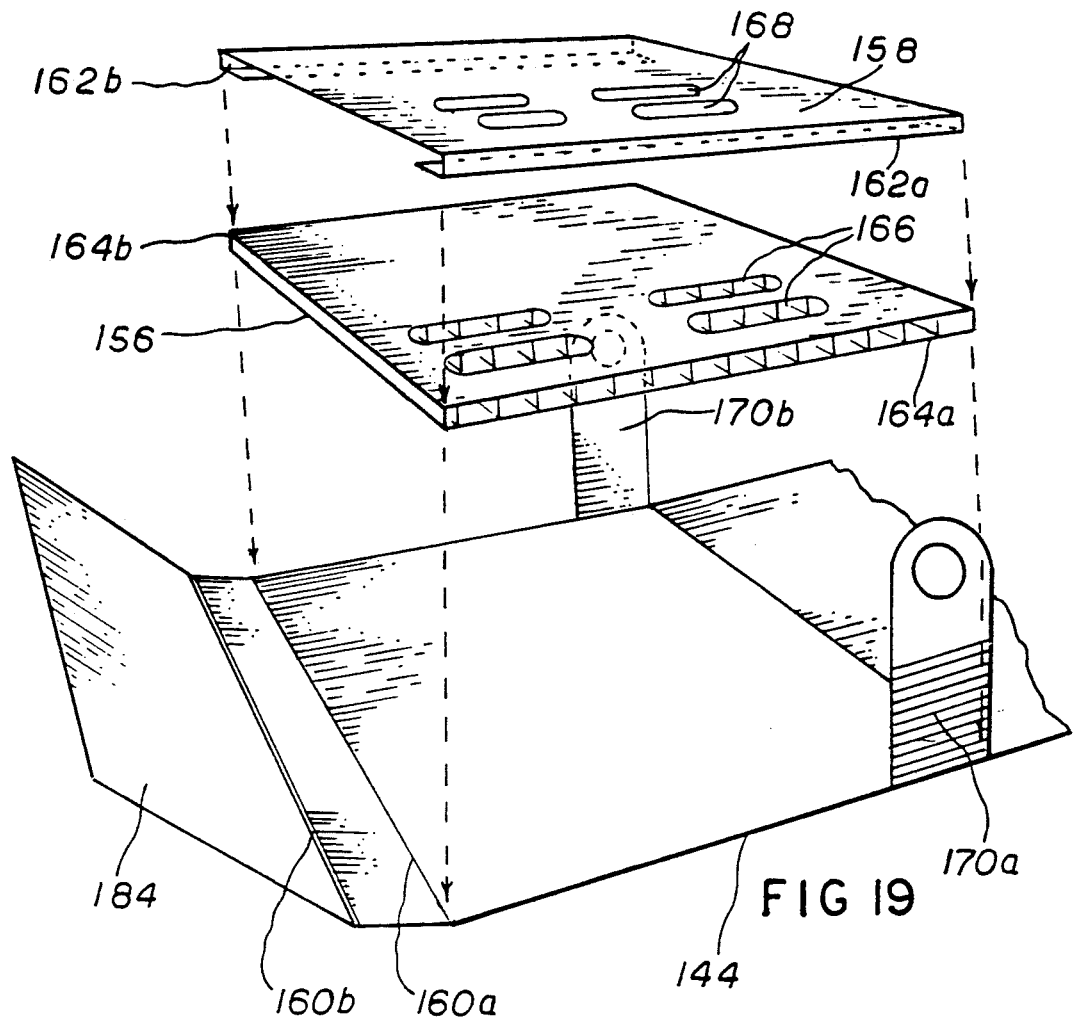
FIG. 19 is an exploded view of the base components of a fifth embodiment of a case/holder in which a filler is used in the base.

FIG. 19 shows a fifth method of constructing a case/holder for elongated and/or pencil-like objects. The difference in this case/holder from the case/holders of FIGS. 13-18, is that it is constructed primarily of one sheet of material, as with FIGS. 11 and 12, and it has a filler and overlay in its base. Additionally, it lends itself to a quick assembly process during manufacture. Base 144 (FIGS. 19, 20, 25, and 26) as well as upper and lower shelves 148 and 150, respectively, are cut from one piece of any suitable material, such as polyethylene or polypropylene, according to plan 154 (FIG. 21).

Some measurements for plan 154 FIG. 21-24 are: O=38 mm (1.5"), P=70 mm (2.75"), Q=152 mm (6"), R=35 mm (1.375"), S=162 mm (6.375"), T=152 mm (6"), U=9 mm (0.875"), V=178 mm (7"), W=44 mm (1.75"), X=152 mm (6"), Y =24 mm (1.3") and Z=152 mm (6").

The base has two inserts of one or more sheets of a filler 156 which may be made of a fluted plastic, such as that sold under the trademark CORX of PRIMEX PLASTICS CORP., Richmond, Ind., and a base overlay 158 (FIG. 19) is cut to plan (FIG. 23). Elongated slots 166 (FIG. 19) in the base are made longer than elongated slots 168 in base overlay. This allows space for the lower ends of the pencils to project slightly under base overlay 158 when the case/holder is folded.

The manufacturing process and order of assembly of this case/holder is as follows:

(1) Die cut four parts as shown in the plan view of FIGS. 21-24.

(2) Fit filler 156 in and under base overlay 158. Base overlay 158 has tuck-under side flaps 162a and 162b (FIG. 19 and 23) which fit around and under sides 164a and 164b of filler 156 before welding down, riveting, or securing by any other means, to base 144, in the direction of arrows D.

Figure 20:
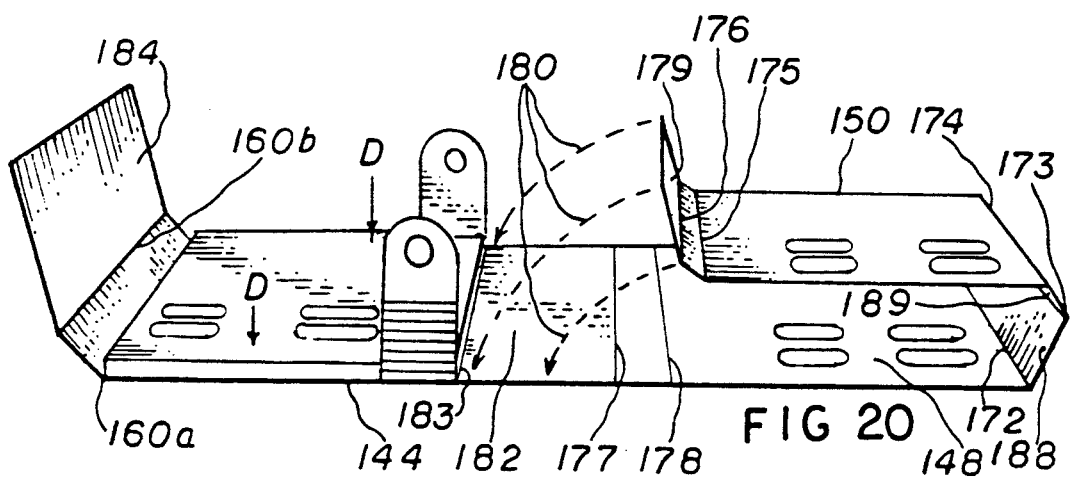
FIG. 20 is a perspective view of the base, upper and lower parts of the case/holder of FIG. 19 during fabrication.

(3) Bend plate 188 above score line 172 to 90 degrees, and bend leaf 189, above score line 173 to 45 degrees; then bend horizontal shelf 150 to 45 degrees, as shown in FIG. 20.

(4) Bend the leaf on the right side of score lines 177 and the upper shelf 148 on the right side of score line 178 (FIG. 20) to 45 degrees, so that tab 179 will move along broken line 180 and seat on partition 182, as clearly shown in FIG. 20 and 25.

(5) Weld tab 179 to partition 182 in the direction of arrows E in FIG. 25.

(6) Bend partition part 185 above score line 160a 45 degrees and bend partition 184 above double score line 160b 45 degrees and bend base 144 above double score line 160c 90 degrees by moving partition 184 along broken lines 186 until partition 184 is covering plate 188 as shown in FIG. 26, then weld the partition to the plate as shown by arrows F.

Figure 27:
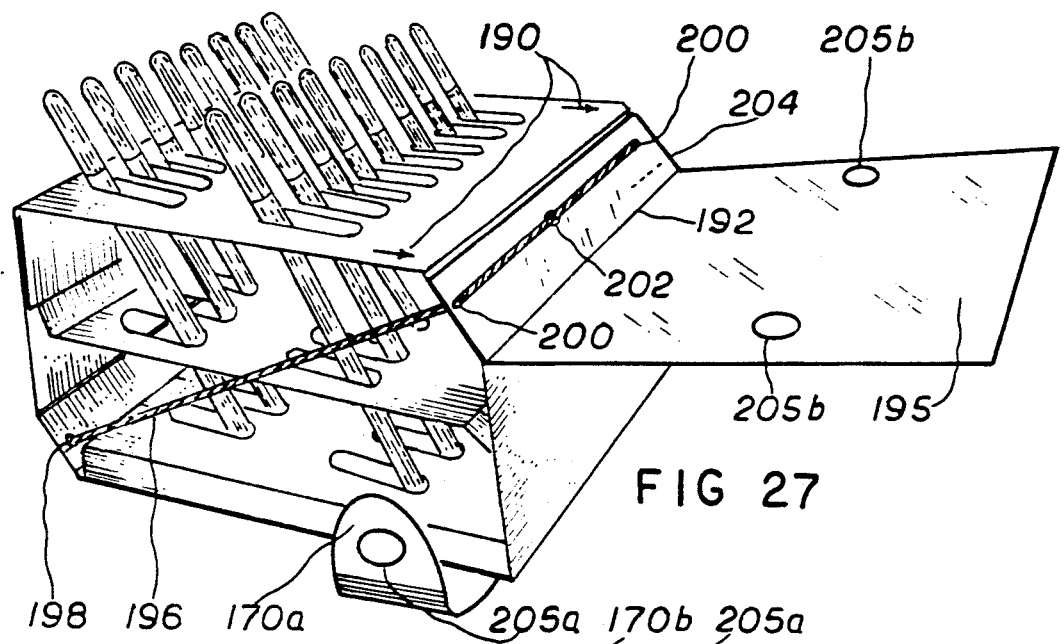
FIG. 27 is a perspective view of the case/holder when completed.

(7) Bend along score lines 192 on cover lid 195 (FIG. 24 and 27) to 90 degrees and thread braided rubber cord 196 as shown in FIG. 27 through hole 198 on both sides of case/holder diagonally across sides of unit through holes 200 and back through holes 202, where the suitable sized end barb of the elastic cord locks into place behind partition part 183 (FIG. 27).

Figure 28:
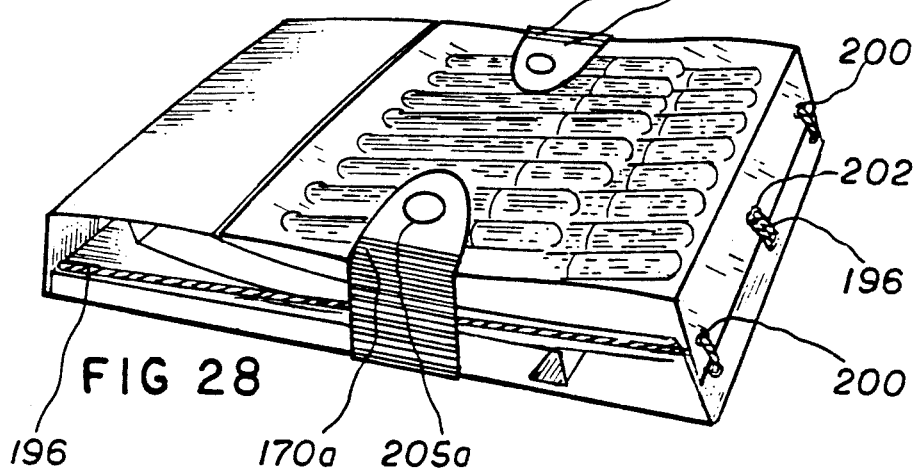
FIG. 28 is a perspective view of the case/holder of FIG. 27 when folded.

(8) Fit snaps 205a and 205b to snap tabs 170a and 170b and to lid 195, respectively, so that they line up when the case/holder is folded as shown in FIG. 28. When the pencils are required for use, the snaps are undone and the braided rubber cord will stand the case/holder up (or it can be done manually) to display the pencils or elongated objects.

Snap Tab Position—FIG. 29

FIG. 29 shows an alternative snap-tab arrangement whereby tab 206a is made integral with the base and tab 206b is made integral with cover lid 195. The advantage of the snap tab on the side is in the saving of material: a long tab on each side would require a wider piece of material from which to cut the base and tab than would be required to cut short tabs on each side of the base and cover lid.

Lid With Sides and Wide Tabs—FIGS. 30-31

FIG. 30 shows a case/holder for elongated or pencil-like objects. This case is the same as that of FIGS. 19-26, except that lid 208 is made with integral sides 210a and 210b. These sides add strength to lid 208 and also gives added protection to contents packaged therein. Also side tabs 212, which are made integral with base 214, are extended to the full width of the base so as to give strength to the base and to give added protection to the contents packaged. FIG. 31 shows the case/holder of FIG. 30 in the folded position.

Base Embodiments—FIGS. 32-39

There are many ways in which the base portion of the various case/holder embodiments may be made. Some of these are shown in the following eight figures, FIGS. 32-39.

FIG. 32 shows a base made of a single flat sheet which comprises a base part 216b, a folded top part 216a, and a flap 218. The top part and base are spaced to form a cavity 215. Top portion 216 is folded over and welded to turned-in side piece 218 at arrow G.

FIG. 33 shows a base construction similar to FIG. 32, except that an insert or filler 220, which is made of a fluted plastic or any other suitable material, fills the cavity; one or more pieces of filler plastic may be used.

FIG. 34 shows a separate top plate 222 welded at arrows H to form a cavity 224.

FIG. 35 is the same as FIG. 34, except that a filler of plastic 226 or other suitable filler material replaces cavity 224 shown in FIG. 34. FIG. 36 shows a filler 228 fitted between turned-in sides 230. These are both welded or riveted in the direction of arrows I.

FIG. 37 shows a filler 232 sandwiched between base cover 234 and base 236. The base is welded or riveted at arrows J. Extended side tabs 238 are integrally made with base 236. This is the basis of construction of FIGS. 30 and 31.

FIG. 38 shows a filler 240 and a base cover 242 which are sandwiched between base 244 and turned-in edges 246a and 246b, which are welded.

FIG. 39 shows a solid base block 248. This is attached to base 250 by any convenient means, such as riveting or adhesive.

Rectangular Folding Case/holder—FIGS. 40 and 41

FIG. 40 shows a sixth method of constructing a case/holder for elongated objects, such as pencils, which folds up and covers the pencils to form a rectangular shape. An outside piece 252 comprises a lower base 254, an upper base 256, vertical partitions 277 and 276, and cover flaps 300 and 301. Upper base 256 has elongated slots (not shown but similar to slots 124 in FIG. 17) cut out to occupy lower end 258 of pencils 260 or other elongated objects.

Upper base 256 is formed by bending an integral side flap over the top of lower base 254 along score lines 270 and These score lines are about 10 mm (⅜") apart, thus forming a raised upper base. Upper base 256 is further supported along its other three edges 272 and 273 (third edge not shown) which are scored and turned downward and inwardly, and glued, welded, riveted, or attached by any other suitable means in the direction of arrows J and K.

Score lines 274 and 275 allow vertical partitions 276 and 277 to be formed. Further scoring is then done at points 280-282 on partition 277 and 280" and 281" on partition 276. These points form various hinge joints which allow the case/holder to be folded down when completed.

Upper and lower horizontal shelves 285 and 286 are made from one piece of material. The material is scored at points 287-295 to form hinge joints which allow the case/holder to fold down as shown in FIG. 41.

Upper and lower horizontal shelves 285 and 286 are glued, welded, or otherwise attached to vertical partitions 277 by tabs 297 and 298 in the direction of arrows L and M. On the left, side plate 299 is attached likewise to vertical partition 276 in the direction of arrow N.

When the case/holder is folded down as in FIG. 41, cover flaps 300 and 301 will cover pencils and overlap to form a parallel rectangular box.

Alternative Rectangular Folding Case/holder—FIGS. 42 and 43

FIGS. 42 and 43 show a seventh case/holder. This is an alternative to the case/holder of FIGS. 40 and 41. Here, there are different intricate score lines and bends, particularly in the construction of the shelves, which allow it to fold into a parallelogram.

The case of FIGS. 42 and 43 comprises three parts; base 252', with integral vertical partitions 258' and 262' with right side cover flap 260', upper and lower horizontal shelf inserts 264' and 254', and left cover flap 256'.

Base material 252' extends to the right along the bottom, up right partition 258', and returns downward to form a cover flap 260'. It also extends to the left, forming left partition 262', and terminates at score line 285'.

Lower horizontal shelf 254' is attached to right partition 258' by a tab 259', which is welded in the direction of arrow P. At the left partition 262', It is welded to a side plate 270' in the direction of arrow Q, then continues as upper horizontal shelf 264'. It is welded to tab 266' in the direction of arrow 0. Left cover flap 256' has a tab 257', which is attached to upper shelf 264' in the direction of arrow R.

An upper base level 272' can be of any construction shown in FIGS. 32 to 39. The base has elongated slots (not shown) which hold pencil ends 274'. Upper shelf 264' and lower shelf 254' also have a plurality of elongated slots which cooperate with those in upper base level 272' such that pencils or elongated objects can be positioned easily therethrough.

All three parts previously mentioned, base 252' and its components, shelf insert 254' and 264', and cover flap 256', have hinge lines 276'-287' which are formed by scoring or perforating the material.

Figure 44:
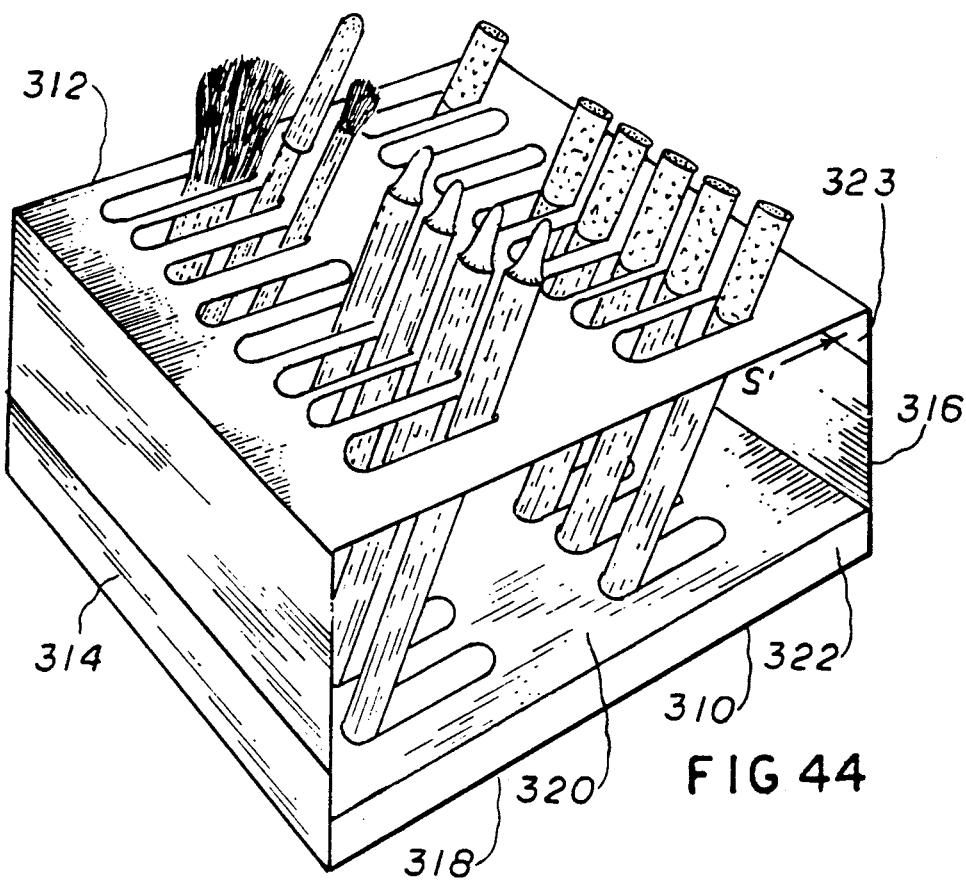
FIG. 44 is a perspective view of an eighth embodiment of a case/holder for elongated objects.
Figure 45:
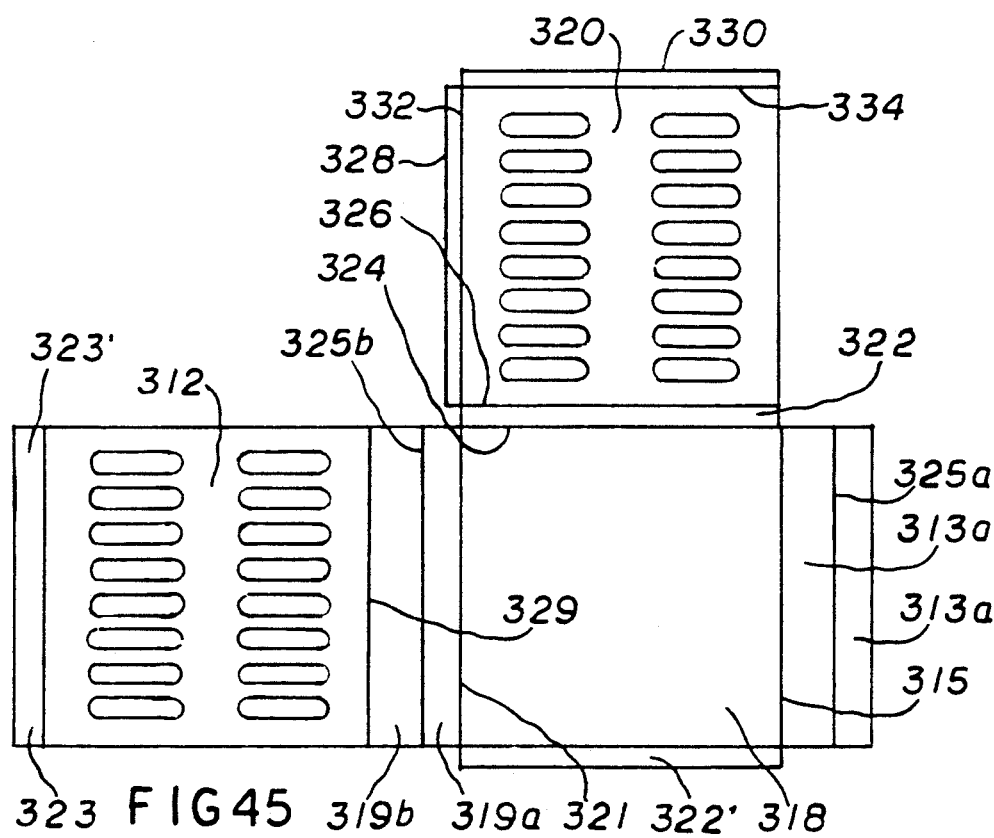
FIG. 45 is a plan view for the construction of the case/holder of FIG. 44.

Case/holder for Short Elongated Objects—FIGS. 44 and 45

FIG. 44 shows an eighth variation of a case/holder for short elongated objects, such as cigarettes, cosmetics, and crayons. This case/holder has only one shelf. Not only does it cost less, but it is much simpler to build.

It comprises a base 310 and a shelf 312, and left and right vertical partitions 314 and 316, respectively. Base 310 comprises a lower base plate 318 and an upper plate 320 separated by a spacer 322.

FIG. 45 shows a plan view of a blank from which a case/holder can be formed. Spacer 322 above score line 324 and upper base shelf 320 above score line 326 are each bent 90 degrees so that upper base plate 320 will be positioned 6 mm (¼") over and above lower base plate 318. Spacer tabs 328 and 330 are bent down along score lines 332 and 334 to form additional supports for upper base shelf 320. Spacer 330 is adjoined to spacer 322' by any convenient means. Partition parts 313a and 313b, 319a, and 319b are bent vertically upward from score lines 315 and 321, respectively. Score lines 325a and 325b are also hinge points used in the folding of this case/holder. Then shelf 312 is bent to a horizontal plane and tab 323 is bent downward and welded to partition part 313b, thus completing the rectangular shape of this case/holder.

Case/holder For Flat Objects—FIGS. 46-52

FIG. 46 shows a plan for the construction of a case/holder for flat objects, such as 3.5" micro disks. The following dimensions apply to plan FIGS. 46 and 47: a=115 mm (4.5"), b=115 mm (4.5"), c=86 mm 3.375"), d=70 mm (2.75"), e=13 mm (0.5"). This case holds four disks 350 (FIG. 48), each one in a separate pocket 352' when folded, and as many as twelve when standing (FIG. 48). As seen in the plan view of FIG. 46, the holder comprises a sheet 354 (FIG. 46) of polyethylene, polypropylene, or any other suitable material, in which four spaced-apart transverse slots 356 are cut. Slots 356 are about 10 mm (0.375") wide with equal spacing dividers 357 between, and about 92 mm (3.625") long. Multiple score lines 358a and 358b are scored transversely across sheet 354. These allow the case to be folded when it is closed.

Score line 360 and 362 (FIG. 46) form corners 364 and 366, respectively (FIG. 48). Tab 368 is glued, welded, or otherwise attached to base 370, as indicated in FIGS. 48 and 49. Zig-zag assembly 372 (FIGS. 48 and 49) is made from a thinner gauge material and has numerous score lines 374 (FIG. 47). These facilitate folding the material into a zig-zag insert and also the formation hinges during folding and unfolding of the case/holder. When unfolded, as shown in FIG. 48 and 49, this will provide four pockets 352' for disks 350, shown clearly in FIG. 48. Any number of pockets can be used. Top and bottom spacers 352a and 352b are welded, glued, or otherwise attached to the underside of top horizontal shelf 378, and to base 370, respectively (FIG. 49).

Broken line 380 (FIG. 49) shows the approximate position the case/holder will assume when the case is folded down.

Figure 50:
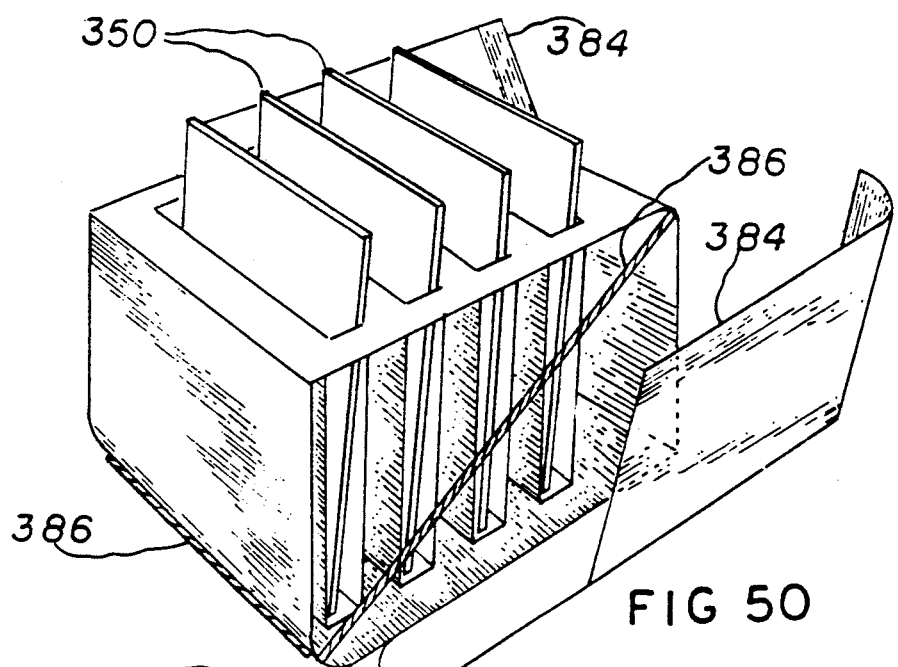
FIG. 50 is a perspective view of the case holder of FIG. 48 fitted with integral side flaps and cover.
Figure 51:
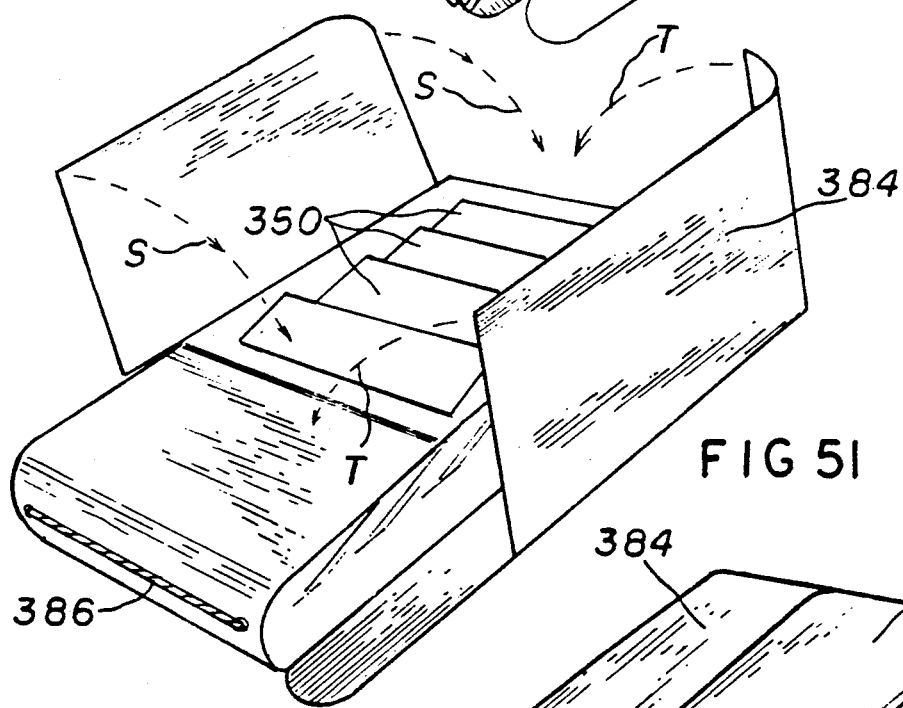
FIG. 51 is a perspective view of the side flaps and cover of FIG. 50 being folded.
Figure 52:
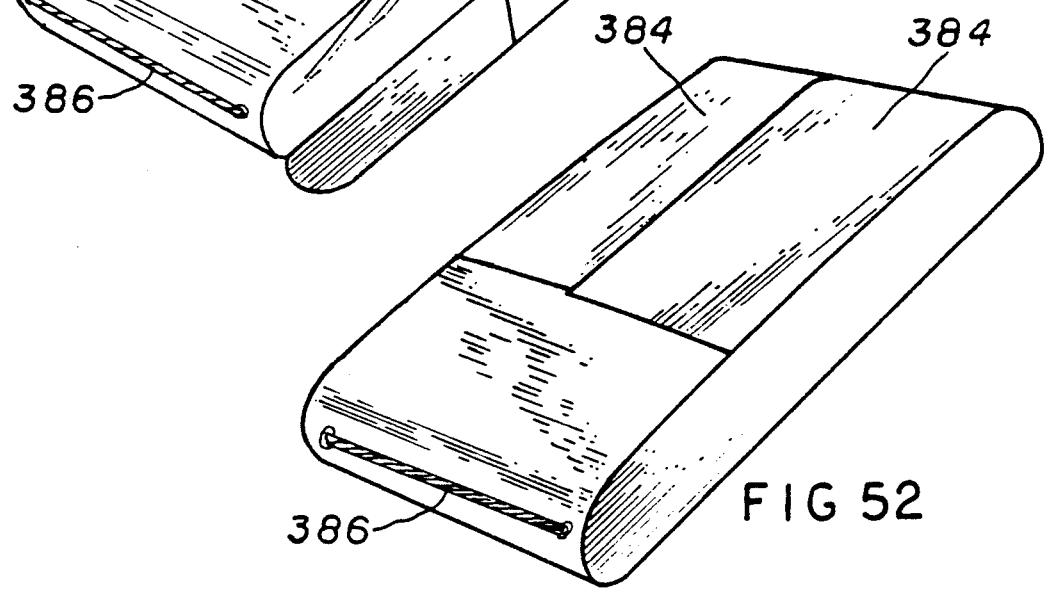
FIG. 52 is a perspective view of the case/holder of FIG. 50 when folded.

FIG. 50 shows the case holder of FIG. 48 fitted with integral side flaps/covers 384. These provide sides and cover which protect disks 350 when folded in the direction of arrows S and T, as shown in FIG. 51. FIG. 52 shows the disk case/holder folded.

A rubber cord 386 (FIG. 50) is fitted diagonally on each side of the case/holder with sufficient tension to automatically elevate the disks when the side flaps/covers 484 are opened, or this can be done by manually. The following dimensions are given as a guide, other dimensions are to scale: a' and b'=115 mm (4.5"), C'=92 mm (3.625"), d'=70 mm (2.75").

Cover With End Flags—FIGS. 53-55

FIG. 53 shows an alternative cover 390 for a microdisk case/holder (FIG. 48). This cover can be made separately and attached afterwards by any suitable means to the underside of the base.

In order to fold the case/holder, the user first presses the holder in the direction of arrow V imprinted on the top of horizontal shelf 378 until it lies flat. Then the user folds in side flaps 392a and 392b so that tabs 394a and 394b lap over edges 396a and 396b. Then end flap 398 is folded until it partially covers the case and the disks. Finally, flap 400 is folded down so that its end 402 overlaps end of flap 398 (FIG. 55).

An elastic band 404 may or may not be attached. If attached, it is to be wrapped all the way around the case as shown in FIG. 55.

Case/holder For 5.25" Floppy Disks—FIGS. 56-58A

Figure 56:
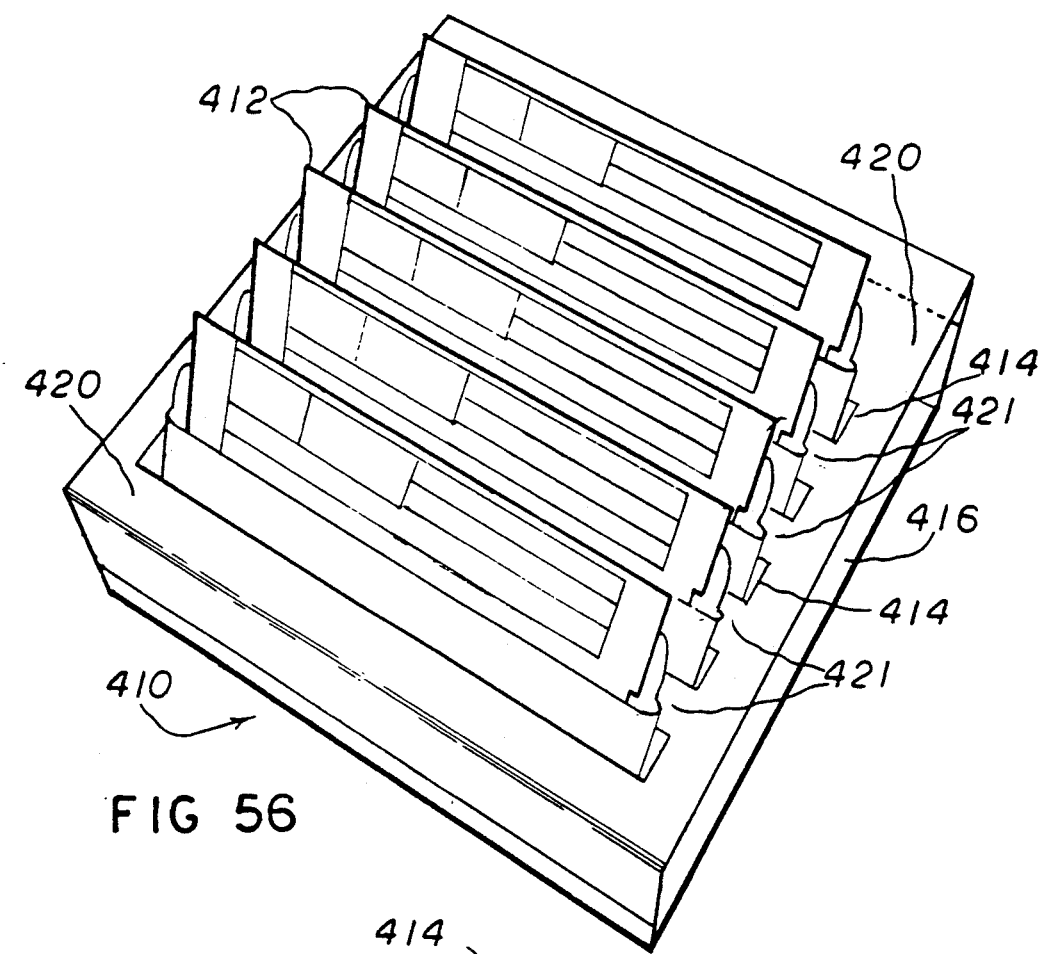
FIG. 56 is a perspective view of a 5.25" floppy disk case/holder.
Figure 58A:
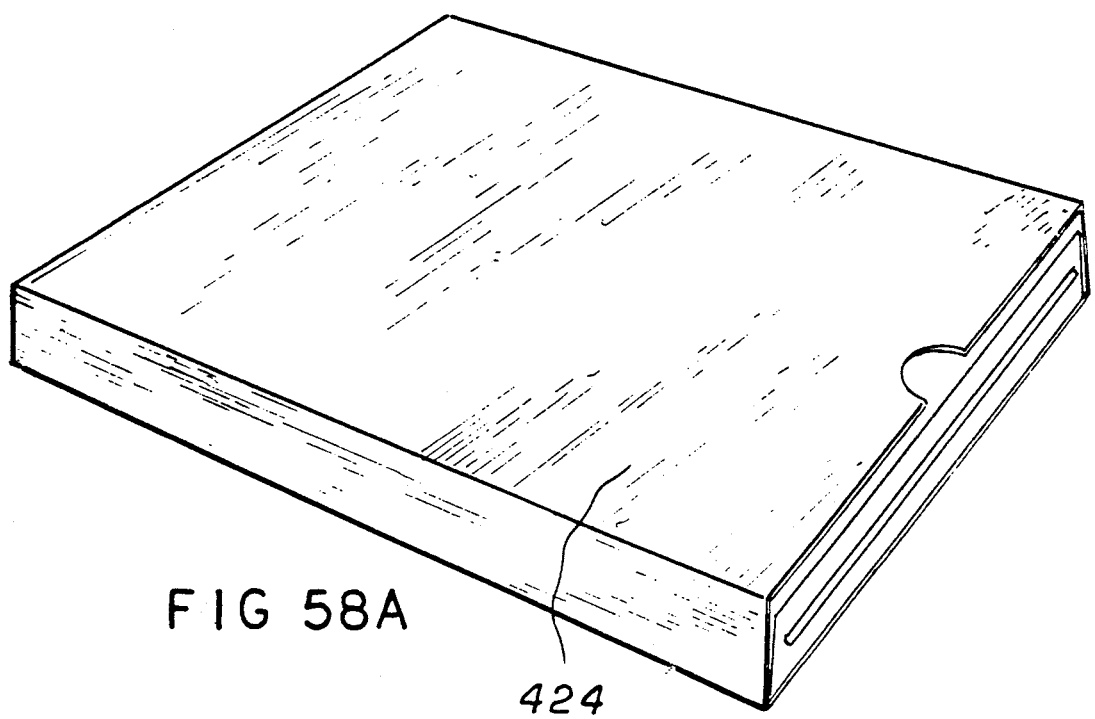
FIG. 58A is a perspective view of a case/holder cover for the case/holder of FIG. 56.

FIG. 56 shows a case/holder 410 for holding 5.25" floppy disks 412 in a five-slot case/holder. It is made from three pieces of any suitable material. These are: 1) base 416 which is integral with partitions 418a and 418b and horizontal shelf 420; 2) zig-zag five-compartment insert 422; and 3) slide-over dust-proof box cover 424 (FIG. 58a).

Base 416 comprises a strip of any suitable material, such as polyethylene or polypropylene 538 mm (21.187") long. Beginning at connector tab 423 (FIG. 57), it is scored transversely at the following distances: 16 mm (0.625"), 196 mm (7.718"), 261 mm (10.281"), 277 mm (10.875"), 359 mm (14.125") and 424 mm (16.687").

While keeping the score lines to the outside, the material is bent to ninety degrees along each score line until the first and last connector tabs 423 and 429 (approximately 16 mm wide) are opposite each other and can overlap. They are then glued or welded face-to-face in the direction of arrow S.

Five transverse slots 414 (FIG. 56 and 57) each 12 mm (0.5") wide and 152 mm (6 in) long are cut across horizontal shelf 420, with bridge piece 421 in between. The first slot is cut 50 mm (2") from the first 16 mm transverse line, followed by a 12 mm (0.5") bridge piece 421. This applies in succession for all five slots.

Zig-zag insert 422 is made from a thinner material and is 152 mm (6") wide. This is also scored transversely so as to form ten intermediate plates 434, each 81 mm (3.187") wide, separated by nine spacer strips 435 (FIG. 57), each 12 mm (0.5") between, plus one at each end.

This sheet is then bent to form a zig-zag insert 422 which fits under bridge pieces 421 at the top and against base 416 at the bottom, such that a 5.25" floppy disk, complete with a disk cover, can be placed in any slot 414 and positioned down through pockets 422 and onto base 416. Disks may be separated and protected from the other disks in the other slots.

Zig-zag insert 422 is glued or welded in position so that 12 mm (0.5") spacers 435, including end tabs, are fitted underneath horizontal shelf 420 which cooperates with five slots 414. Lower spacers 435 are separated 12 mm (0.5") apart at the bottom and attached to base 416. The first bottom spacer is placed adjacent to partition wall 418a, as clearly shown in FIG. 57.

As shown in FIG. 56, this case/holder separates each of five 5.25" disks sufficiently and presents them at an angle. Thus a user can clearly see and read the content information, without having to touch them.

Figure 57:
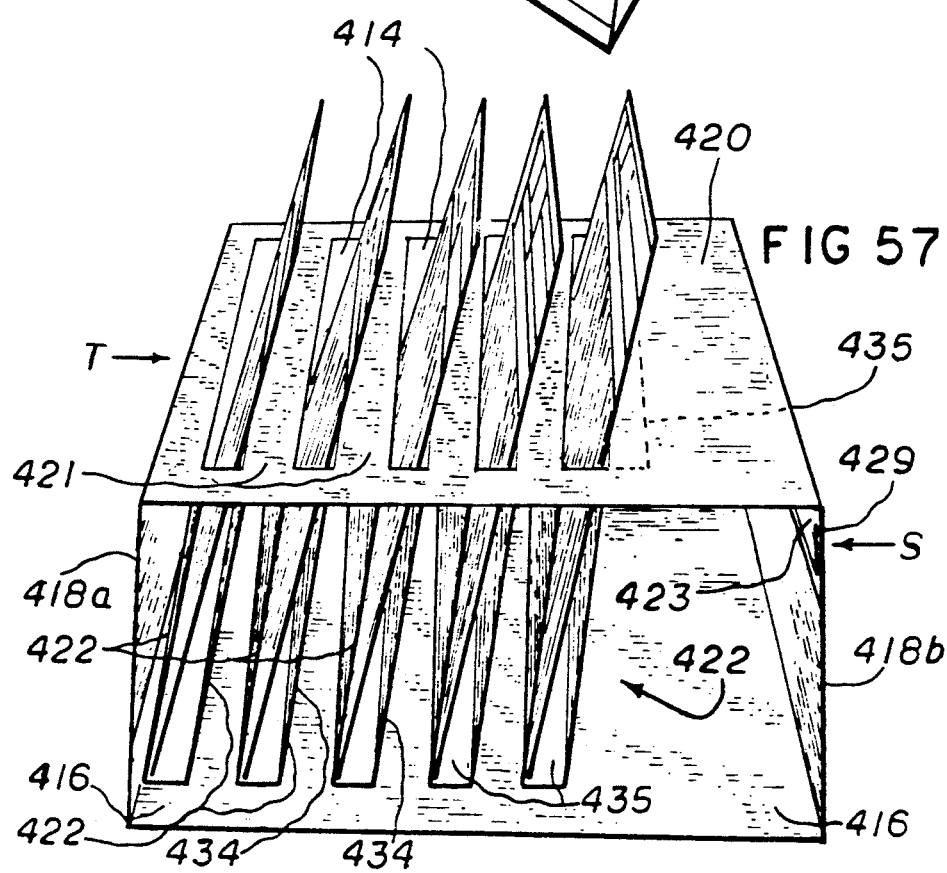
FIG. 57 is a side view of the case/holder of FIG. 56.

To close the case/holder, first press down in the direction of arrow T (FIG. 57). It will lie down to a horizontal position, whereupon dust-proof cover case 424 can be easily slipped over, as shown in FIG. 58A. This case/holder can be easily fitted into a briefcase or handbag, pocket, or any other suitable space.

Figure 58B:
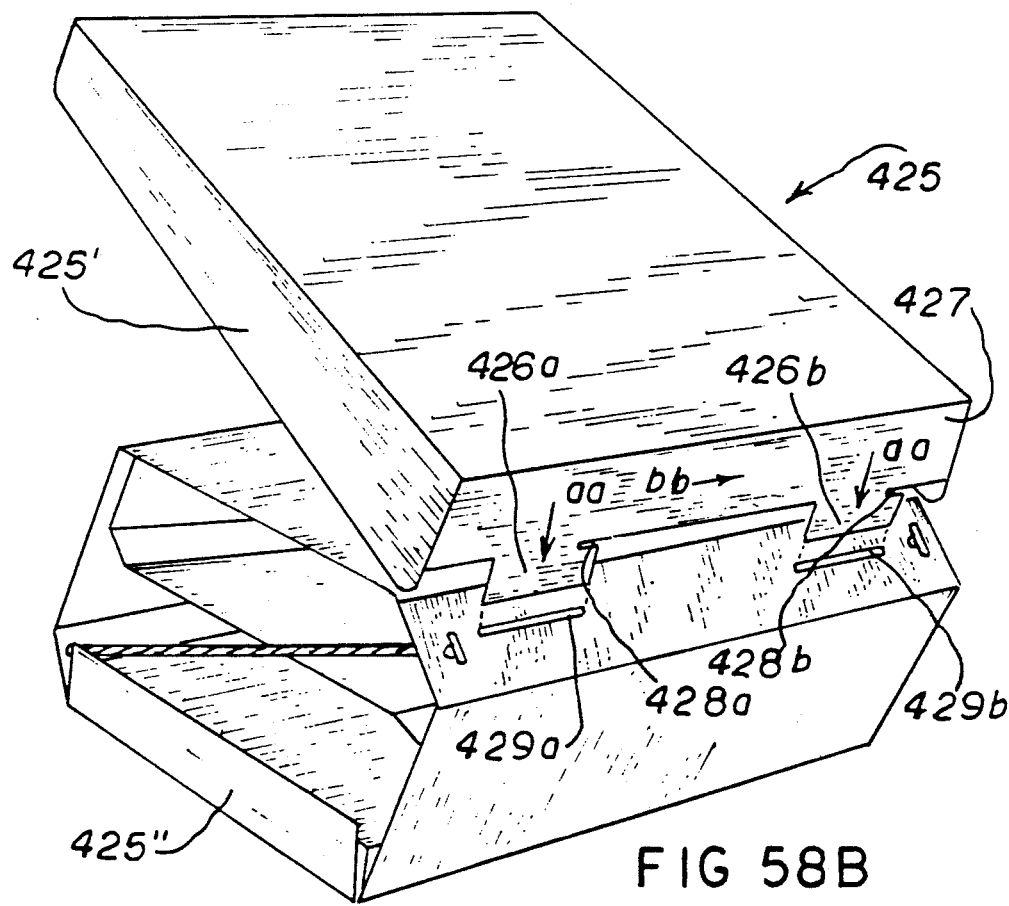
FIG. 58B is a perspective view of a removable lid for a case/holder.

Removable Lid—FIG. 58B

FIG. 58B shows an embodiment in which lid 425 can be removed. It comprises two extended projections 426a and 426b which are integral with end plate 427. Each projection has a groove 428a and 428b. When the lid is to be fitted onto the case/holder, projections 426a and 426b are placed down through slots 429a and 429b, as far as they will go in the direction of arrow aa. Thereafter the lid is pushed sideways in the direction of arrow bb, thus locking the lid from coming off. Lid 425 is now ready to be closed over the case/holder. When closed the lid cannot move sideways to the left, therefore grooves 426a and 426b cannot disengage from slots 429a and 429b and thus allow lid 425 to come off.

Lid 425 has deep sides 425' and is designed so that when fully closed these sides will overlap side panels 425", thus giving full protection to the contents of the case/holder.

Removing the lid is done in reverse to the above fitting procedure.

Figure 59:
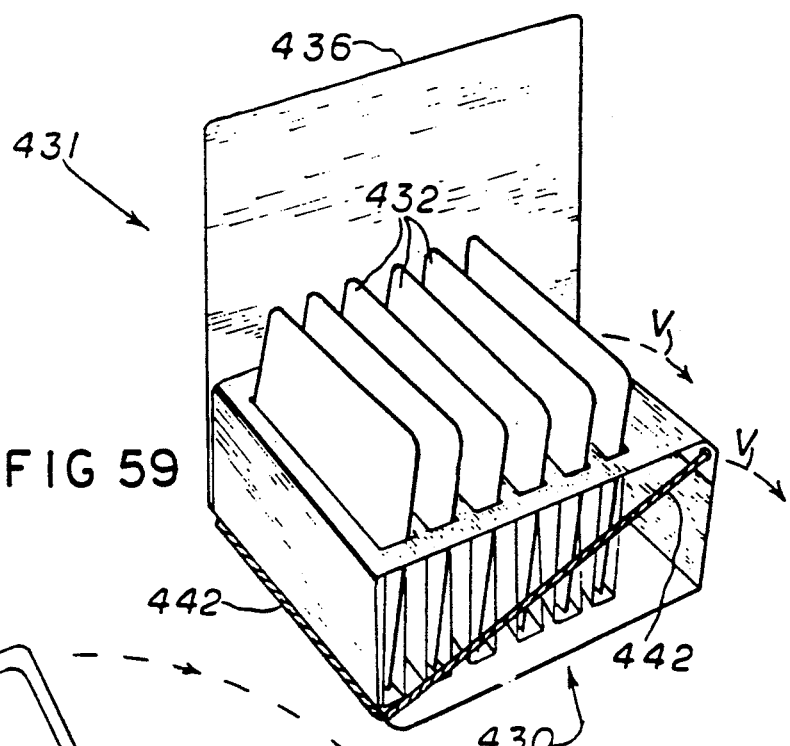
FIG. 59 is a perspective view of a case/holder for cards.
Figure 60:
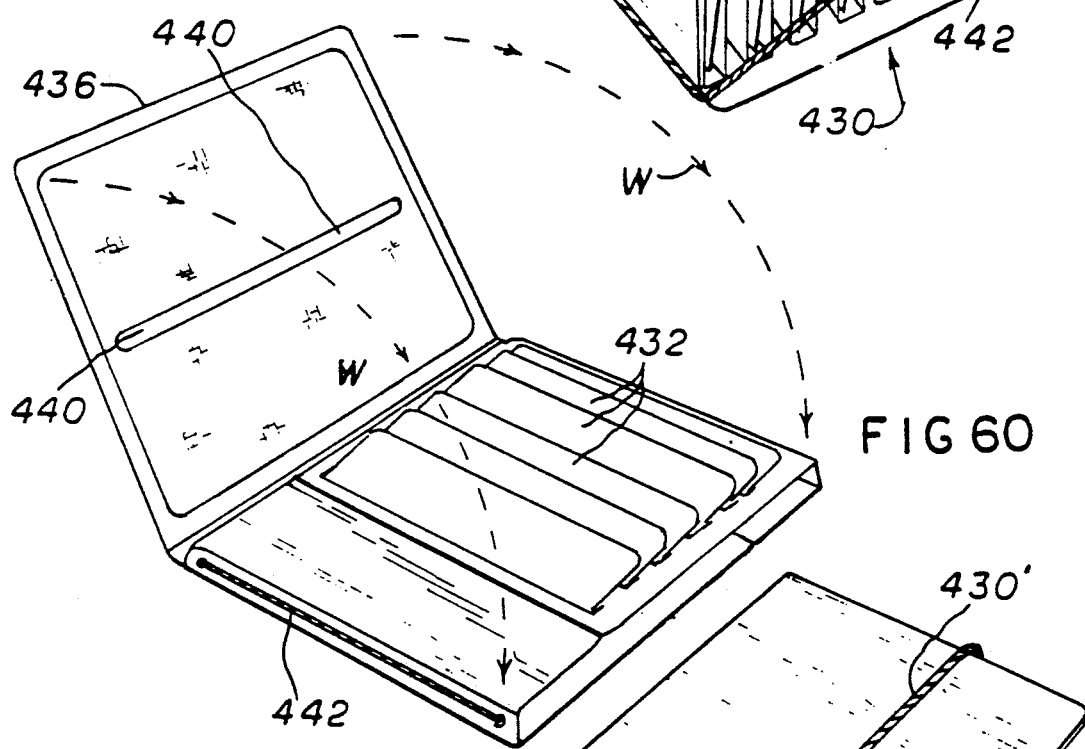
FIG. 60 is a perspective view of the holder of FIG. 59 ready for folding.
Figure 61:
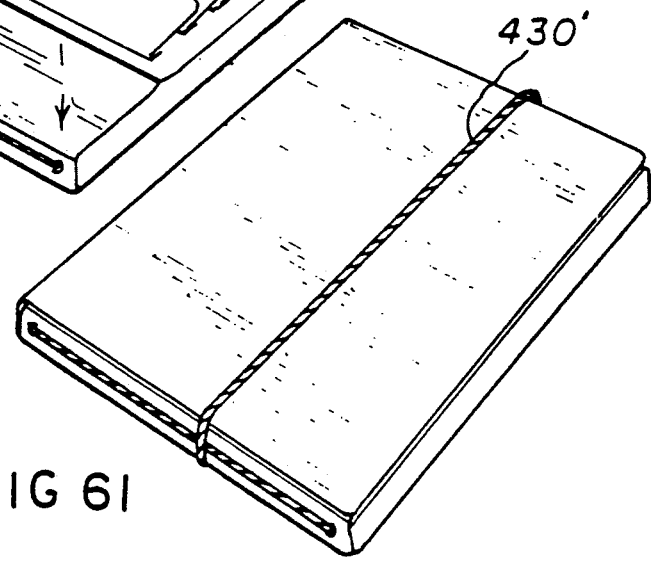
FIG. 61 is a perspective view of the case/holder of FIG. 60 when folded.

Case/holder For Cards—FIGS. 59-61

FIG. 59 shows a case/holder 430 for cards 432 of any type, as well as for photographs, etc. Case/holder 430 comprises a similar construction to that of case/holder 410 of FIG. 56, except that it sits on a simple base and folder cover 431 such that when the holder is collapsed in the direction of arrows V, cover lid 436 can be closed in the direction of arrow W (FIG. 60) and secured with elastic cord 430' (FIG. 61).

A single pocket 440 or several such pockets can be made as part of folder cover 436 for such uses as receipts, paper money, coins, etc.

An elastic band 442 can also be fitted to erect case/holder 430 and cards 432 into a standing position when cover 436 is opened. Alternatively, the case can be opened and erected manually.

This unit easily fits into a shirt, hip or coat pocket, and provides a unique way to protect, use, contain, and promote suitable products.

Self-opening micro-disk case/holder—FIGS. 62-71

FIG. 69 shows a case/holder 446 for a plurality of microdisks 448. When folded as shown in FIG. 71, it provides maximum protection for the disks and can fit into a coat pocket with ease.

Case/holder 446 comprises three parts of any suitable material: 1) a base 450 (FIG. 62) with integral side wings 452 and flaps 454, vertical partitions 456a and 456b, and horizontal shelf 458 with slots 460; 2) lid 486; and 3) insert 474.

Base 450 has numerous score lines 462 and 464. These provide for large radius bending of the case when it is folded, as required to accommodate products, such as disks. Other score lines 466 allow wings to fold over the unit when folded down, and cover each side of disks 448. Further score lines 468 allow flaps 454 to be folded inwardly to provide further side covering and insulation for the disks (FIGS. 69 and 70).

Score lines 470 and 472 form angles which are no less than an acute angle when the case/holder is up and become more obtuse when it is closed.

Base 450, after bending at score lines 462 and 464 (FIG. 62), is fitted with a serpentine or zig-zag insert 474 (FIG. 65). Insert 474 is made from a thinner material than that used in the base material. FIG. 64 shows a plan view in which eight intermediate partitions 476 are separated by alternative wide and narrow strips 478 and 479, respectively. These intermediate partitions 476 are about 65 mm (2.562") wide and 111 mm (4.375") long. Wide strips 478 are about 15 mm (0.625") wide and narrow strips 479 are about 10 mm (0.375") wide. All other measurements are to scale.

Outside vertical partition 456b (FIG. 65) is now angled upward in the direction of arrow X, then flap 480 is folded down in the direction of arrow Y (FIG. 65). Flap 480 is then welded to outside vertical partition 456b (FIG. 67). Side flaps 454 on each side are turned inwardly in the direction of arrow MI (FIG. 67), and tab 455 on each side is fitted behind wall 456b and flap 480, so that its holes line up with holes 484 in flap 480. The unit is now ready to receive lid or top 486 (FIGS. 66 and 68).

As will be seen, score lines 488 allow sides 489 (FIG. 66) to be folded in the direction of arrows N', while score lines 490 (FIG. 68) allow end 492 to fold up. Tabs 493 are bent inwardly so that the holes therein will line up with holes 494 in end 492 (FIG. 68). Lid 486 (FIG. 68) is now ready to be attached to holder 446.

FIG. 70 shows an exploded view of the case/holder and lid 486. Lines 508 (FIG. 70) show the direction to thread an elastic cord 507 (FIG. 69) through hole 500 (FIG. 70), through hole 502, through hole 504 in lid 486, back through hole 505, then through hole 506 in the case/holder, where the end barb of elastic cord 507 is secured behind hole 506. Cord 507 has been threaded similarly on the opposite side of the case/holder, as shown by broken line 508.

To close the case/holder, press down on partition 456a in the direction of arrow Z (FIG. 69) until it lies flat, close lid 486, then bring side wings 452 over each side and snap down.

Case/holder for Flat Objects—FIGS. 72-75

FIG. 72 shows a case/holder 601 for flat objects, such as 3.5" micro disks 604 (shown in phantom). Other flat objects, such as 5.25" floppy disks, memory cards, credit cards, compact discs and the like, are equally suitable for storage and display in case 601. Insofar as it does away with the separate base and other parts of previously described embodiments, this embodiment is exceptional in that it may be constructed entirely (except for the elastic cord 636) of one sheet of polyethylene, polypropylene, cardboard or other suitable opaque, translucent or transparent material, or other material previously mentioned. This one-piece construction is more simplistic and can result in considerable cost savings in labor and materials. As well, it is more mass manufacturable.

Planar part 606 serves as a base or lower cover of the device. First cover flap 608 and second cover flap 610 extend laterally outward from the cover/base 606.

Proceeding clockwise in FIG. 72, cover/base 606 is integrally connected to a lower vertical partition 612 of the first end, which partition, in turn, leads directly to an upper vertical partition 614. When the device is in the open position, partitions 612, 614 form a continuous vertical plane. A ninety degree bend at score line 644 in the continuous sheet then forms the upper shelf 618. Shelf 618 has a plurality of spaced-apart transverse elongated slots 620 cut on three sides, the sheet material remaining connected at score line 646 on the fourth side of each slot to form downwardly depending upper vertical pocket partitions 622. Only a single slotted shelf elevated above the base and lower shelf 628 is found to be necessary in this embodiment. That is, lower shelf 628, being attached directly to base 606, mainly provides partitions 630; the slots formed by the creation if partitions 630 do not enclose objects as do slots 620 of upper shelf 618.

A ninety degree downward bend forms a continuous vertical partition of the second end of the device, said partition having upper 624 and lower 626 partition portions which bend into two planes at score line 650 when the device is closed. A further right angle bend of the single sheet of material at score line 652 forms a lower shelf 628 which is welded, glued or otherwise permanently affixed to the base/cover 606. The lower shelf has upwardly projecting lower vertical pocket partitions 630 in positions corresponding to the downwardly projecting partitions 622 of the upper shelf 618 for interconnection as described in connection with FIG. 75 below. This arrangement does away with the necessity for a zig-zag insert as found in some of the other embodiments using two pieces of sheet material. Elastic band or string 636 urges the device into an upright position when opened, in the manner previously described.

Turning to FIGS. 74 and 75, one can see in greater detail the means by which case 601 is formed from a single sheet of material. Note that the following assembly steps may be performed in any order deemed most suitable for mass production.

Right angle turns at score lines 648 and 652 dispose upper shelf 618 and lower shelf 628 parallel to each other. By bending upper pocket partitions 622 downward at score lines 646 and lower pocket partitions 630 upward at score lines 654, the pocket partitions may be connected together at points 632 (FIG. 75) by welding, gluing, riveting, or the like, with welding and gluing currently being preferred. This method of forming a plurality (five in this example) of flat object pockets eliminates the need for a separate zig-zag insert.

Right angle bends at score lines 644 and 640 bring the two shelves on top of the exterior cover 606, whereupon the cover/base 606 and lower shelf 628 may be attached at convenient weld/glue points—for example, point 629. Note that the lower pocket partitions have extra score lines 656 a short distance above score line 654. It should be noted that when heat scored, one thick bar between score lines 656 and 654 will be sufficient. This allows the case to lie flat when folded—the thickness of the disk or other objects requires the lower portions of the lower pocket partitions to remain more upright than the upper portions when the case is folded.

Weld flap 659 is folded 180 degrees at score line 658 over on top of the first cover flap 608. This serves as a footing for securing the pocket flap 661 when the latter is folded 180 degrees at score line 660. An inner pocket for the storage of notes, labels, manuals, and the like is thus formed. When the device is collapsed for storage, folds are made along lines 662 and 664 to bring the first cover flap 608 up over the shelves and contents. Similarly, folds are made along lines 667 and 668 of the second cover flap 610 to allow it to be folded up and over and to allow its tabbed end to be inserted into the slot 670 of the first flap (FIG. 73). At the time of collapsing the device, right angle folds are formed along score lines 642 and 650, so that only the lower partition 612 of the first end and the upper partition 624 of the second end remain vertical—partitions 614 and 626 collapsing with respect to the shelves. The elastic loop 636 is inserted through holes or notches 638 to urge the shelves and contents back up when the flaps are opened. It should be noted that special score lines 641 and 649 of FIG. 74 are an essential element of the design for paper for mass production with automated gluing machines to permit the glued pieces to be pressed together.

The embodiment of FIGS. 72–75 have lower shelf 628 secured directly to base 606. This permits the provision of partitions 630 formed from shelf 628 while not creating any holes in base 606. In some cases, it may be desired to use only a single shelf 618 and form upwardly-projecting partitions from base 606. Also, each of the upwardly extending partitions could be replaced by two or more partition segments if desired. In addition, the partitions extending from base 606 could be folded back onto base 606 and secured directly thereto; the partition acting as an upper partition could extend from the outer edge of the lower partition or from the opposite edge of base 606.

Case/holder for elongated objects—FIGS. 76 and 77

FIGS. 76 and 77 show a case 701 for elongated objects, such as pencil 704 (in phantom) or the like, in the expanded display position and in the collapsed storage position, respectively. This embodiment of the invention, like the immediately preceding embodiment, does away with several inserts and other parts, so as to allow it to be made substantially entirely (except for an optional cover flap) of one piece of planar sheet material selected from the wide range of sheet materials previously described. In the preferred embodiment, the sheet material is transparent.

Proceeding counter-clockwise from the left or first end of case 701 as shown in FIG. 76, one edge of a continuous sheet of material forms the top edge of an upper exterior vertical partition 706 of the first end. A bend along an appropriate score line 742 forms a lower vertical partition 708 in the first end.

It should be noted at this point, that, depending on the thickness and resiliency of the sheet material and the depth of the score lines, certain portions of sheet material described as "vertical" or "horizontal" may be only approximately so, as seen in FIG. 76. However, some deviation from true vertical or horizontal will not diminish the effectiveness of a device. Therefore, these terms are used for convenience herein to describe planes that appear, in practice, substantially as described. The same limitation is true with respect to certain angles described as "right" angles—they need not be perfectly so.

Such a "right" angle bend along a score line 741 at the bottom of partition 708 forms the base 710. A right angle bend upward at score line 743 then forms an exterior vertical partition 712 of the left or second end of the device 701. A bend backwards at score line 745 to the left forms an upper shelf with a second end 715 and a first end 714. A plurality (six in this example) of longitudinally elongated slots 718 are cut in first end 714 to form a single transverse row. Additional transverse rows could easily be added, if desired.

A downward bend at score line 747 forms interior vertical partition 720 which is welded or otherwise affixed to exterior partition 706. An inward bend at score line 750 forms the lower shelf, having a first end 723. A row of slots 722 is cut in first end 723 in positions directly below, and corresponding to, the upper shelf slots 718. The single sheet of material thus far described continues as the second end 724 of the lower shelf and is scored at 751 and ends at a tab 726 for securing the lower shelf to the vertical partition 712 of the second end of the device.

The device may be collapsed for storage and transportation and stowed in a separate box (not illustrated—see, for example, the slide-over dust-proof box cover 424 of FIG. 58a). However, an optional cover flap may be formed by welding or otherwise securing one end of a base portion 730 to the lower side of the base 710 of the case at weld point 731, whereupon the base portion of the flap extends, unscored, out a distance substantially equal to the height of vertical partition 712. Referring also to FIG. 77, one can see that upon collapsing the device and folding the cover flap upward at right angles about score lines 748 and 749, a flap end-portion 734 and a flap top-portion 736 are formed, the collapsed box being held between the three portions of the cover flap. Since the base portion 730 is unscored as noted, it helps force the collapsed case 701 to maintain an attractive orthogonal closed position, in that base 710 and partition 712 are forced to assume co-planar positions. The cover flap may be held in place with an elastic loop, with snaps, with suitable slot means or the like (not shown), as disclosed in connection with previous embodiments. The cover flap folds back and under the case, out of the way, when the case is open and erect.

As can also be seen in FIG. 77, when collapsed the upper shelf first end 714 bends about score line 744 and the lower shelf first end 723 bends about score line 746. This enables the case to fold completely flat. The upper 706 and lower 708 partitions of the first end form a right angle about score line 742 when the device is closed. It should be noted that, while it may not always be clear from the schematic representations used in the drawing, a score line can be cut at the outside radius of a particular bend, or cut or heat scored on both sides. Thus, for example, in the perspective view of FIG. 76 the actual score line 742 is hidden behind the inside corner line shown.

A elastic band or loop 740 urges the device upward when the cover flap is released. As can be seen in FIG.

76, the lower shelf, first end 723 is notched inwardly slightly at 753, in order to accommodate the width of the elastic.

It should be noted that although FIG. 76 is a rendering of a plastic holder, it can be also mass produced easily in paper on automated gluing machines by adding a special score line (not shown but equivalent to that described in FIG. 74) on vertical partition, first end 708.

Operation of Case/holder for elongated objects—FIGS. 1-45, 76-77

The embodiments of the case/holder for elongated objects (FIGS. 1-45, 76-77) are opened before inserting the objects in the holes. Each hole is designed to accept one object. Each object thereby becomes isolated from other objects because of the interhole spacing. When the case is erect and stationary, more than one pencil-like objects can be positioned within each hole if the user has need to hold more objects than there are holes, or would like to contain objects by groups. Objects can be removed or replaced with the holder in any position.

After loading is completed, the case is closed and the covers, if used, are secured. The covers protect the contents from the environment, dust and physical damage, and securely hold the contents, so to become an effective packaging case. When the case is opened, the partitions will stand upright (either through manual action or the elastic means), thereby presenting the pencils or other objects in an easy-to-select arrangement.

Operation for-Case/holder For Flat Objects—FIGS. 46-75

Flat objects, such as computer disks, are inserted into the slots or pockets formed between the upper shelf and the base of the case/holder (FIGS. 48, 50, 56, 57, 69 and 72). The case is then folded down until flat and the cover(s) secured. The contents are protected from the environment, dust, static, and physical damage from outside the case and from contact with other flat objects within the case by being isolated within its own slot or pocket. Several disks can be held in each pocket if desired when the case is erect and stationary. This will allow the user to hold more objects than there are holes or to contain objects by groups.

When the objects are required, the covers are released and the case will either automatically elevate the contents and present them in a desirable position for easy selection, or the case can be elevated by hand. FIG. 59 shows a case/holder for cards which is operated similarly to case/holder for disks. FIG. 72 shows a one-piece case/holder for disks which is operated similarly.

The operation is therefore simple, consistent, reliable, safe, and ergonomic.

Summary, Ramifications, and Scope

Thus the reader will see that the case/holders of the present invention have many advantages over prior-art holders, particularly for the packing and presenting of elongated products, such as pens and pencils, as used in writing, art, drafting, reporting, architecture, marking, studying, or any other occupation. It is also suitable for any other elongated products, where such goods are to be packaged and/or displayed with elegance and convenience, an advantage to the user. Also the present holder has many advantages over prior-art holders in relation to the packaging and presenting of flat objects, such as all kinds of electronic and audio disks or flat objects used in any other field where the packaging and/or presentation assists in the easy viewing and selection of the desired single or multiple flat objects.

Flat objects to be packaged may also include loose-leaf sheets, magazines, newspapers, periodicals, brochures, eating utensils, food, keys, any storage and organization, graphics, tape, rulers, and templates, shoes, jewelry, video cassettes, toothpicks, matches and the like. The case can also be either carried in or built into a lunchbox or a suitcase.

While the above description contains many specificities, the reader should not construe these as limitations on the scope of the invention, but merely as exemplifications of preferred embodiments thereof. Those skilled in the art will envision that many other possible variations are within its scope. For example, skilled artisans will readily be able to change the dimensions and shapes of the various embodiments, e.g., by making more slots, or elongated holes. In some cases the horizontal shelves can be replaced by thin elastic sheets and the elongated slots can be replaced by round holes in such sheets. Also the case/holders can be made wider or narrower or longer or shorter, and can even be made with multiple sections arranged side by side, or some with slots and some with holes. The holes in different shelves, or in different parts of a shelf, can be made of different sizes. One or more shelves in any arrangement can be removed, especially the top shelf, to accommodate shorter items. There are also many ways to change the way in which such cases are carried or transported, for example, by building in incorporated hooks, holes for hanging, attached straps, hook-and-loop pad fittings, etc.

Also, covers can be made separate and fitted by snapping, tabbing, welding, etc. The units can be sold without boxing. They can be made with locks. The case/holders can be fitted with tension springs, flat springs, elastic, hydraulic, pneumatic, electric, or any other suitable means for elevating the case/holder. Plastic or rubber tubing can be used to separate the pencils. In this case, the pencils are placed in slots and spaced apart with rubber tube spacers, or even by attaching the tubes and placing the pencils therein. The materials of the case can be of any color or texture, with any tints, sparkles, or graphics.

The base material can be extended so as to enable one to hang the unit on the back of a chair or over a rail, or hook-and-loop pads can be used to attach the case/holder to a wall, a dash-board, one's person, a computer, or in any convenient location or position. The case/holder can be built integrally with, or attached to, a handbag, briefcase, drawer, closet interior or exterior, or any other location. Covers can also be made of numerous materials, and used as a wraparound, pocket, bag or sleeve.

Many different materials can be used in the manufacture of the case/holder, such as any suitable polymer—either thermoset or thermoplastic; polyethylene, polypropylene, polyvinylchloride, polystyrene, acrylic, polycarbonate, polyester, ABS, fiberglass, vinyl, rubber, neoprene, all of any suitable density. Also the case/holder can be made of wood, particle board, foam rubber, paper, and cardboard. The hinges can be integral or external or may utilize or be replaced by tapes, vinyl, or artificial rubbers, etc. Many methods can be used to manufacture the parts, such as die cutting, hand cutting, heat scoring, saw cutting, filing, punching, perforating, routing, injection molding, vacuum forming, carving, weaving, extruding, drilling, computer numerically controlled cutting, laser cutting, etc.

In the assembly of the parts the following methods can be used: heat welding, heat sealing, gluing, taping, double stick taping, stapling, melting, paper clipping, riveting, snapping, sewing, spacing, screw-posting, uniting by hook-and-loop pads or any other suitable means. The flat object and elongated object holders can be made of one or more pieces of material.

If the case/holder is used for address cards, these can easily be updated by removing and replacing the card, rather than crossing out and rewriting previous listings. Several sets of chopsticks can be stored and the holder can also be used as a temporary rest for those being used while eating. Candies made in elongated and/or flat forms and shapes, such as candy canes, sticks and bars, are ideally packaged by means of the present invention.

Although the case has been made of plastic and paper of thicknesses varying in gauge from 19 to 41 (polyethylene, paperboard, and polypropylene) and in a variety of colors, any other gauge, or any other color, can be used. Any variation at any model or holder can be used in construction with any other variation. For instance, parts of the disk holders with parts of the pen holders.

Score lines acting as folding hinge points are optional, because the cases of the present invention can be made to stand permanently upright or lay permanently flat.

Accordingly, the reader is requested to determine the scope of the invention by the appended claims and their legal equivalents, and not by the examples which have been given.

What is claimed is:

1. A holder for objects, comprising:
   a base having an upper surface,
   a plurality of partitions hingedly attached to said base at spaced locations such that said partitions can be positioned upright so as to be transverse to said base and parallel to each other, or folded down so as to lie at no greater than an acute angle to said base and parallel to each other,
   elastic means for continuously urging said partitions to their upright positions,
   at least one shelf attached to said partitions at a corresponding location on each partition, said location being spaced from said base at a given height such that said shelf will be parallel to said base whether said partitions are upright or folded down,
   said shelf having a plurality of openings therein so as to be able to hold objects in said openings, such that
   when said partitions are upright, said shelf will be spaced from said base so to hold said objects in said openings upright for easy selection and removal, and
   when said partitions are folded down, said shelf will be closer to said base than when said partitions are upright, and said objects, when positioned in said openings, will be held close to said base.

2. The object holder of claim 1 wherein said plurality of partitions include first and second end partitions.

3. The object holder of claim 2 wherein the plurality of partitions include at least one intermediate partition.

4. The object holder of claim 3 wherein the intermediate partition includes a first portion which projects downwardly from said shelf and a second portion which projects upwardly from said base, said first and second portions having outer ends joined together.

5. The object holder of claim 4 wherein the base, the first and second end partitions, the shelf and the first and second portions of the intermediate partition constitute a one-piece folded structure.

6. The object holder of claim 5 wherein the second portion of the intermediate partition is formed from a planar sheet which is a one-piece extension of the second end partition.

7. The object holder of claim 2 wherein the base, the first end partition, the shelf and the second end partition constitute a one-piece folded structure connected together in series in the order recited.

8. The object holder of claim 7 wherein the one-piece folded structure incudes a cover flap extending from the base.

9. The object holder of claim 1 including first and second of said shelves.

10. The object holder of claim 9 including a coupling member coupling the first and second shelves.

11. The object holder of claim 10 including first and second end partitions, said first end partition, the base, the second end partition, the first shelf, the coupling member and the second shelf constituting a one-piece folded structure.

12. The object holder of claim 11 further comprising a cover having first and second ends, said first end secured to the base, said cover member having a hinge line dividing said cover member into a lower part adjacent the base and an upper part, the hinge line positioned to lie adjacent an intersection of the second end partition and the first shelf when the partitions are folded down so that the upper part of the cover member can be folded over to cover the first shelf.

13. The object holder of claim 1 wherein:
said elastic means comprises an elastic member extending between a pair of said partitions at a different height on each partition.

14. The object holder of claim 1 wherein:
said elastic means comprises an elastic member extending between one end of said base and a top edge of a partition which is attached to an opposite end of said base.

15. The object holder of claim 1 wherein the partitions are generally orthogonal to the base when upright.

16. The object holder of claim 1 wherein the openings include slots.

17. The object holder of claim 16 wherein:
said slots are elongated in a direction perpendicular to the planes of said partitions when said partitions are upright and wherein a plurality of said slots are formed across said shelf in a direction parallel to said partitions.

18. The object holder of claim 16 wherein:
at least one of said partitions and said shelf is transparent.

19. The object holder of claim 1 wherein:
said partitions are at least three in number, the ends of said shelf attached to the outermost pair of said partitions, a partition between said outermost pair attached to said shelf at a location spaced in from each end of said shelf.

20. The object holder of claim 1 wherein:
said shelf and at least one of said partitions is a single sheet of material which includes a fold line at the junction of said shelf and said partition.

21. The object holder of claim 20, further including:
a second shelf attached to said partitions at a corresponding location on each which is spaced from said base at a given height different from that of said first-named shelf such that said second shelf will be parallel to said base and said first-named shelf whether said partitions are upright or folded down, said second shelf having a plurality of openings therein at locations corresponding to those in said first-named shelf, said second shelf and another of said partitions being made of a single sheet of material which includes a fold line at the junction of said shelf and said partition.

22. The object holder of claim 21 wherein:
said base comprises a plurality of parallel shelves, said base and one of said partitions and one of said shelves being formed of a single sheet of material.

23. The object holder of claim 1 wherein:
said base has a plurality of openings therein corresponding to and positioned so as to be aligned with said openings of said shelf when said partitions are upright.

24. A case for objects, comprising:
a base having an upper surface;
a plurality of spacing partitions hingedly attached to said upper surface of said base at spaced locations such that said spacing partitions can be positioned upright so as to be orthogonal to said base and parallel to each other, or folded down so as to lie at no greater than an acute angle to said base and parallel to each other;
an upper shelf attached to said spacing partitions at a location spaced from said base at a given height such that said shelf will be parallel to said base whether said spacing partitions are upright or folded down, said upper shelf having:
a first plurality of slots therein so as to be able to hold a corresponding plurality of objects of at least said given height in said first slots, such that:
when said spacing partitions are upright, said upper shelf will be spaced from said base at a given height and will hold said objects, when positioned in said first slots in said upper shelf, upright for easy selection and removal, and
when said spacing partitions are folded down, said upper shelf will be closer to said base than said given height, and said objects, when positioned in said first slots in said upper shelf, will be held close to said base at no greater than an acute angle to said base for compact storage, protection, and transportation; and wherein:
said base, spacing partitions and upper shelf are constructed of a single sheet of planar material; and
said base forms an exterior cover having means for folding itself into an enclosure for the apparatus.

25. The apparatus of claim 24 wherein:
said sheet material is transparent.

26. The apparatus of claim 24 further including:
a flap pocket in said exterior cover;
first and second cover flaps on said exterior cover; and
tab and slot means for securing said flaps together when said spacing partitions are folded down.

27. The apparatus of claim 24 wherein:
said exterior cover is constructed of the same said single sheet of material.

28. The apparatus of claim 27 further including:
a lower shelf affixed to said base parallel to said upper shelf, said lower shelf having:
a second plurality of slots and wherein said first and second slots are die cut.

29. The apparatus of claim 28 wherein:
said first slots of said upper shelf have a first set of downwardly protruding object-holding pocket partitions; and
said second slots of said lower shelf have a corresponding second set of upwardly protruding object-holding pocket partitions, said first and second sets of object-holding pocket partitions connected together to form object-holding pockets.

30. The apparatus of claim 29 wherein:
each object-holding pocket partition of said second set is foldable about a score line so as to leave a first portion of said object-holding pocket partition more upright when said spacing partitions are folded down than a remaining second portion of said object-holding pocket partition.

31. A case for objects, comprising:
a base;
first and second spacing partitions hingedly attached to said base at opposite ends thereof, said first spacing partition having:
upper and lower sections hingedly attached together, such that:
said spacing partitions can be positioned upright so as to be generally orthogonal to said base and so that said upper section and said second spacing partition are parallel to each other, or can be folded down so that said upper section and said second spacing partitions lie parallel to each other and to said base;
an upper shelf attached to said spacing partitions at a location spaced from said base at a first given height such that at least one portion of said upper shelf will be parallel to said base whether said spacing partitions are upright or folded down, said upper shelf having
a first plurality of slots therein so as to be able to hold a corresponding plurality of objects of at least said given height in said first slots; and
a lower shelf attached to said spacing partitions at a location spaced from said base at a lower second given height than said upper shelf such that at least one portion of said lower shelf will be parallel to said base and said upper shelf whether said spacing partitions are upright or folded down, said lower shelf having:
a second plurality of slots therein, such that when said spacing partitions are upright, said upper and lower shelves will be spaced from said base at their respective first and second given heights and will hold said objects, when positioned in said first and second slots in said shelves, upright for easy selection and removal, and
when said spacing partitions are folded down, said upper and lower shelves will be closer to said base than said given heights, and said objects, when positioned in said slots in said shelf, will be held close to said base and parallel to said base.

32. The apparatus of claim 31 wherein:
said base, spacing partitions and shelves are constructed of a single sheet of planar material.

33. The apparatus of claim 32 further including:
score lines on said upper and lower shelves interiorly adjacent to said first and second slots, so as to enable the apparatus to fold completely flat with at least one portion of each shelf lying parallel to said base.

34. The apparatus of claim 33 further including:

a cover flap made of a second sheet of planar material, said cover flap being attached to said base interiorly adjacent to the point of hinged attachment of said second spacing partition to said base, such that when said spacing partitions are folded down, said cover flap keeps said base and said second spacing partition co-planar.

35. The apparatus of claim 34 further including:

score line means for folding said cover flap back and under itself when said spacing partitions are positioned upright.

36. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, said plurality of partitions including first and second end partitions and at least one intermediate partition, the intermediate partition including a first portion which projects downwardly from said shelf and a second portion which projects upwardly from said base, said first and second portions having outer ends joined together, the second portion of the intermediate partition including a widened fold area adjacent the base, the widened fold area sized to accommodate the thickness of said objects to permit the intermediate partitions to lie generally parallel to the base when the partitions are folded down, at least one shelf attached to said partitions at a corresponding location on each partition, said location being spaced from said base at a given height such that said shelf will be parallel to said base whether said partitions are upright or folded down, said shelf having a plurality of openings therein so as to be able to hold objects in said openings, such that when said partitions are upright, said shelf will be spaced from said base so to hold said objects in said openings upright for easy selection and removal, and when said partitions are folded down, said shelf will be closer to said base than when said partitions are upright, and said objects, when positioned in said openings, will be held close to said base.

37. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, first and second shelves attached to said partitions at a corresponding location on each partition, said location being spaced from said base at a given height such that said shelves will be parallel to said base whether said partitions are upright or folded down, a coupling member coupling the first and second shelves, first and second end partitions, said first end partition, the base, the second end partition, the first shelf, the coupling member and the second shelf constituting a one-piece folded structure, the first end partition including lower and upper portions coupled by a fold line, the fold line spaced apart from the base by a distance sufficient to accommodate the thickness of the object when the partitions are folded down, said shelves having a plurality of openings therein so as to be able to hold objects in said openings, such that when said partitions are upright, said shelves will be spaced from said base so to hold said objects in said openings upright for easy selection and removal, and when said partitions are folded down, said shelves will be closer to said base than when said partitions are upright, and said objects, when positioned in said openings, will be held close to said base.

38. The object holder of claim 37 further comprising a supplemental fold line between the fold line and the base to accommodate assembly of the object holder.

39. The object holder of claim 37 further comprising second and third fold lines formed in the first and second shelves adjacent the openings to divide the first and second shelves into first portions containing the opening and second portions to permit the first and second shelves to hinge at the second and third fold lines when the partitions are folded down so the second portion and the base can lie generally adjacent and parallel one another to minimize the size of the object holder when the partitions are folded down.

40. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, at least one shelf attached to said partitions at a corresponding location on each partition, said location being spaced from said base at a given height such that said shelves will be parallel to said base whether said partitions are upright or folded down, said shelf having a plurality of slots therein so as to be able to hold objects in said slots, said slots being elongated in a direction parallel to the planes of said partitions and wherein a plurality of said slots are formed across said shelf in a direction perpendicular to said partitions when said partitions are upright, such that when said partitions are upright, said shelf will be spaced from said base so to hold said objects in said slots upright for easy selection and removal, and when said partitions are folded down, said shelf will be closer to said base than when said partitions are upright, and said objects, when positioned in said slots, will be held close to said base.

41. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, a first shelf attached to said partitions at a corresponding location on each partition, said location being spaced from said base at a given height such that said first shelf will be parallel to said base whether said partitions are upright or folded down, said first shelf having a plurality of openings therein so as to be able to hold objects in said openings, such that when said partitions are upright, said first shelf will be spaced from said base so to hold said objects in said openings upright for easy selection and removal, and when said partitions are folded down, said first shelf will be closer to said base than when said partitions are upright, and said objects, when positioned in said openings, will be held close to said base, and a second shelf attached to said partitions at a corresponding location on each which is spaced from said base at a given height different from that of said first shelf such that said second shelf will be parallel to said base and said first shelf whether said partitions are upright or folded down, said second shelf having a plurality of slots therein at locations corresponding to the openings in said first shelf.

42. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, at least one shelf attached to said partitions at a corresponding location on each partition, said location being spaced from said base at a given height such that said shelf will be parallel to said base whether said partitions are upright or folded down, said shelf having a plurality of openings therein so as to be able to hold objects in said openings, such that when said partitions are upright, said shelf will be spaced from said base so to hold said objects in said openings upright for easy selection and removal, and when said partitions are folded down, said shelf will be closer to said base than when said partitions are upright, and said objects, when positioned in said openings, will be held close to said base, and closure means for enclosing said partition and said shelf when said partitions are folded down.

43. The object holder of claim 42 wherein:

said closure means comprises at least one flap extending from said base and long enough to be folded up and over the top edges of said partitions.

44. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, at least one shelf attached to said partitions at a corresponding location on each partition, said location being spaced from said base at a given height such that said shelf will be parallel to said base whether said partitions are upright or folded down, said shelf having a plurality of openings therein so as to be able to hold objects in said openings, such that when said partitions are upright, said shelf will be spaced from said base so to hold said objects in said openings upright for easy selection and removal, and when said partitions are folded down, said shelf will be closer to said base than when said partitions are upright, and said objects, when positioned in said openings, will be held close to said base, and a plurality of feet extending from a bottom edge of each of said partitions in a direction parallel to said partition, said base having, for each partition, a corresponding plurality of projections, each having a recess for receiving and hingedly holding a respective foot of a partition.

45. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, at least one shelf attached to said partitions at a corresponding location on each partition, said location being spaced from said base at a given height such that said shelf will be parallel to said base whether said partitions are upright or folded down, said shelf having a plurality of openings therein so as to be able to hold objects in said openings, such that when said partitions are upright, said shelf will be spaced from said base so to hold said objects in said openings upright for easy selection and removal, and when said partitions are folded down, said shelf will be closer to said base than when said partitions are upright, and said objects, when positioned in said openings, will be held close to said base, and each of said partitions having a plurality of separated sections which are elongated and stand upright when said partition is upright, said shelf having a plurality of holes corresponding to the sections of said partitions, each section of each partition being inserted into a respective hole of said shelf.

46. The object holder of claim 45 wherein:

each of said sections of each of said partitions includes means for engaging the area around the corresponding hole of said shelf for holding said shelf at a given height on said section.

47. The object holder of claim 45, further including:

a second shelf attached to said partitions at a corresponding location on each which is spaced from said base at a given height different from that of said first-named shelf such that said second shelf will be parallel to said base and said first-named shelf whether said partitions are upright or folded down, said second shelf having a plurality of slots and holes therein at locations corresponding to those in said first-named shelf.

48. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, at least one shelf attached to said partitions at a corresponding location on each partition, said location being spaced from said base at a given height such that said shelf will be parallel to said base whether said partitions are upright or folded down, said shelf having a plurality of slots therein so as to be able to hold objects in said slots, such that when said partitions are upright, said shelf will be spaced from said base so to hold said objects in said slots upright for easy selection and removal, and when said partitions are folded down, said shelf will be closer to said base than when said partitions are upright, and said objects, when positioned in said slots, will be held close to said base, and a plurality of pockets communicating with and extending down from said respective slots in said shelf when said partitions are upright, each pocket being elongated and parallel to said partitions when said partitions are upright.

49. The object holder of claim 48 wherein:

each of said slots is elongated in a direction parallel to the planes of said partitions when said partitions are upright and wherein a plurality of said slots are formed across said shelf in a direction perpendicular to said partitions when said partitions are upright, each of said pockets comprising a single sheet of material which has a plurality of sections, including two walls and a base, said base being separated from said walls by a pair of fold lines, said walls extending down from opposite sides of a respective slot when said partitions are upright, said base of each pocket being joined to said base of said object holder.

50. A holder for objects, comprising:

a base having an upper surface, a plurality of partitions hingedly attached to said base at spaced locations such that said partitions can be positioned upright so as to be transverse to said base and parallel to each other, or folded down so as to lie at no greater than an acute angle to said base and parallel to each other, at least one shelf attached to said partitions at a corresponding location on each partition, said location being spaced from said base at a given height such that said shelf will be parallel to said base whether said partitions are upright or folded down, said shelf having a plurality of slots therein so as to be able to hold objects in said slots, such that when said partitions are upright, said shelf will be spaced from said base so to hold said objects in said slots upright for easy selection and removal, and when said partitions are folded down, said shelf will be closer to said base than when said partitions are upright, and said objects, when positioned in said slots, will be held close to said base, and said base including a relatively thin cover layer and a relatively thick filler layer positioned below said cover layer, each of said slots in said base having one portion formed through said cover layer and another portion formed in said filler layer, the size of the portion of each of said slots in said filler layer being larger than the portion in said cover layer, thereby to provide slots which are each undercut so that the bottom ends of objects, when positioned in said slots, will be able to pivot more stably.

* * * * *